(12) United States Patent
Shekel et al.

(10) Patent No.: US 12,555,972 B2
(45) Date of Patent: Feb. 17, 2026

(54) OPTICAL PHASED ARRAY DYNAMIC BEAM SHAPING WITH NOISE CORRECTION

(71) Applicant: CIVAN ADVANCED TECHNOLOGIES LTD., Jerusalem (IL)

(72) Inventors: Eyal Shekel, Beit Zayit (IL); Benayahu Urbach, Jerusalem Country (IL); Yaniv Vidne, Petach Tikva (IL); Ran Vered, Nehalim (IL); Avisar Shapira, Efrat (IL); Yehuda Elitzur, Mehola (IL); Elimeleh Keller, Rishon Le Zion (IL)

(73) Assignee: CIVAN ADVANCED TECHNOLOGIES LTD., Jerusalem (IL)

( * ) Notice: Subject to any disclaimer, the term of this patent is extended or adjusted under 35 U.S.C. 154(b) by 166 days.

(21) Appl. No.: 18/600,242

(22) Filed: Mar. 8, 2024

(65) Prior Publication Data

US 2024/0258763 A1     Aug. 1, 2024

Related U.S. Application Data

(63) Continuation of application No. 18/129,214, filed on Mar. 31, 2023, which is a continuation of application (Continued)

(30) Foreign Application Priority Data

Nov. 7, 2017   (IL) .......................................... 255496
Dec. 4, 2017   (IL) .......................................... 256107
Apr. 25, 2018  (IL) .......................................... 258936

(51) Int. Cl.
*H01S 3/13*   (2006.01)
*H01S 3/10*   (2006.01)
*H01S 3/23*   (2006.01)

(52) U.S. Cl.
CPC .......... *H01S 3/1305* (2013.01); *H01S 3/1307* (2013.01); *H01S 3/2383* (2013.01); (Continued)

(58) Field of Classification Search
CPC ........ B23K 26/50–707; H01S 3/10053; B33Y 30/00; B33Y 10/00
See application file for complete search history.

(56) References Cited

U.S. PATENT DOCUMENTS 5,694,408 A    12/1997   Bott et al.
6,200,309 B1   3/2001    Rice et al.
(Continued)

FOREIGN PATENT DOCUMENTS

CN    102825382    12/2012
CN    103346470    10/2013
(Continued)

OTHER PUBLICATIONS

An International Search Report and a Written Opinion both dated Apr. 22, 2019, 2019, which issued during the prosecution of Applicant's PCT/IL2018/051184.
(Continued)

*Primary Examiner* — Joshua King
(74) *Attorney, Agent, or Firm* — Sughrue Mion, PLLC

(57) ABSTRACT

A laser system including a seed laser, a laser beam splitting and combining subsystem receiving an output from the seed laser and providing a combined laser output having noise and a noise cancellation subsystem operative to provide a noise cancellation phase correction output based on taking into consideration the noise at intermittent times, the laser beam splitting and combining subsystem varying a phase of the combined laser output during time interstices between the intermittent times.

30 Claims, 45 Drawing Sheets

Related U.S. Application Data

No. 16/761,944, filed as application No. PCT/IL2018/051184 on Nov. 6, 2018, now Pat. No. 11,646,543.

(60) Provisional application No. 62/702,957, filed on Jul. 25, 2018, provisional application No. 62/684,341, filed on Jun. 13, 2018, provisional application No. 62/594,167, filed on Dec. 4, 2017.

(52) U.S. Cl.
CPC ......... *H01S 3/10053* (2013.01); *H01S 3/2308* (2013.01); *H01S 2301/02* (2013.01)

(56) References Cited

U.S. PATENT DOCUMENTS

| | | |
|---|---|---|
| 6,400,871 B1 | 6/2002 | Minden |
| 6,708,003 B1 | 3/2004 | Wickham et al. |
| 7,058,098 B1 | 6/2006 | Shay |
| 7,187,492 B1 | 3/2007 | Shay |
| 7,339,727 B1 | 3/2008 | Rothenberg et al. |
| 7,345,744 B2 | 3/2008 | Halmos et al. |
| 8,228,599 B1 | 7/2012 | Carbon et al. |
| 8,548,017 B1 | 10/2013 | O'loughlin et al. |
| 8,605,761 B2 | 12/2013 | Hutchin |
| 9,502,854 B1 | 11/2016 | Filgas |
| 9,735,537 B1 | 8/2017 | Rothenberg et al. |
| 9,812,840 B2 | 11/2017 | Bourderionnet et al. |
| 10,008,821 B1 | 6/2018 | Goodno et al. |
| 11,163,062 B1 | 11/2021 | Viswanatha et al. |
| 11,169,246 B1 | 11/2021 | Viswanatha et al. |
| 11,646,543 B2 | 5/2023 | Shekel et al. |
| 2003/0002790 A1 | 1/2003 | Johnson et al. |
| 2005/0128554 A1 | 6/2005 | Wickham et al. |
| 2005/0135815 A1 | 6/2005 | Gerwe et al. |
| 2005/0201429 A1* | 9/2005 | Rice .............. H01S 3/2383 372/27 |
| 2007/0201795 A1 | 8/2007 | Rice et al. |
| 2008/0037028 A1 | 2/2008 | Cheung et al. |
| 2008/0055700 A1 | 3/2008 | Bourderionnet et al. |
| 2008/0084598 A1 | 4/2008 | Rothenberg et al. |
| 2008/0084605 A1 | 4/2008 | Rothenberg et al. |
| 2008/0253415 A1 | 10/2008 | Livingston |
| 2008/0253417 A1 | 10/2008 | Livingston |
| 2008/0304139 A1 | 12/2008 | Suzuki et al. |
| 2009/0097508 A1 | 4/2009 | Protz et al. |
| 2009/0134310 A1 | 5/2009 | Goodno |
| 2009/0185176 A1 | 7/2009 | Livingston et al. |
| 2009/0185590 A1 | 7/2009 | Livingston |
| 2009/0296751 A1 | 12/2009 | Kewitsch et al. |
| 2009/0316734 A1 | 12/2009 | Huignard et al. |
| 2010/0142574 A1* | 6/2010 | Demoustier .......... H01S 3/2383 372/29.023 |
| 2011/0032604 A1 | 2/2011 | Rothenberg et al. |
| 2011/0122904 A1 | 5/2011 | Littler et al. |
| 2012/0188626 A1 | 7/2012 | Rothenberg et al. |
| 2013/0034114 A1 | 2/2013 | Schill et al. |
| 2013/0107343 A1 | 5/2013 | Shekel |
| 2013/0215919 A1 | 8/2013 | Aflatouni et al. |
| 2013/0221211 A1 | 8/2013 | Witzens |
| 2013/0315271 A1 | 11/2013 | Goodno |
| 2014/0139903 A1 | 5/2014 | Goodno et al. |
| 2014/0231618 A1 | 8/2014 | Beresnev et al. |
| 2014/0259659 A1 | 9/2014 | Kleinert |
| 2014/0268290 A1 | 9/2014 | Sebastian et al. |
| 2014/0269790 A1 | 9/2014 | Sebastian et al. |
| 2014/0368832 A1 | 12/2014 | Salvadé et al. |
| 2014/0376001 A1 | 12/2014 | Swanson |
| 2016/0016257 A1 | 1/2016 | Hosseini |
| 2017/0201063 A1 | 7/2017 | Bourderionnet et al. |
| 2018/0269648 A1 | 9/2018 | Robinson et al. |
| 2021/0175680 A1 | 6/2021 | Shekel et al. |
| 2023/0283038 A1 | 9/2023 | Shekel et al. |

FOREIGN PATENT DOCUMENTS

| | | |
|---|---|---|
| CN | 105008085 | 10/2015 |
| CN | 102227286 | 3/2016 |
| CN | 106017674 | 10/2016 |
| CN | 107003531 | 8/2017 |
| DE | 4025577 | 2/1992 |
| DE | 112007002368 | 8/2013 |
| DE | 112007002365 | 10/2015 |
| DE | 102014116957 | 5/2016 |
| EP | 2688159 | 1/2014 |
| FR | 3021761 | 12/2015 |
| JP | H5-167446 | 7/1993 |
| JP | 2005-294409 | 10/2005 |
| JP | 2007-013158 | 1/2007 |
| JP | 2007-514305 | 5/2007 |
| JP | 2011-254028 | 12/2011 |
| JP | 2015-521386 | 7/2015 |
| JP | 2016-502269 | 1/2016 |
| JP | 2016-517546 | 6/2016 |
| KR | 20120039221 | 4/2012 |
| KR | 10-2015-0086374 | 7/2015 |
| WO | 2007/100752 | 9/2007 |
| WO | 2009/056588 | 5/2009 |
| WO | 2013/140159 | 9/2013 |
| WO | 2016/062942 | 4/2016 |
| WO | 2017/190930 | 11/2017 |
| WO | 2019/092702 | 5/2019 |

OTHER PUBLICATIONS

An International Preliminary Report on Patentability dated May 12. 2020, which issued during the prosecution of Applicant's PCT/IL2018/051184.

U.S. Appl. No. 62/702,957, filed Jul. 25, 2018.

U.S. Appl. No. 62/684,341, filed Jun. 13, 2018.

U.S. Appl. No. 62/594,167, filed Dec. 4, 2017.

An Office Action dated Mar. 16, 2022, which issued during the prosecution of U.S. Appl. No. 16/761,944.

Search Report and Writen Opinion dated Jul. 14, 2021 which issued during the prosecution of Applicant's Singapore App No. 11202004119Y.

An Office Action dated Aug. 2, 2022, which issued during the prosecution of U.S. Appl. No. 16/761,944.

Notice of Allowance dated Feb. 3, 2023, which issued during the prosecution of U.S. Appl. No. 16/761,944.

An Office Action dated Jul. 31, 2023, which issued during the prosecution of Israel Patent Application No. 300562.

An Office Action dated Jul. 12, 2022, which issued during the prosecution of Israel Patent Application No. 289719.

English Summary of An Office Action dated Sep. 1, 2021, which issued during the prosecution of Israel Patent Application No. 258936.

English Summary of An Office Action dated Mar. 7, 2021, which issued during the prosecution of Israel Patent Application No. 255496.

An Office Action together with the English translation dated Nov. 25, 2021 which issued during the prosecution of Korean Patent Application No. 10-2020-7015914.

Antier, Marie, et al. "kHz closed loop interferometric technique for coherent fiber beam combining." IEEE Journal of Selected Topics in Quantum Electronics 20.5 (2014): 182-187.

An Office Action dated Feb. 23, 2022, which issued during the prosecution of India Patent Application No. 202047023325.

An Office Action dated Mar. 13, 2023, which issued during the prosecution of India Patent Application No. 202248046267.

An Office Action together with the English translation dated Feb. 21, 2023 which issued during the prosecution of Chinese Patent Application No. 201880078614.8.

Hearing Notice dated May 8, 2023, which issued during the prosecution of India Patent Application No. 202047023325.

An Office Action dated Feb. 8, 2022 which issued during the prosecution of Japanese Patent Application No. 2020-544703.

European Search Report dated Jul. 15, 2021 which issued during the prosecution of Applicant's European App No. 18876787.5.

(56) References Cited

OTHER PUBLICATIONS

An Office Action dated Jan. 9, 2023 which issued during the prosecution of Applicant's European App No. 18876787.5.
An Office Action dated Jul. 10, 2023 which issued during the prosecution of Japanese Patent Application No. 2022-149174.
An Office Action dated Oct. 19, 2023 which issued during the prosecution of Japanese Patent Application No. 2022-149174.
Search Report dated Sep. 22, 2023 which issued during the prosecution of Applicant's Singapore App No. 10202205147X.
An Office Action dated Sep. 29, 2024, which issued during the prosecution of U.S. Appl. No. 18/129,214.

* cited by examiner

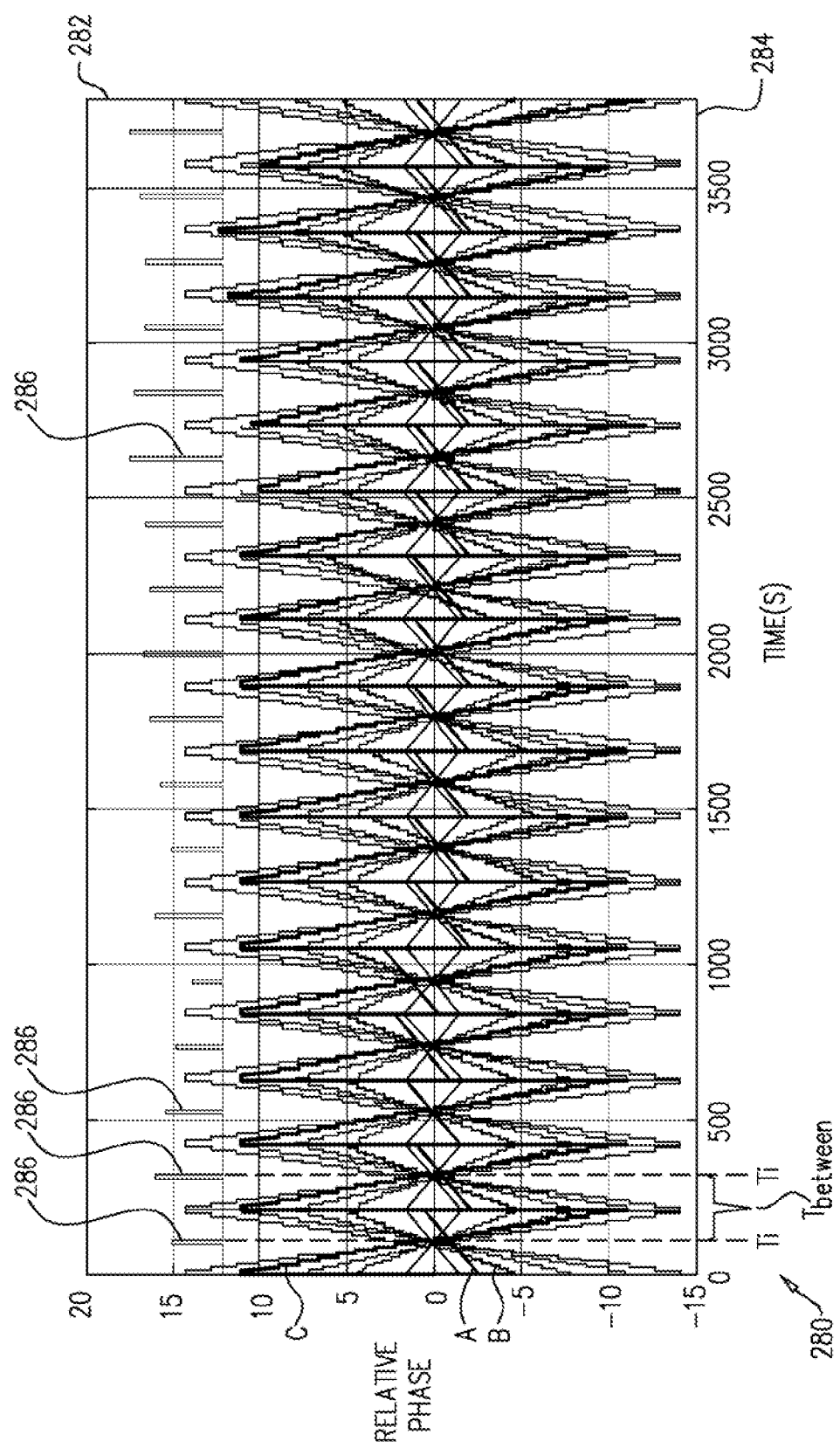

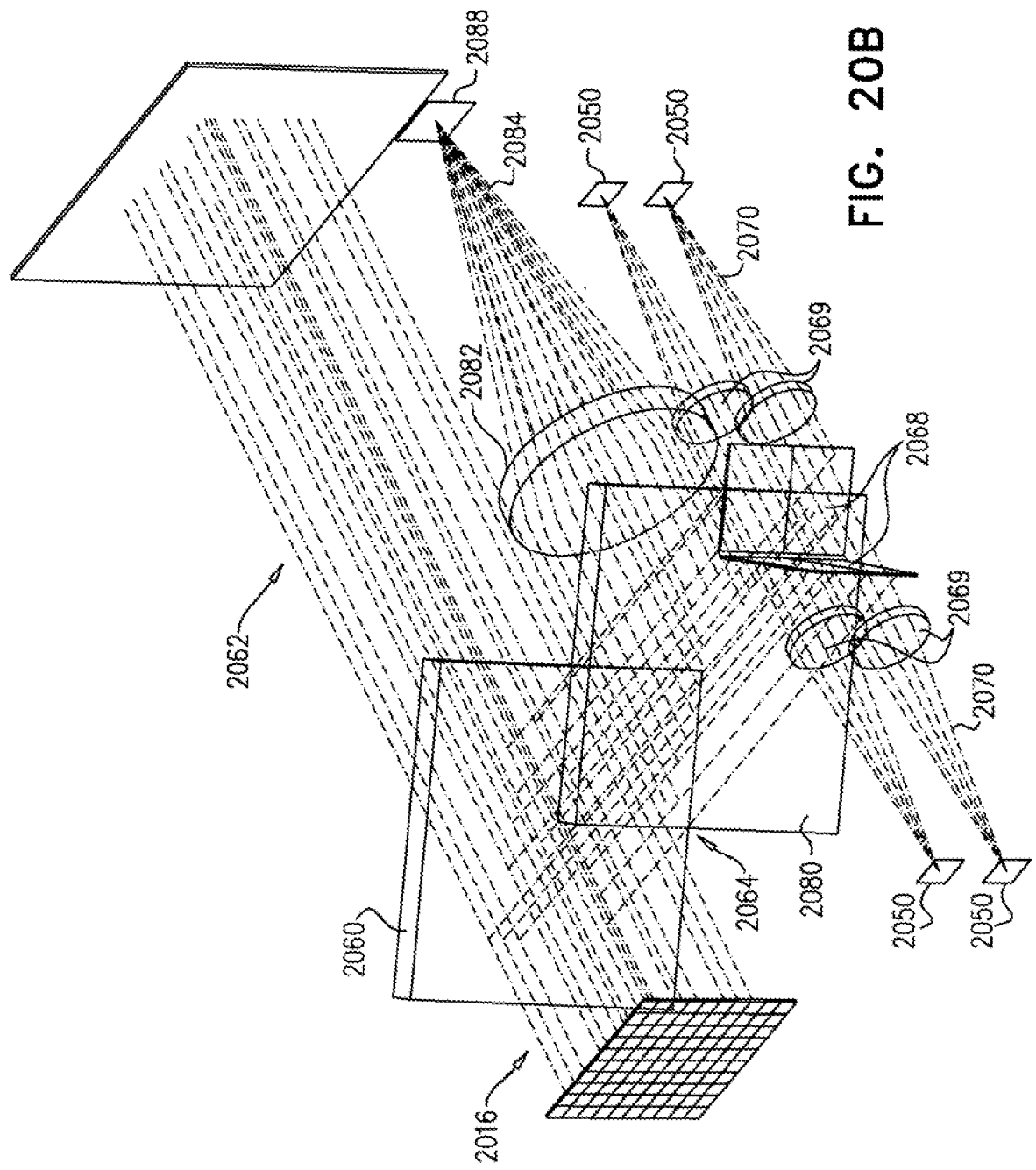

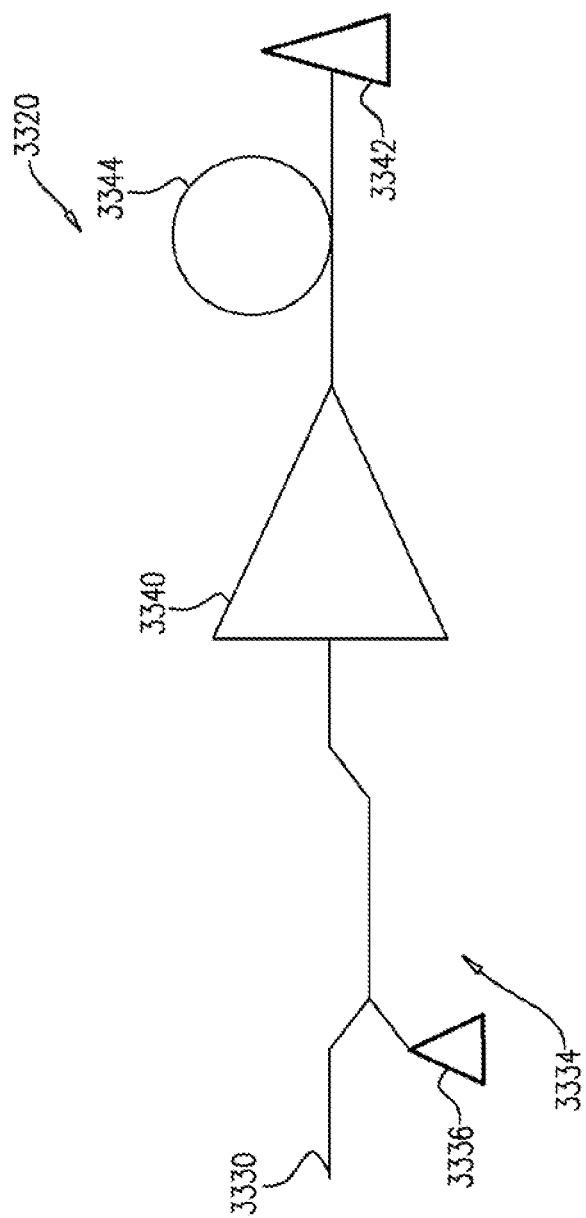

OPTICAL PHASED ARRAY DYNAMIC BEAM SHAPING WITH NOISE CORRECTION

RELATED APPLICATIONS

Reference is hereby made to Israel Patent Application No. 255496, entitled OPTICAL PHASED ARRAY DYNAMIC BEAM SHAPING WITH NOISE CORRECTION, filed Nov. 7, 2017; to Israel Patent Application No. 256107, entitled 'SEED LASER FAILURE PROTECTION SYSTEM', filed Dec. 4, 2017; to U.S. Provisional Patent Application No. 62/594,167, entitled 'LASER BACK-REFLECTION PROTECTION USING OPTICAL PHASED ARRAY LASER', filed Dec. 4, 2017; to Israel Patent Application No. 258936, entitled 'SCALED PHASE MODIFICATION, PHASE CALIBRATION AND SEED LASER PROTECTION IN OPTICAL PHASED ARRAY', filed Apr. 25, 2018; to U.S. Provisional Patent Application No. 62/684,341, entitled 'MULTIPLE DETECTORS AND CORRESPONDING MULTIPLE CLOSELY SPACED OPTICAL PATHWAYS IN OPTICAL PHASED ARRAY LASER', filed Jun. 13, 2018; and to U.S. Provisional Patent Application No. 62/702,957, entitled 'DETECTOR MASK IN OPTICAL PHASED ARRAY LASER', filed Jul. 28, 2018, the disclosures of all of which are hereby incorporated by reference and priorities of all of which are hereby claimed pursuant to 37 CFR 1.78(a)(4) and (5)(i).

Reference is also made to U.S. Pat. No. 9,893,494, the disclosure of which is hereby incorporated by reference.

FIELD OF THE INVENTION

The present invention relates generally to laser coherent beam combining and more particularly to optical phased arrays.

BACKGROUND OF THE INVENTION

Various types of optical phased arrays are known in the art.

SUMMARY OF THE INVENTION

The present invention seeks to provide systems and methods relating to noise correction and phase modification in dynamically shaped beams produced by laser optical phased arrays.

There is thus provided in accordance with a preferred embodiment of the present invention a laser system including a seed laser, a laser beam splitting and combining subsystem receiving an output from the seed laser and providing a combined laser output having noise and a noise cancellation subsystem operative to provide a noise cancellation phase correction output based on taking into consideration the noise at intermittent times, the laser beam splitting and combining subsystem varying a phase of the combined laser output during time interstices between the intermittent times.

There is further provided in accordance with another preferred embodiment of the present invention a laser system including a seed laser, a laser beam splitting and combining subsystem receiving an output from the seed laser and providing a combined laser output having noise and a noise cancellation subsystem operative to provide a noise cancellation phase correction output, based on taking into consideration the noise at a noise sampling rate, the laser beam splitting and combining subsystem varying a phase of the combined laser output at a phase varying rate which exceeds the noise sampling rate.

Preferably, at least one of the noise sampling rate and the phase varying rate changes over time.

Preferably, the noise sampling rate is predetermined.

In accordance with a preferred embodiment of the present invention, the laser beam splitting and combining subsystem varies a phase of the combined laser output to provide spatial modulation of the combined laser output.

Preferably, the spatial modulation of the combined laser output is provided in combination with mechanical spatial modulation of the combined laser output, the spatial modulation in combination with the mechanical spatial modulation being faster than the mechanical spatial modulation in the absence of the spatial modulation.

Additionally or alternatively, the spatial modulation of the combined laser output is provided in combination with mechanical spatial modulation of the combined laser output, the spatial modulation in combination with the mechanical spatial modulation being more precise than the mechanical spatial modulation in the absence of the spatial modulation.

Preferably, the spatial modulation includes modulation of at least one of a shape and a diameter of the combined laser output.

Preferably, the laser beam splitting and combining subsystem provides laser beam amplification downstream of the splitting and upstream of the combining.

In accordance with a further preferred embodiment of the present invention, the noise cancellation phase correction output is calculated based on sequentially applying at least two phase changes to at least one constituent beam of the combined laser output and identifying one phase change of the at least two phase changes corresponding to a maximum output intensity of the at least one constituent beam.

Preferably, the system also includes at least one detector cooperatively coupled to the noise cancellation subsystem for detecting at least a portion of the combined laser output.

Preferably, the at least one detector performs the detecting continuously.

In accordance with an additionally preferred embodiment of the present invention, the noise cancellation phase correction output cancels intensity noise in the combined laser output.

Preferably, the system also includes at least one intensity modulator for varying an intensity of the combined laser output.

In accordance with a still additionally preferred embodiment of the present invention, the noise cancellation phase correction output cancels position noise in the combined laser output.

Preferably, the system also includes at least one position modulator for varying a position of the combined laser output.

Preferably, a laser cutting system includes the laser system of the present invention.

Additionally or alternatively, a laser additive manufacturing system includes the laser system of the present invention.

Still additionally or alternatively, a laser welding system includes the laser system of the present invention.

Further additionally or alternatively, a free-space optical communication system includes the laser system of the present invention.

There is also provided in accordance with a preferred embodiment of the present invention a method for performing noise correction on a phase varied laser output including receiving an output from a seed laser, splitting and combining the output to provide a combined laser output having noise, applying a noise cancellation phase correction output to the combined laser output based on taking into consideration the noise at intermittent time, and varying a phase of the combined laser output during time interstices between the intermittent times.

There is further provided in accordance with another preferred embodiment of the present invention a method for performing noise correction on a phase varied laser output including receiving an output from a seed laser, splitting and combining the output to provide a combined laser output having noise, applying a noise cancellation phase correction output to the combined laser output, based on taking into consideration the noise at a noise sampling rate, and varying a phase of the combined laser output at a phase varying rate which exceeds the noise sampling rate.

Preferably, at least one of the noise sampling rate and the phase varying rate changes over time.

Preferably, the noise sampling rate is predetermined.

In accordance with a preferred embodiment of the present invention, the varying of the phase provides spatial modulation of the combined laser output.

Preferably, the spatial modulation of the combined laser output is provided in combination with mechanical spatial modulation of the combined laser output, the spatial modulation in combination with the mechanical spatial modulation being faster than the mechanical spatial modulation in the absence of the spatial modulation.

Additionally or alternatively, the spatial modulation of the combined laser output is provided in combination with mechanical spatial modulation of the combined laser output, the spatial modulation in combination with the mechanical spatial modulation being more precise than the mechanical spatial modulation in the absence of the spatial modulation.

Preferably, the spatial modulation includes modulation of at least one of a shape and a diameter of the combined laser output.

Preferably, the method also includes amplifying the output, downstream of the splitting and upstream of the combining.

In accordance with another preferred embodiment of the present invention, the method also includes calculating the noise cancellation phase correction output based on sequentially applying at least two phase changes to at least one constituent beam of the combined laser output and identifying one phase change of the at least two phase changes corresponding to a maximum output intensity of the at least one constituent beam.

Preferably, the method also includes detecting at least a portion of the combined laser output.

Preferably, the detecting is performed continuously.

In accordance with yet another preferred embodiment of the present invention, the noise cancellation phase correction output cancels intensity noise in the combined laser output.

Preferably, the method also includes modulating an intensity of the output, downstream of the splitting and upstream of the combining.

In accordance with still another preferred embodiment of the present invention, the noise cancellation phase correction output cancels position noise in the combined laser output.

Preferably, the method also includes modulating a position of the output, downstream of the splitting and upstream of the combining.

Preferably, a method for laser cutting includes the method of the present invention.

Additionally or alternatively, a method for additive manufacturing includes the method of the present invention.

Further additionally or alternatively, a method for laser welding includes the method of the present invention.

Still further additionally or alternatively, a method for free space optical communication includes the method of the present invention.

There is also provided in accordance with another preferred embodiment of the present invention a laser system including a seed laser, a laser beam splitting and combining subsystem receiving an output from the seed laser and providing a combined laser output, the laser beam splitting and combining subsystem varying a phase of the combined laser output, a plurality of detectors detecting the combined laser output at intermittent times during the varying of the phase of the combined laser output and a plurality of optical pathways between the combined laser output and the plurality of detectors for providing therealong the combined laser output to the plurality of detectors, a spatial density of the plurality of optical pathways being greater than a spatial density of the plurality of detectors.

Preferably, the combined laser output has noise and the laser system also includes a noise cancellation subsystem operative to provide a noise cancellation phase correction output based on taking into consideration the noise of the combined laser output, as detected by the plurality of detectors at the intermittent times during the varying of the phase of the combined laser output.

Preferably, the plurality of optical pathways includes a plurality of optical fibers, ends of the optical fibers being arranged with the spatial density greater than the spatial density of the plurality of detectors.

Preferably, ones the plurality of optical pathways are interspaced by a distance of 20-1000 microns.

Preferably, ones of the plurality of detectors are interspaced by a distance of 5-50 mm.

There is additionally provided in accordance with another preferred embodiment of the present invention method for detecting a laser output including receiving an output from a seed laser, splitting and combining the output to provide a combined laser output, varying a phase of the combined laser output and providing the combined laser output to a plurality of detectors along a plurality of optical pathways, a spatial density of the plurality of optical pathways being greater than a spatial density of the plurality of detectors.

Preferably, the combined laser output has noise and the method also includes providing a noise cancellation phase correction output based on taking into consideration the noise of the combined laser output, as detected by the plurality of detectors during the varying of the phase of the combined laser output.

Preferably, the plurality of optical pathways includes a plurality of optical fibers, ends of the optical fibers being arranged with the spatial density greater than the spatial density of the plurality of detectors.

Preferably, ones the plurality of optical pathways are interspaced by a distance of 20-1000 microns.

Preferably, ones of the plurality of detectors are interspaced by a distance of 5-50 mm.

There is further provided in accordance with yet another preferred embodiment of the present invention a laser system including a seed laser, a laser beam splitting and combining subsystem receiving an output from the seed laser and providing a combined laser output, the laser beam splitting and combining subsystem varying a phase of the combined laser output, at least one detector detecting the combined laser output during the varying of the phase of the combined laser output and an optical mask including at least one of a transmissive region and a reflective region for respectively providing therethrough and therefrom the combined laser output to the at least one detector.

Preferably, at least one of the transmissive region and the reflective region is configured in accordance with at least one of a shape and a trajectory of the combined laser output.

Preferably, the system also includes a focusing subsystem interfacing the optical mask and the at least one detector for focusing the combined laser output onto the at least one detector.

Preferably, the focusing subsystem includes at least one focusing lens.

Preferably, the at least one detector includes a single detector.

In accordance with a preferred embodiment of the present invention, the transmissive region has non-uniform transparency.

Preferably, the non-uniform transparency of the transmissive region compensates for non-noise related non-uniformity in intensity of the combined laser output.

Preferably, the optical mask includes an electrically modulated device and the at least one of the transmissive region and the reflective region is electronically modifiable.

Preferably, the optical mask includes an LCD screen.

In accordance with another preferred embodiment of the present invention, the reflective region has non-uniform reflectivity.

Preferably, the non-uniform reflectivity of the reflective region compensates for non-noise related non-uniformity in intensity of the combined laser output.

Preferably, the reflective region includes a DMM.

Preferably, the combined laser output has noise and the laser system also includes a noise cancellation subsystem operative to provide a noise cancellation phase correction output based on taking into consideration the noise of the combined laser output, as detected by the at least one detector during the varying of the phase of the combined laser output.

There is still further provided in accordance with still a further preferred embodiment of the present invention a method for detecting a laser output including receiving an output from a seed laser, splitting and combining the output to provide a combined laser output, varying a phase of the combined laser output, providing, by an optical mask, the combined laser output to at least one detector, the optical mask including at least one of a transmissive region and a reflective region for respectively providing therethrough and therefrom the combined laser output to the at least one detector and detecting, by the at least one detector, the combined laser output during the varying of the phase.

Preferably, the at least one of the transmissive region and the reflective region is configured in accordance with at least one of a shape and a trajectory of the combined laser output.

Preferably, the method also includes focusing the combined laser output onto the at least one detector.

Preferably, the method also includes providing a focusing lens interfacing the optical mask and the at least one detector, for performing the focusing.

Preferably, the at least one detector includes a single detector.

In accordance with a preferred embodiment of the present invention, the transmissive region has non-uniform transparency.

Preferably, the non-uniform transparency of the transmissive region compensates for non-noise related non-uniformity in intensity of the combined laser output.

Preferably, the optical mask includes an electrically modulated device and the at least one of the transmissive region and the reflective region is electronically modifiable.

Preferably, the optical mask includes an LCD screen.

In accordance with another preferred embodiment of the present invention, the reflective region has non-uniform reflectivity.

Preferably, the non-uniform reflectivity of the reflective region compensates for non-noise related non-uniformity in intensity of the combined laser output.

Preferably, the reflective region includes a DMM.

Preferably, the combined laser output has noise and the method also includes providing a noise cancellation phase correction output based on taking into consideration the noise of the combined laser output, as detected by the at least one detector during the varying of the phase of the combined laser output.

There is also provided in accordance with yet another preferred embodiment of the present invention a laser system including a seed laser, a laser splitting and combining subsystem receiving an output from the seed laser and combining the output to provide a combined laser output, a phase modulation subsystem for varying a phase of the combined laser output and a voltage-to-phase correlation subsystem for correlating a voltage applied to the phase modulation subsystem to a phase modulating output produced by the phase modulation subsystem and for providing a voltage-to-phase correlation output useful in calibrating the phase modulation subsystem, the correlating being performed periodically during the varying of the phase.

Preferably, the phase modulation subsystem includes a plurality of phase modulators.

Preferably, the voltage is applied to the plurality of phase modulators by a phase modulation control module.

Preferably, the voltage includes a voltage intended to produce a phase shift of the combined laser output of $2\pi$.

Preferably, the correlating includes measuring a change in intensity of a far-field intensity pattern of the combined laser output following application of the voltage and deriving a relationship between the voltage and a phase shift corresponding to the change in intensity.

Preferably, the voltage is sequentially applied to ones of the plurality of phase modulators.

Preferably, the correlating is performed at a slower rate than the varying of the phase.

Preferably, the varying of the phase is performed at a rate of 1 million times per second and the correlating is performed at a rate of once per second.

There is additionally provided in accordance with an additionally preferred embodiment of the present invention a method for performing phase calibration of a laser system including receiving an output from a seed laser, splitting and combining the output to provide a combined laser output, varying a phase of the combined laser output by a phase modulation subsystem, periodically during the varying of the phase, applying a voltage to the phase modulation subsystem and correlating the voltage to a phase modulating output produced by the phase modulation subsystem and providing a voltage-to-phase correlation output useful in calibrating the phase modulation subsystem.

Preferably, the phase modulation subsystem includes a plurality of phase modulators.

Preferably, applying the voltage is performed by a phase modulation control module.

Preferably, the voltage includes a voltage intended to produce a phase shift of the combined laser output of $2\pi$.

Preferably, the correlating includes measuring a change in intensity of a far-field intensity pattern of the combined laser output following application of the voltage and deriving a relationship between the voltage and a phase shift corresponding to the change in intensity.

Preferably, the method also includes sequentially applying the voltage to ones of the plurality of phase modulators.

Preferably, the correlating is performed at a slower rate than the varying of the phase.

Preferably, the varying of the phase is performed at a rate of 1 million times per second and the correlating is performed at a rate of once per second.

There is also provided in accordance with another preferred embodiment of the present invention a laser system including a seed laser, a laser beam splitting and combining subsystem receiving an output from the seed laser, splitting the output into a plurality of sub-beams and providing a combined laser output including the plurality of sub-beams and a phase modulation subsystem grouping at least a portion of ones of the plurality of sub beams into a multiplicity of groups of sub-beams, the phase modulation subsystem in parallel across the multiplicity of groups of sub-beams, varying a phase of each sub-beam within each group relative to phases of other sub-beams within the group so as to vary a phase of each group, and varying the phase of each group relative to phases of other ones of the multiplicity of groups, thereby varying a phase of the combined laser output.

Preferably, the phase modulation subsystem includes at least one cylindrical lens for performing the grouping.

Alternatively, the phase modulation subsystem includes an array of mirrors and corresponding focusing lenses for performing the grouping.

Preferably, the phase modulation subsystem includes a plurality of phase modulators for varying the phases of the sub-beams.

Preferably, the phase modulation subsystem includes at least one electronic control module in operative control of the plurality of phase modulators.

Preferably, the phase modulation subsystem includes a multiplicity of detectors corresponding to the multiplicity of groups, for detecting a far field intensity pattern of each of the multiplicity of groups.

In accordance with a preferred embodiment of the present invention, the system also includes a multiplicity of optical masks masking corresponding ones of the multiplicity of detectors, each optical mask including at least one of a transmissive region and a reflective region for respectively providing therethrough and therefrom the far field intensity pattern to the corresponding detector of the multiplicity of detectors.

Preferably, the multiplicity of detectors performs the detecting at least partially mutually simultaneously.

Preferably, the phase modulation subsystem includes an additional auxiliary detector for detecting a combined far field intensity pattern of the multiplicity of groups.

Preferably, the phase modulation subsystem includes a multiplicity of additional phase modulators, each additional phase modulator being common to all sub-beams within each the group for varying the phase of each group relative to phases of other ones of the multiplicity of groups.

Preferably, the phase modulation subsystem includes an additional electronic control module in operative control of the multiplicity of additional phase modulators.

In accordance with another preferred embodiment of the present invention, each detector of the multiplicity of detectors includes a plurality of detectors.

Preferably, the system also includes a plurality of optical pathways between the far field intensity pattern of each of the multiplicity of groups and each plurality of detectors for providing the far field intensity pattern therealong to the plurality of detectors, a spatial density of the plurality of optical pathways being greater than a spatial density of the plurality of detectors.

Preferably, the varying of the phase of the combined laser output includes maximizing an intensity of the combined laser output.

Preferably, the varying of the phase of the combined laser output provides spatial modulation of the combined laser output, without involving mechanical spatial modulation of the combined laser output.

Preferably, the laser beam splitting and combining subsystem provides laser beam amplification downstream of the splitting and upstream of the combining.

There is further provided in accordance with still another preferred embodiment of the present invention a method for performing phase variation of a laser output including receiving a laser output from a seed laser, splitting the laser output into a plurality of sub-beams and combining the plurality of sub-beams to provide a combined laser output, grouping at least a portion of ones of the plurality of sub-beams into a multiplicity of groups of sub-beams, in parallel across the multiplicity of groups of sub-beams, varying a phase of each sub-beam within each group relative to phases of other sub-beams within the group so as to vary a phase of each group and varying the phase of each group relative to phases of other ones of the multiplicity of groups, thereby varying a phase of the combined laser output.

Preferably, the grouping is performed by at least one cylindrical lens.

Alternatively, the grouping is performed by an array of mirrors and corresponding focusing lenses.

Preferably, the varying of the phases of the sub-beams is performed by a plurality of phase modulators.

Preferably, the method also includes controlling the plurality of phase modulators by at least one electronic control module.

Preferably, the method also includes detecting a far field intensity pattern of each of the multiplicity of groups, by a corresponding multiplicity of detectors.

In accordance with a preferred embodiment of the present invention, the method includes providing, by a multiplicity of optical masks, the far field intensity pattern to corresponding ones of the multiplicity of detectors, each optical mask including at least one of a transmissive region and a reflective region for respectively providing therethrough and therefrom the far field intensity pattern to the corresponding detector of the multiplicity of detectors.

Preferably, the detecting is performed at least partially mutually simultaneously for the multiplicity of groups.

Preferably, the method also includes detecting a combined far field intensity pattern of the multiplicity of groups, by an auxiliary detector.

Preferably, the varying of the phase of each group relative to phases of other ones of the multiplicity of groups is performed by a multiplicity of additional phase modulators, each additional phase modulator being common to all sub-beams within each the group.

Preferably, the method also includes controlling the multiplicity of additional phase modulators by an additional electronic control module.

In accordance with another preferred embodiment of the present invention, each detector of the multiplicity of detectors includes a plurality of detectors.

Preferably, the method also includes providing the far field intensity pattern of each of the multiplicity of groups to each plurality of detectors along a plurality of optical pathways, a spatial density of the plurality of optical pathways being greater than a spatial density of the plurality of detectors.

Preferably, the varying of the phase of the combined laser output includes maximizing an intensity of the combined laser output.

Preferably, the varying of the phase of the combined laser output provides spatial modulation of the combined laser output, without involving mechanical spatial modulation of the combined laser output.

Preferably, the method also includes amplifying the laser output downstream of the splitting and upstream of the combining.

There is still further provided in accordance with another preferred embodiment of the present invention a laser system including an optical phased array laser including a seed laser and a laser beam splitting and combining subsystem receiving a laser output from the seed laser and providing a combined laser output, the laser beam splitting and combining subsystem varying a phase of the combined laser output to focus the combined laser output on a substrate, the combined laser output not being focused on the substrate in the absence of the varying of the phase.

Preferably, the system also includes an optical element receiving the combined laser output from the laser beam splitting and combining subsystem and focusing the combined laser output at a focal point not coincident with the substrate.

Preferably, laser beams back-scattered from the substrate are not focused on the optical phased array laser.

There is yet further provide in accordance with still another preferred embodiment of the present invention a method for focusing of laser beams in a laser system including receiving a laser output from a seed laser, splitting and combining the laser output to provide a combined laser output and varying a phase of the combined laser output to focus the combined laser output on a substrate, the combined laser output not being focused on the substrate in the absence of the varying of the phase.

Preferably, the method also includes focusing the combined laser output, by an optical element, at a focal point not coincident with the substrate.

Preferably, laser beams back-scattered from the substrate are not focused on the laser system.

There is additionally provided in accordance with a still additionally preferred embodiment of the present invention a laser amplifier system including a seed laser providing a laser output, an amplifying subsystem receiving the laser output from the seed laser along a first optical path and providing an amplified laser output and a detector subsystem receiving the laser output from the seed laser along a second optical path, the detector subsystem being operative to deactivate the amplifying subsystem upon detection by the detector subsystem of at least one fault in the laser output, a first time of flight of the laser output along the first optical path from the seed laser to the amplifying subsystem being greater than a combination of a second time of flight of the laser output along the second optical path from the seed laser to the detector subsystem and a time taken for the detector subsystem to deactivate the amplifying subsystem.

Preferably, the first optical path includes a coiled optical fiber.

Preferably, the at least one fault includes at least one of reduction of power of the laser output and degradation of line width of the laser output.

Preferably, the amplifying subsystem includes a power amplifier and the laser amplifier system includes a MOPA.

There is yet additionally provided in accordance with yet an additionally preferred embodiment of the present invention a method for preventing damage to an amplifying subsystem in a laser system including receiving a laser output from a seed laser along a first optical path, amplifying the laser output to provide an amplified laser output, receiving a laser output from the seed laser along a second optical path, detecting at least one fault in the laser output received along the second optical path and stopping the amplifying upon the detecting of the at least one fault in the laser output, a first time of flight of the laser output along the first optical path being greater than a combination of a second time of flight of the laser output along the second optical path and a time taken for the stopping of the amplifying to be implemented.

Preferably, the first optical path includes a coiled optical fiber.

Preferably, the at least one fault includes at least one of reduction of power of the laser output and degradation of line width of the laser output.

Preferably, the amplifying subsystem includes a power amplifier and the laser amplifier system includes a MOPA.

There is also provided in accordance with still another preferred embodiment of the present invention a laser amplifier system including a seed laser providing a laser output, a first amplifier arranged to receive the laser output from the seed laser, the first amplifier providing a first amplified laser output upon receipt of the laser output from the seed laser and providing one of amplified spontaneous emission and an additional laser output upon cessation of receipt of the laser output from the seed laser and a second amplifier receiving one of the first amplified laser output, the amplified spontaneous emission and the additional laser output from the first amplifier and providing a second amplified laser output, amplification provided by the second amplifier being greater than amplification provided by the first amplifier.

Preferably, the system also includes a filter structure downstream of the seed laser and upstream of the first amplifier.

Preferably, the filter structure includes a beam splitter splitting the laser output along a first and a second optical path, the first optical path being longer than the second optical path, a detector detecting a combined laser output from the first and second optical paths, an electronic control module coupled to the detector, for receiving an output from the detector and a phase control module located along one of the first and second optical paths, the phase control module being operated by the electronic control module to modify a phase of the laser output responsive to detection by the detector of interference in the combined laser output.

There is further provided in accordance with a still further preferred embodiment of the present invention a method for preventing damage to an amplifier in a laser system including receiving a laser output from a seed laser, providing, by a first amplifier, a first amplified laser output upon receipt of the laser output from the seed laser, providing, by the first amplifier, one of amplified spontaneous emission and an additional laser output upon cessation of the receipt of the laser output from the seed laser and receiving, by a second amplifier, one of the first amplified laser output, the amplified spontaneous emission and the additional laser output and providing a second amplified laser output, the second amplified laser output being greater than the first amplified laser output.

Preferably, the method also includes filtering the laser output downstream from the seed laser and upstream from the first amplifier.

Preferably, the filtering includes splitting the laser output along a first and a second optical path, the first optical path being longer than the second optical path, detecting, by a detector, a combined laser output from the first and second optical paths, receiving, by an electronic control module, an output from the detector and modifying a phase of the laser output along one of the first and second optical paths, responsive to detection by the detector of interference in the combined laser output.

There is still further provided in accordance with another preferred embodiment of the present invention a laser amplifier system including a seed laser providing a first laser output having a first power, an amplifying subsystem receiving the first laser output from the seed laser and providing an amplified laser output and an auxiliary laser subsystem providing a second laser output at least upon cessation of the first laser output, the second laser output having a second power lower than the first power.

Preferably, the auxiliary laser subsystem includes an additional seed laser providing the second laser output to the amplifying subsystem at least concurrently with the providing of the first laser output.

Alternatively, the amplifying subsystem includes an entry at which the first laser output is received and an exit at which the amplified laser output is provided and the laser amplifier system includes a first reflection grating positioned at the entry and a second reflection grating positioned at the exit, the first and second reflection gratings in combination with the amplifying subsystem including the auxiliary laser subsystem.

Preferably, the first and second reflection gratings are reflective in a wavelength range of 1090 nm-1100 nm.

Preferably, the second laser output is of a different wavelength than the first laser output.

Preferably, the system also includes a filter downstream of the seed laser and upstream of the amplifying subsystem.

Preferably, the filter includes a beam splitter splitting the first laser output along a first optical path and a second optical path, the first optical path being longer than the second optical path, a detector detecting a combined laser output from the first and second optical paths, an electronic control module coupled to the detector, for receiving an output from the detector and a phase control module located along one of the first and second optical paths, the phase control module being operated by the electronic control module to modify a phase of the first laser output responsive to detection by the detector of interference in the combined laser output.

Preferably, the system also includes a detector subsystem for detecting the first laser output from the seed laser.

Preferably, the detector subsystem includes a splitter splitting the first laser output into a first portion and a second portion, an additional amplifier amplifying the second portion and providing an amplified output and an optical fiber receiving the amplified output, the optical fiber being configured to exhibit non-linear effects upon a line width of the first laser output becoming unacceptably narrow.

Preferably, the optical fiber has a length of 25 m and a core diameter of 6 microns.

There is yet additionally provided in accordance with another preferred embodiment of the present invention a method for preventing damage to an amplifier in a laser system including providing a first laser output having a first power, amplifying the first laser output by an amplifier, to provide an amplified laser output and providing a second laser output at least upon cessation of the providing of the first laser output, the second laser output having a second power lower than the first power.

Preferably, the providing of the second laser output is performed at least concurrently with the providing of the first laser output.

Preferably, the amplifier includes an entry at which the first laser output is received and an exit at which the amplified laser output is provided, and also including positioning a first reflection grating at the entry and a second reflection grating at the exit, the first and second reflection gratings in combination with the amplifier providing the second laser output.

Preferably, the first and second reflection gratings are reflective in a wavelength range of 1090 nm-1100 nm.

Preferably, the second laser output is of a different wavelength than the first laser output.

Preferably, the method also includes filtering the first laser output upstream of the amplifying of the first laser output.

Preferably, the method includes splitting the first laser output along a first and a second optical path, the first optical path being longer than the second optical path, detecting by a detector a combined laser output from the first and second optical paths, receiving, by an electronic control module, an output from the detector and modifying a phase of the first laser output along one of the first and second optical paths, based on the output from the detector and responsive to detection by the detector of interference in the combined laser output.

Preferably, the method also includes detecting the first laser output.

Preferably, the detecting includes splitting the first laser output into a first portion and a second portion, amplifying the second portion and providing an amplified output and receiving the amplified output by an optical fiber, the optical fiber being configured to exhibit non-linear effects upon a line width of the first laser output becoming unacceptably narrow.

Preferably, the optical fiber has a length of 25 m and a core diameter of 6 microns.

BRIEF DESCRIPTION OF THE DRAWINGS

The present invention will be understood and appreciated more fully based on the following detailed description taken in conjunction with the drawings in which:

FIGS. 2B and 2C are simplified graphical representations of phase variation and noise correction in a system of the type illustrated in FIG. 2A;

FIGS. 20A and 20B are simplified top and perspective views of an optical phased array laser system including scaled phase modification of dynamic beams of a type illustrated in FIG. 18 or FIG. 19;

FIG. 33 is a simplified schematic illustration of a sensor useful in a laser amplification system of any of the types illustrated in FIGS. 24-32.

DETAILED DESCRIPTION OF PREFERRED EMBODIMENTS

Figure 1A:
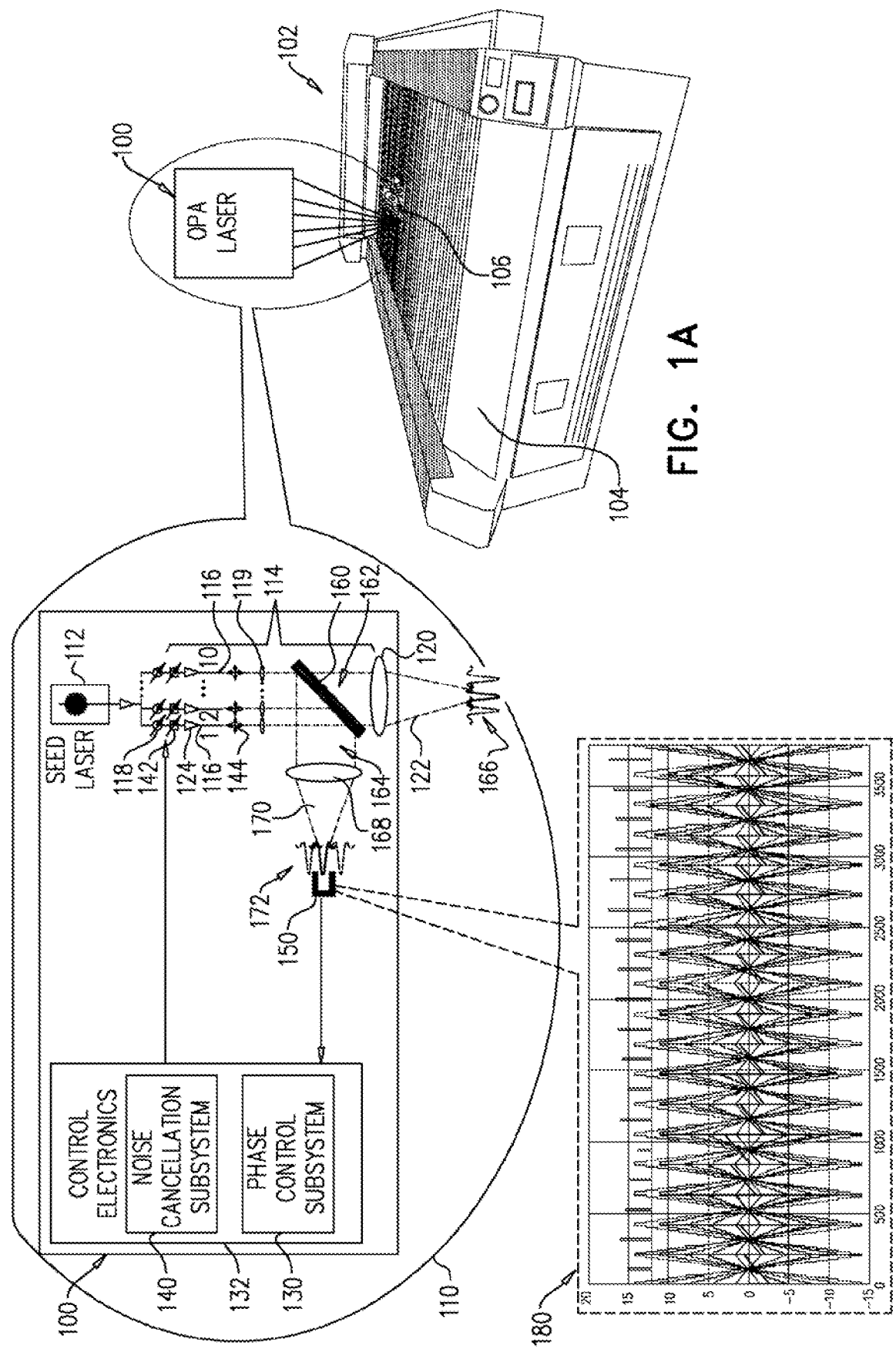
FIG. 1A is a simplified schematic illustration of an optical phased array laser system for noise corrected dynamic beam shaping, constructed and operative in accordance with a preferred embodiment of the present invention.
Figure 1B:
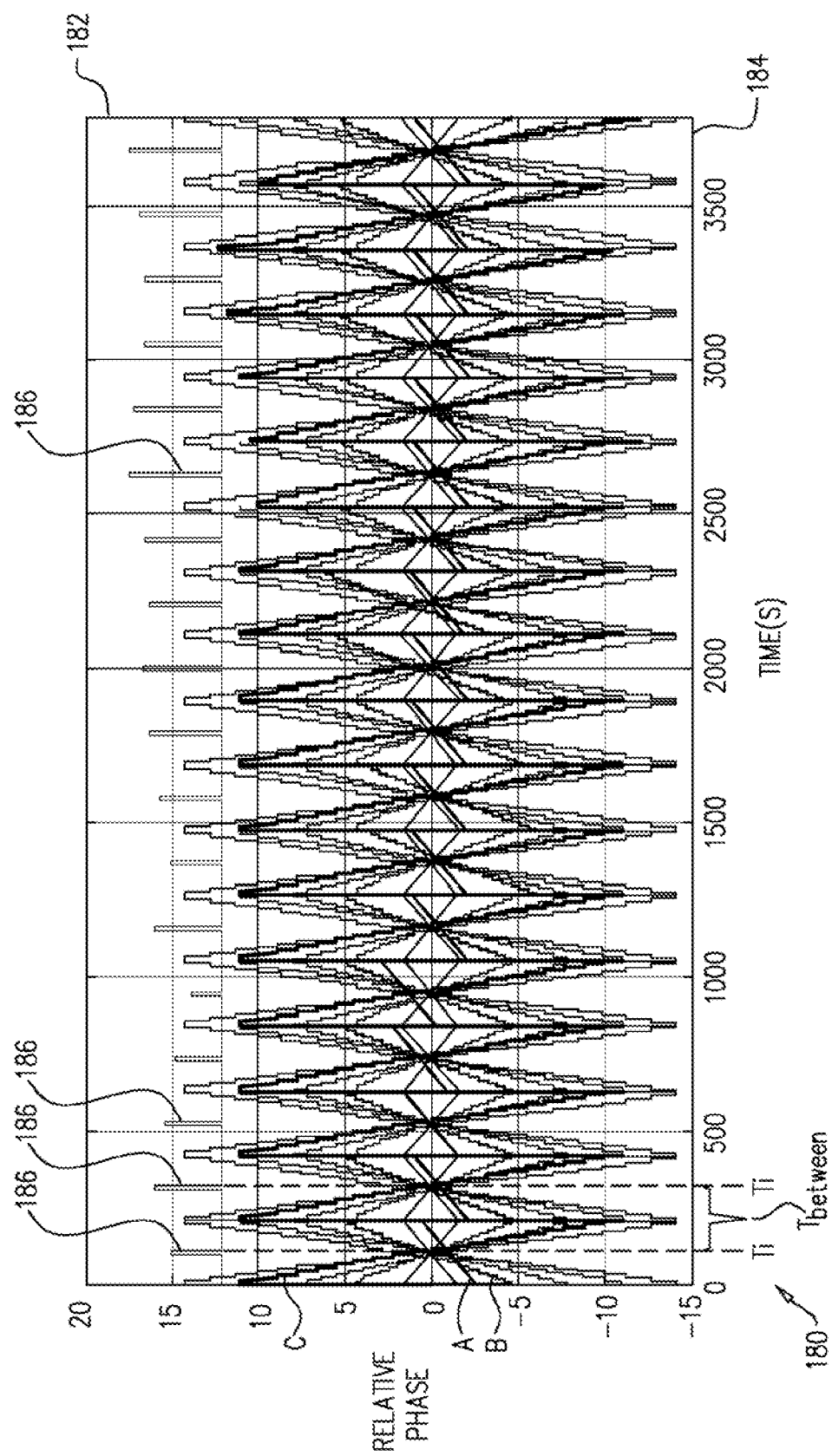
FIGS. 1B and 1C are simplified graphical representations of phase variation and noise correction in a system of the type illustrated in FIG. 1A.
Figure 1C:
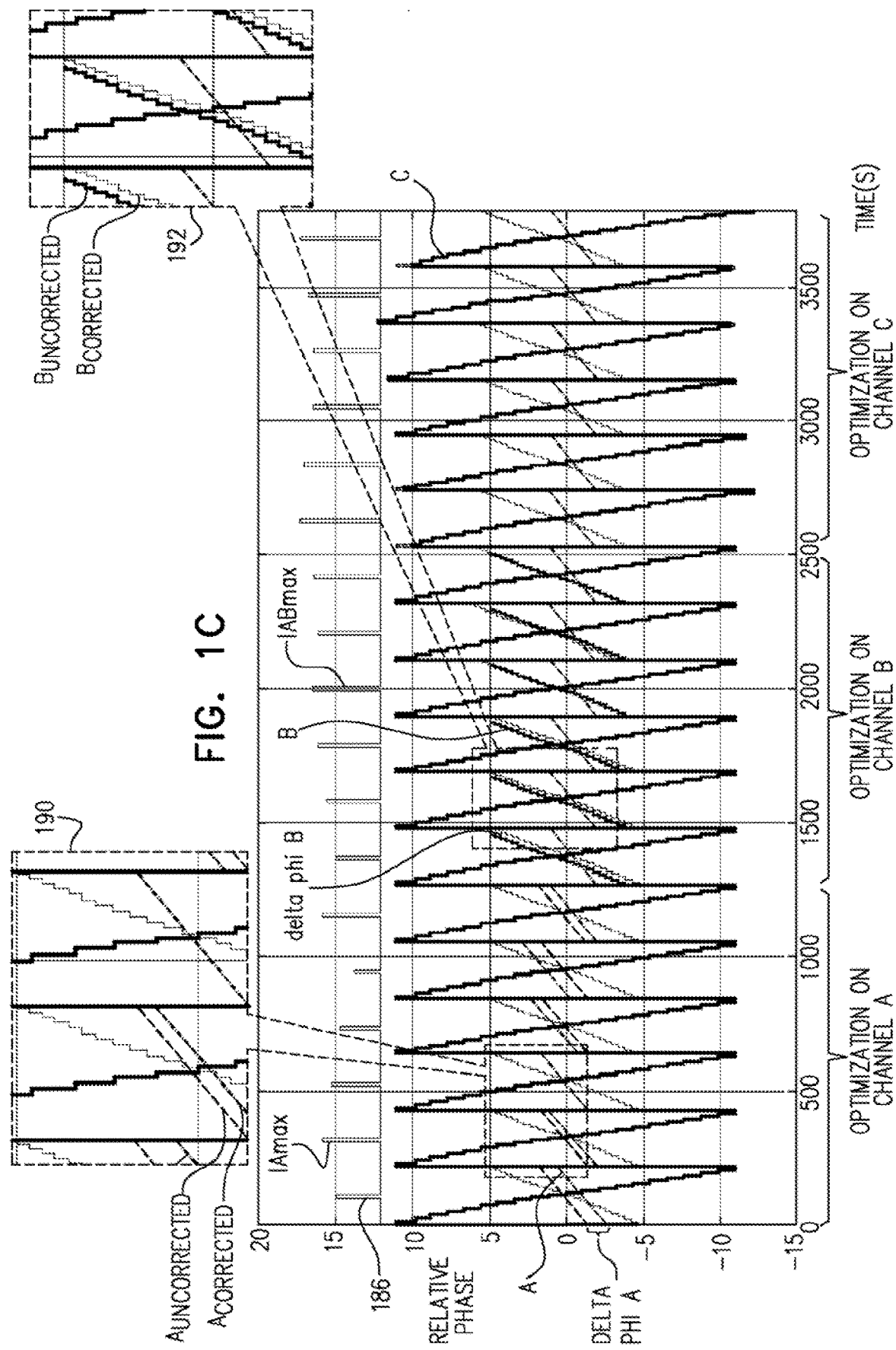

Reference is now made to FIG. 1A, which is a simplified schematic illustration of an optical phased array laser system for noise corrected dynamic beam shaping, constructed and operative in accordance with a preferred embodiment of the present invention; and to FIGS. 1B and 1C, which are simplified graphical representations of phase variation and noise correction in a system of the type illustrated in FIG. 1A.

As seen in FIG. 1A, there is provided an optical phased array (OPA) laser system 100, here shown to be employed, by way of example, within a laser cutting system 102. Laser cutting system 102 may include OPA laser system 100 mounted in spaced relation to a multi-axis positioning table 104, upon which table 104 an item, such as an item 106, may be cut using laser system 100, as is detailed henceforth. It is understood that although laser cutting system 102 is illustrated herein in the context of table 104, system 102 may be embodied as any type of laser cutting system, as will be appreciated by one skilled in the art As best seen at an enlargement 110, OPA laser 100 preferably comprises a seed laser 112 and a laser beam splitting and combining subsystem 114. Splitting and combining subsystem 114 preferably receives an output laser beam from seed laser 112 and splits the output laser beam into a plurality of sub-beams along a corresponding plurality of channels 116. Here, by way of example only, an output from seed laser 112 is shown to be split into ten sub-beams along ten channels 116 although it is appreciated that splitting and combining subsystem 114 may include a fewer or greater number of channels along which the output of seed laser 112 is split, and typically may include a far greater number of channels such as 32 or more channels.

The relative phase of each sub-beam may be individually modulated by a phase modulator 118, preferably located along each of channels 116. Each phase modulated sub-beam produced by the splitting and subsequent phase modulation of the output of seed laser 112 preferably propagates towards a collimating lens 119. The individually collimated, phase modulated sub-beams are subsequently combined, for example at a focal lens 120, to form an output beam 122.

Splitting and combining subsystem 114 may also provide laser amplification of the sub-beams, preferably following the splitting of the output beam of seed laser 112 into sub-beams and prior to the combining of the sub-beams to form output beam 122. Here, by way of example, splitting and combining subsystem 114 is shown to include a plurality of optical amplifiers 124 located along corresponding ones of channels 116 for amplifying each sub-beam. It is appreciated, however, that such amplification is optional and may be omitted, depending on the power output requirements of OPA laser 100.

The phase of output beam 122, and hence the position and shape of the far-field intensity pattern thereof, is controlled, at least in part, by the relative phases of the constituent sub-beams combined to form output beam 122. In many applications, such as laser cutting as illustrated in FIG. 1A, it is desirable to dynamically move and shape the far-field intensity pattern of the output beam. This may be achieved in laser system 100 by laser splitting and combining subsystem 114 dynamically varying the relative phases of the individual sub-beams and thereby varying the phase of the combined laser output 122 so as dynamically to control the position and shape of the far-field intensity pattern thereof.

The relative phases of the sub-beams are preferably predetermined in accordance with the desired laser output pattern for the cutting of item 106. Particularly preferably, the varying relative phases are applied by a phase control subsystem 130. Phase control subsystem 130 preferably forms a part of a control electronics module 132 in OPA laser 100 and preferably controls each phase modulator 118 so as to dynamically modulate the relative phases of the sub-beams along channels 116.

Due to noise inherent in OPA system 100, output beam 122 has noise. Noise in output beam 122 is typically phase noise created by thermal or mechanical effects and/or by the amplification process in the case that optical amplifiers 124 are present in OPA system 100. It is a particular feature of a preferred embodiment of the present invention that laser system 100 includes a noise cancellation subsystem 140 operative to provide a noise cancellation phase correction output in order to cancel out the noise in output beam 122 in a manner detailed henceforth.

Particularly preferably, noise cancellation subsystem 140 employs an algorithm to sense and correct phase noise in the combined laser output. The noise cancellation phase correction output is preferably provided by noise cancellation subsystem 140 to phase modulator 118 so as to correct phase noise in output beam 122 and thus avoid distortion of the shape and position of the far field intensity pattern of output beam 122 that would otherwise be caused by the noise. Noise cancellation subsystem 140 may be included in control electronics module 132.

It is understood that output beam 122 may be additionally or alternatively affected by types of noise other than phase noise, including intensity noise. In the case of output beam 122 having intensity noise, noise cancellation subsystem 140 may be operative to provide a noise cancellation phase correction output in order to cancel out the intensity noise in output beam 122. In such a case, OPA laser system 100 may optionally additionally include intensity modulators 142 along channels 116 for modulating the intensity of each of the sub-beams along channels 116.

It is understood that output beam 122 may be additionally or alternatively affected by mechanical noise which may affect the relative position of the sub-beams. In the case of output beam 122 having position noise, noise cancellation subsystem 140 may be operative to provide a noise cancellation phase correction output in order to cancel out the position noise in output beam 122. In such a case, OPA laser system 100 may optionally additionally include position modulators 144 along channels 116 for modulating the position of each of the sub-beams along channels 116.

In order to facilitate application of phase variation and noise correction to output beam 122, a portion of the output of OPA laser 100 is preferably extracted and directed towards at least one detector, here illustrated as a single detector 150. Detector 150 may alternatively be embodied as multiple detectors, as detailed henceforth with reference to FIGS. 6-8 and 15-21. The extracted portion of the output beam preferably functions as a reference beam, based on characteristics of which the required noise correction and/or phase variation may be calculated. In the embodiment shown in FIG. 1A, plurality of sub-beams along channels 116 are directed towards a beam splitter 160. Beam splitter 160 preferably splits each sub-beam into a transmitted portion 162 and a reflected portion 164 in accordance with a predetermined ratio. For example, beam splitter 160 may split each sub-beam with a 99.9% transmitted: 0.01% reflected ratio.

The transmitted portion 162 of the sub-beams preferably propagates towards focal lens 120, at which focal lens 120 the sub-beams are combined to form output beam 122 having a far-field intensity pattern 166 incident on a surface of item 106. The reflected portion 164 of the sub-beams is preferably reflected towards an additional focal lens 168, at which additional focal lens 168 the sub-beams are combined to form an output reference beam 170 having a far-field intensity pattern 172 incident on a surface of detector 150.

It is understood that the particular structure and configuration of beam splitting and recombining elements shown herein, including beam splitter 160 and focal lenses 120 and 168, is exemplary only and depicted in a highly simplified form. It is appreciated that OPA laser system 100 may include a variety of such elements, as well as additional optical elements, including, by way of example only, additional or alternative lenses, optical fibers and coherent free-space far-field combiners.

As described hereinabove, the shape and position of far-field intensity pattern 166 of the output beam 122 and correspondingly of far-field intensity pattern 172 of the reference beam 170 are constantly changing, due to the ongoing variation of the relative phases of the sub-beams. As a result, far-field intensity pattern 172 is not fixed upon detector 150 but rather is constantly being moved around with respect to detector 150 depending on the combined relative phases of the constituent sub-beams. However, in order for detector 150 to provide the required noise cancellation phase correction output, far-field intensity pattern 172 must be incident upon detector 150 in order for detector to measure the intensity of far-field intensity pattern 172 and hence apply a noise correction accordingly, resulting in a fixed output beam.

The conflict between the dynamic nature of far-field intensity pattern 172 due to the phase-variation thereof and the fixed nature required of far-field intensity pattern 172 in order to derive and apply noise correction thereto, is advantageously resolved in the present invention by providing the noise cancellation and phase variation at mutually different times and rates.

The noise cancellation phase correction output is provided based on taking into consideration noise measured at detector 150 at a noise sampling rate. The output beam 122 is controlled in such a way that the far-field intensity pattern 172 is incident upon detector 150 during the course of the dynamic changes to the shape and position of output and reference far-field intensity patterns 166, 172 at a rate that is equal to or higher than the required noise sampling rate. The noise in reference beam 170 is taken into consideration during those intermittent times at which the far-field intensity pattern 172 is returned to detector 150.

At time interstices between the intermittent times at which far-field intensity pattern 172 is incident upon detector 150, the phase of the combined output beams 122 and 170 is varied in order to dynamically change the shape and position of the far-field intensity pattern thereof as required to perform laser cutting of item 106. The combined laser output is varied at a phase varying rate which exceeds the noise sampling rate, in order to rapidly change the phase and hence shape and position of the far-field intensity pattern. By way of example, the noise sampling rate may be of the order of 10-1000 Hz whereas the phase varying rate may be greater than 10,000 Hz.

The different rates and time scales over which the noise cancellation and phase variation are preferably performed in embodiments of the present invention may be best understood with reference to a graph 180 seen in FIG. 1A and an enlarged version thereof shown in FIG. 1B.

As seen most clearly in FIG. 1B, graph 180 includes an upper portion 182 displaying variation in intensity over time of far-field intensity pattern 172 as measured at detector 150 and a lower portion 184, displaying variation over the same time period of the relative phases of a number of sub-beams contributing to output beam 122 and reference beam 170. For the sake of simplicity, the relative phases of ten sub-beams are displayed in graph 180, although it is appreciated that OPA system 100 and hence the explanation provided herein is applicable to a fewer or, more typically, a far greater number of sub-beams.

As seen in upper portion 182, intensity peaks 186 represent measured intensity of the reference beam 170 when the far field intensity pattern 172 passes over detector 150. As seen in lower portion 184, intensity peaks 186 occur at intermittent times $T_i$ at which the relative phase of each sub-beam is zero, meaning that there is no shift in phase between the sub-beams, the position of the combined output beam is therefore not being changed and the far field intensity pattern 172 is hence directly incident on the detector 150. It is understood that detector 150 may alternatively be positioned such that the relative phase of the sub-beams thereat is non-zero. Furthermore, more than a single detector may be employed so as to allow measurement of the far field intensity pattern 172 at more than one location therealong, as detailed henceforth with reference to FIGS. 6-8 and 15-21.

Between intensity peaks 186 the measured intensity is close to zero, as the far-field intensity pattern 172 is moved to the either side of detector 150 and thus is not directly incident on the detector 150. As appreciated from consideration of upper portion 182, the magnitude of intensity peaks 186 is not constant due to the presence of noise in the laser output beam, which noise degrades the far field intensity pattern 172.

As seen in lower portion 184, the relative phases of the sub-beams are varied at time interstices $T_{between}$ between intermittent times $T_i$. In the phase variation function illustrated herein, the relative phases of the sub-beams are shown to be varied in a periodic, regularly repeating pattern, with equal phase shifts being applied in the positive and negative directions. It is appreciated that such a simplistic pattern is illustrative only and that the phase variation is not necessarily regularly repeating, nor necessarily symmetrical in positive and negative directions. Furthermore, it is understood that time interstices $T_{between}$ preferably but not necessarily do not overlap with intermittent times $T_i$. Additionally, it is appreciated that at least one of the phase varying rate and the noise sampling rate may be constant or may change over time.

Noise cancellation subsystem 140 preferably operates by taking into consideration the noise at intermittent times $T_i$ and providing a noise cancellation phase correction output based on the noise sensed at intermittent times $T_i$. Noise cancellation subsystem 140 preferably employs an algorithm in order to sense noise and correct for the sensed noise accordingly.

According to one exemplary embodiment of the present invention, noise cancellation subsystem 140 employs an algorithm in which the relative phase of one channel is changed in such a way that the relative phase is modified by a given phase change $\Delta\varphi$ during each cycle of travel of the far-field intensity pattern 172 with respect to detector 150. Following a number of such cycles, in which a different phase change Δφ is applied to the selected sub-beam over each cycle, the algorithm ascertains the maximum output intensity over all of the cycles and finds the optimum phase change Δφ that produced this maximum intensity. The phase change of the selected sub-beam is then fixed at the optimum phase change Δφ for subsequent cycles and the algorithm proceeds to optimize another sub-beam.

Graph 180 illustrates noise cancellation according to this exemplary algorithm in three sub-beams or channels A, B and C of the total of 10 sub-beams. Sub-beams A, B and C are displayed alone in FIG. 1C for the sake of clarity. It is appreciated that the line style of the traces representing phase variation and noise correction of sub-beams A, B and C respectively is modified in FIG. 1C in comparison to FIGS. 1A and 1B, in order to aid differentiation between the various sub-beams for the purposes of the explanation hereinbelow.

As seen initially in the case of channel A, and appreciated most clearly from consideration of an enlargement 190, the dashed trace represents the pattern of variation in relative phase of sub-beam A, as would be applied by phase control sub-system 130 in the absence of any noise correction. This trace may be termed $A_{uncorrected}$. The dotted-and dashed trace represents the actual relative phase of sub-beam A as modified by the noise correction algorithm in order to find the optimum phase noise correction. This trace may be termed $A_{corrected}$. The modified relative phase of $A_{corrected}$ is shifted with respect to the non-modified relative phase of $A_{uncorrected}$ by a different $\Delta\varphi_A$ over the first five cycles of sub-beam A. The intensity 186 measured at detector 150 varies over the first five cycles of optimization of sub-beam A due to the deliberate change in relative phase shift.

Following the first five cycles of sub-beam A, the algorithm ascertains the maximum intensity and finds the phase change $\Delta\varphi_A$ that produces the maximum intensity. In this case, the maximum intensity is seen to be $IA_{max}$ produced by the second phase shift $\Delta\varphi_A$. The phase change applied to relative phase variation of sub-beam A is thus fixed at the second phase shift $\Delta\varphi_A$ for subsequent cycles and the algorithm proceeds to optimize sub-beam B.

It is appreciated that during the sequential cycles of optimization of sub-beam A, the relative phases of the remainder of the sub-beams are varied as usual, each at a phase varying rate that far exceeds the noise sampling rate at which the noise in sub-beam A is taken into consideration.

As seen further in the case of sub-beam B, and appreciated most clearly from consideration of an enlargement 192, the thicker trace during optimization of channel B represents the pattern of variation in relative phase of sub-beam B, as would be applied by phase control sub-system 130 in the absence of any noise correction. This trace may be termed $B_{uncorrected}$. The thinner trace during optimization of channel B represents the actual relative phase of sub-beam B as modified by the noise correction algorithm in order to find the optimum phase noise correction. This trace may be termed $B_{corrected}$. The modified relative phase of $B_{corrected}$ is shifted with respect to the non-modified relative phase of $B_{uncorrected}$ by a different $\Delta\varphi_B$ over five cycles of optimization sub-beam B. The intensity 186 measured at detector 150 varies over these five cycles of optimization sub-beam B due to the deliberate change in relative phase shift.

Following these five cycles of sub-beam B, the algorithm ascertains the maximum intensity and finds the phase change $\Delta\varphi_B$ that produces the maximum intensity. In this case, the maximum intensity is seen to be $IAB_{max}$ produced by the fourth phase shift $\Delta\varphi_B$. The phase change applied to relative phase variation of sub-beam B is then fixed at the fourth phase shift $\Delta\varphi_B$ for subsequent cycles and the algorithm proceeds to optimize sub-beam C.

It is appreciated that during the five cycles of optimization of sub-beam B, the relative phases of the remainder of the sub-beams are varied as usual, each at a phase varying rate that far exceeds the noise sampling rate at which the noise in sub-beam B is taken into consideration.

A similar optimization process is preferably implemented for sub-beam C, in which a phase change $\Delta\varphi_C$ is applied over several cycles in order to optimize the output beam intensity and correct for intensity degradation thereof due to phase noise in sub-beam C.

At least one detector 150 may operate continuously in order to continuously optimize the relative phases of the sub-beams and correct for phase noise therein. However, due to a finite response time of detector 150, detector 150 only takes into consideration the noise in reference beam 170 at intermittent times, at a relatively slow noise sampling rate. The noise sampling rate is preferably but not necessarily predetermined. The noise sampling rate may alternatively be random.

It is appreciated that the particular parameters of the noise correction algorithm depicted in graph 180 are exemplary only and may be readily modified, as will be understood by one skilled in the art. For example, the phase shift Δφ may be optimized over a greater or fewer number of cycles than illustrated herein, each sub-beam may be fully optimized each time the sub-beam passes over detector 150 or several sub-beams or all of the sub-beams may be optimized during each cycle in which the far-field intensity pattern passes over detector 150. Furthermore, non-sequential noise correction optimization algorithms may alternatively be implemented, including, but not limited to, Stochastic parallel gradient descent optimization algorithms.

The use of dynamically shaped, noise corrected optical phased array output beams for laser cutting is highly advantageous and enables rapid beam steering, fast power modulation, fast beam focusing and beam shape tailoring. Both the speed and quality with which a material may be cut are improved using dynamically shaped, noise corrected optical phase array output in comparison to conventional laser cutting methods. It is appreciated that but for the provision of noise correction, in accordance with preferred embodiments of the present invention, the shape and position of the optical phased array output beam would be degraded, thereby degrading the quality, speed and precision of the laser cutting process.

In order to maintain output beam intensity as the far-field intensity pattern of the beam moves, as is advantageous in certain laser cutting applications, movement of the output beam may be controlled such that the beam spends more time at lower-intensity positions so as to compensate for reduced power delivery thereat. Additionally or alternatively, an intensity profile mask such as a neutral density (ND) filter may be applied to the output beam in order to modify the intensity thereof.

Figure 2A:
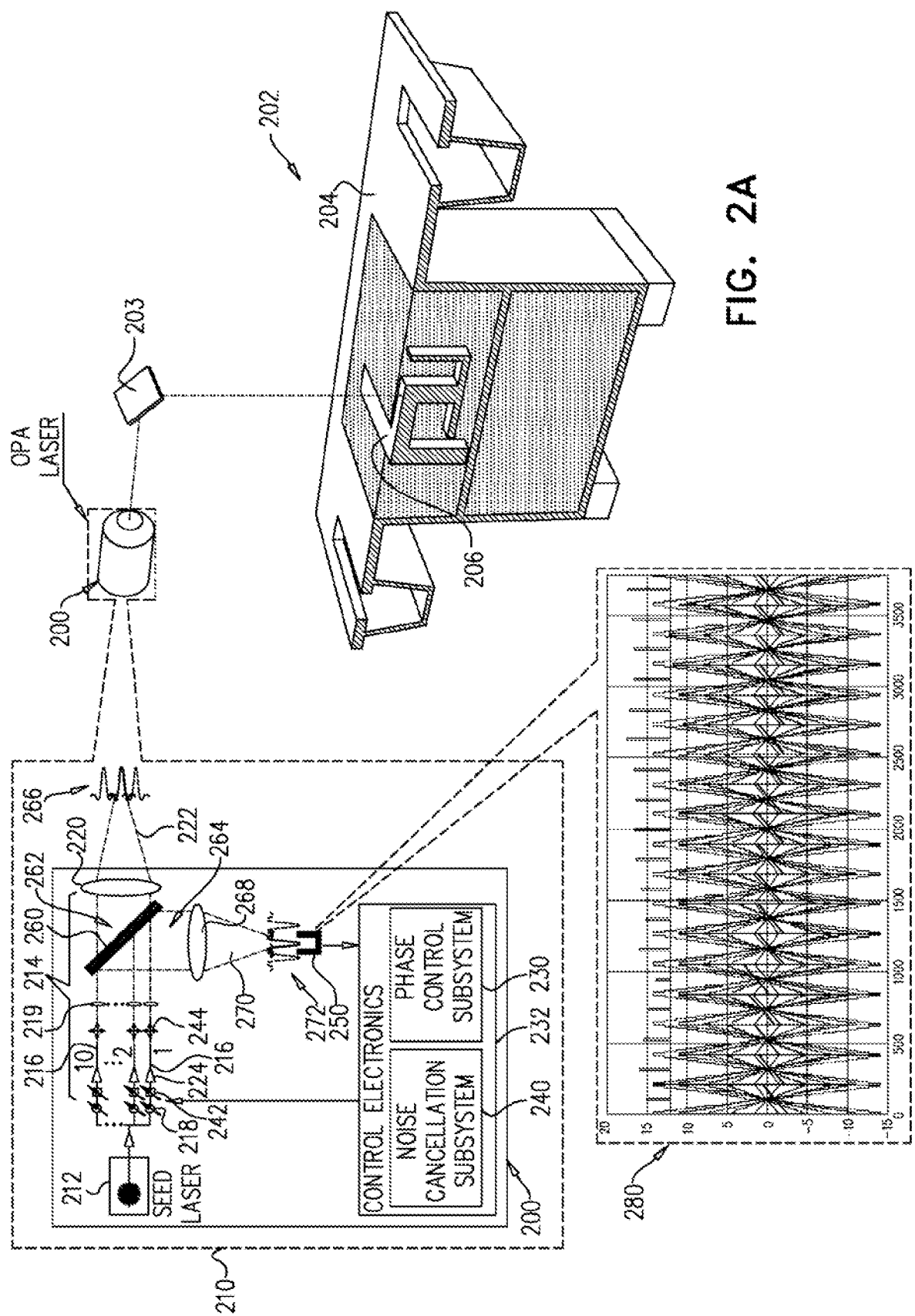
FIG. 2A is a simplified schematic illustration of an optical phased array laser system for noise corrected dynamic beam shaping, constructed and operative in accordance with another preferred embodiment of the present invention.
Figure 2C:
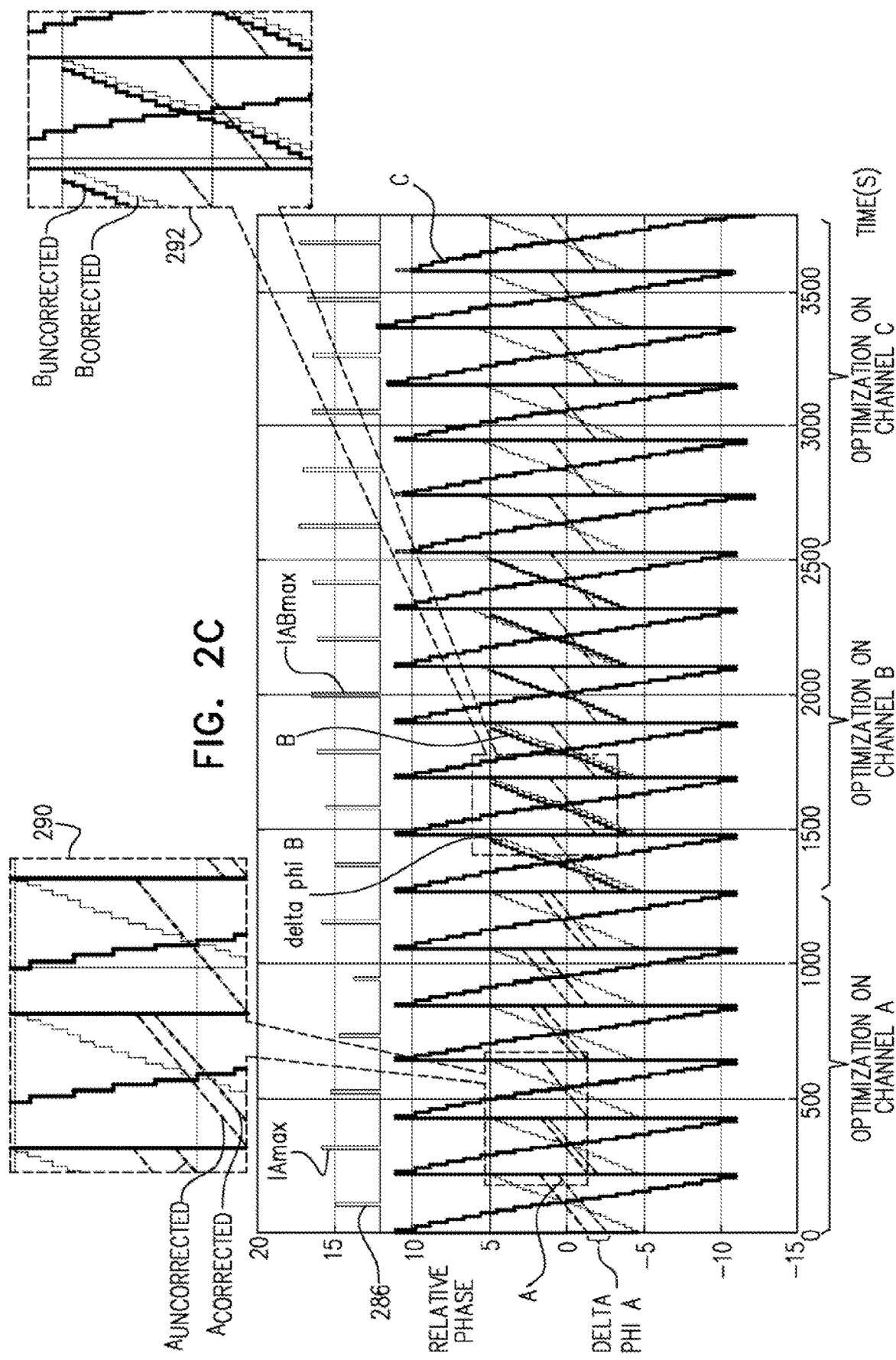

Reference is now made to FIG. 2A, which is a simplified schematic illustration of an optical phased array laser system for noise corrected dynamic beam shaping, constructed and operative in accordance with another preferred embodiment of the present invention; and to FIGS. 2B and 2C, which are simplified graphical representations of phase variation and noise correction in a system of the type illustrated in FIG. 2A.

As seen in FIG. 2A, there is provided an optical phased array (OPA) laser system 200, here shown to be employed, by way of example, within an additive manufacturing system 202. Additive manufacturing system 202 may include OPA laser system 200 mounted in spaced relation to a scanning mirror 203 and multi-axis positioning table 204, upon which table 204 an item, such as an item 206, may be additively manufactured using laser system 200. It is understood that although additive manufacturing system 202 is illustrated herein in the context of scanning mirror 203, system 202 may be embodied as any type of additive manufacturing system, as will be appreciated by one skilled in the art.

As best seen at an enlargement 210, OPA laser 200 preferably comprises a seed laser 212 and a laser beam splitting and combining subsystem 214. Splitting and combining subsystem 214 preferably receives an output laser beam from seed laser 212 and splits the output laser beam into a plurality of sub-beams along a corresponding plurality of channels 216. Here, by way of example only, an output from seed laser 212 is shown to be split into ten sub-beams along ten channels 216 although it is appreciated that splitting and combining subsystem 214 may include a fewer or greater number of channels along which the output of seed laser 212 is split, and typically may include a far greater number of channels such as 32 or more channels.

The relative phase of each sub-beam may be individually modulated by a phase modulator 218, preferably located along each of channels 216. Each phase modulated sub-beam produced by the splitting and subsequent phase modulation of the output of seed laser 212 preferably propagates towards a collimating lens 219. The individually collimated, phase modulated sub-beams are subsequently combined, for example at a focal lens 220, to form an output beam 222.

Splitting and combining subsystem 214 may also provide laser amplification of the sub-beams, preferably following the splitting of the output beam of seed laser 212 into sub-beams and prior to the combining of the sub-beams to form output beam 222. Here, by way of example, splitting and combining subsystem 214 is shown to include a plurality of optical amplifiers 224 located along corresponding ones of channels 216 for amplifying each sub-beam. It is appreciated, however, that such amplification is optional and may be omitted, depending on the power output requirements of OPA laser 200.

The phase of output beam 222, and hence the position and shape of the far-field intensity pattern thereof, is controlled, at least in part, by the relative phases of the constituent sub-beams combined to form output beam 222. In many applications, such as laser additive manufacturing as illustrated in FIG. 2A, it is desirable to dynamically move and shape the far-field intensity pattern of the output beam. This may be achieved in laser system 200 by laser splitting and combining subsystem 214 dynamically varying the relative phases of the individual sub-beams and thereby varying the phase of the combined laser output 222 so as dynamically to control the position and shape of the far-field intensity pattern thereof.

The relative phases of the sub-beams are preferably predetermined in accordance with the desired laser output pattern for the 3D printing of item 206. Particularly preferably, the varying relative phases are applied by a phase control subsystem 230. Phase control subsystem 230 preferably forms a part of a control electronics module 232 in OPA laser 200 and preferably controls each phase modulator 218 so as to dynamically modulate the relative phases of the sub-beams along channels 216.

Due to noise inherent in OPA system 200, output beam 222 has noise. Noise in output beam 222 is typically phase noise created by thermal or mechanical effects and/or by the amplification process in the case that optical amplifiers 224 are present in OPA system 200. It is a particular feature of a preferred embodiment of the present invention that laser system 200 includes a noise cancellation subsystem 240 operative to provide a noise cancellation phase correction output in order to cancel out the noise in output beam 222 in a manner detailed henceforth.

Particularly preferably, noise cancellation subsystem 240 employs an algorithm to sense and correct phase noise in the combined laser output. The noise cancellation phase correction output is preferably provided by noise cancellation subsystem 240 to phase modulator 218 so as to correct phase noise in output beam 222 and thus avoid distortion of the shape and position of the far field intensity pattern of output beam 222 that would otherwise be caused by the noise. Noise cancellation subsystem 240 may be included in control electronics module 232.

It is understood that output beam 222 may be additionally or alternatively affected by types of noise other than phase noise, including intensity noise. In the case of output beam 222 having intensity noise, noise cancellation subsystem 240 may be operative to provide a noise cancellation phase correction output in order to cancel out the intensity noise in output beam 222. In such a case, OPA laser system 200 may optionally additionally include intensity modulators 242 along channels 216 for modulating the intensity of each of the sub-beams along channels 216.

It is understood that output beam 222 may be additionally or alternatively affected by mechanical noise which may affect the relative position of the sub-beams. In the case of output beam 222 having position noise, noise cancellation subsystem 240 may be operative to provide a noise cancellation phase correction output in order to cancel out the position noise in output beam 222. In such a case, OPA laser system 200 may optionally additionally include position modulators 244 along channels 216 for modulating the position of each of the sub-beams along channels 216.

In order to facilitate application of phase variation and noise correction to output beam 222, a portion of the output of OPA laser 200 is preferably extracted and directed towards at least one detector, here illustrated as a single detector 250. Detector 250 may alternatively be embodied as multiple detectors, as detailed henceforth with reference to FIGS. 6-8 and 15-21. The extracted portion of the output beam preferably functions as a reference beam, based on characteristics of which the required noise correction and/or phase variation may be calculated. In the embodiment shown in FIG. 2A, plurality of sub-beams along channels 216 are directed towards a beam splitter 260. Beam splitter 260 preferably splits each sub-beam into a transmitted portion 262 and a reflected portion 264 in accordance with a predetermined ratio. For example, beam splitter 260 may split each sub-beam with a 99.9% transmitted: 0.01% reflected ratio.

The transmitted portion 262 of the sub-beams preferably propagates towards focal lens 220, at which focal lens 220 the sub-beams are combined to form output beam 222 having a far-field intensity pattern 266 incident on scanning mirror 203. The reflected portion 264 of the sub-beams is preferably reflected towards an additional focal lens 268, at which additional focal lens 268 the sub-beams are combined to form an output reference beam 270 having a far-field intensity pattern 272 incident on a surface of detector 250.

It is understood that the particular structure and configuration of beam splitting and recombining elements shown herein, including beam splitter 260 and focal lenses 220 and 268, is exemplary only and depicted in a highly simplified form. It is appreciated that OPA laser system 200 may include a variety of such elements, as well as additional optical elements, including, by way of example only, additional or alternative lenses, optical fibers and coherent free-space far-field combiners.

As described hereinabove, the shape and position of far-field intensity pattern 266 of the output beam 222 and correspondingly of far-field intensity pattern 272 of the reference beam 270 are constantly changing, due to the ongoing variation of the relative phases of the sub-beams. As a result, far-field intensity pattern 272 is not fixed upon detector 250 but rather is constantly being moved around with respect to detector 250 depending on the combined relative phases of the constituent sub-beams. However, in order for detector 250 to provide the required noise cancellation phase correction output, far-field intensity pattern 272 must be incident upon detector 250 in order for detector to measure the intensity of far-field intensity pattern 272 and hence apply a noise correction accordingly, resulting in a fixed output beam.

The conflict between the dynamic nature of far-field intensity pattern 272 due to the phase-variation thereof and the fixed nature required of far-field intensity pattern 272 in order to derive and apply noise correction thereto, is advantageously resolved in the present invention by providing the noise cancellation and phase variation at mutually different times and rates.

The noise cancellation phase correction output is provided based on taking into consideration noise measured at detector 250 at a noise sampling rate. The output beam 222 is controlled in such a way that the far-field intensity pattern 272 is incident upon detector 250 during the course of the dynamic changes to the shape and position of output and reference far-field intensity patterns 266 and 272 at a rate that is equal to or higher than the required noise sampling rate. The noise in reference beam 270 is taken into consideration during those intermittent times at which the far-field intensity pattern 272 is returned to detector 250.

At time interstices between the intermittent times at which far-field intensity pattern 272 is incident upon detector 250, the phase of the combined output beams 222, 270 is varied in order to dynamically change the shape and position of the far-field intensity pattern thereof as required to perform additive manufacturing of item 206. The combined laser output is varied at a phase varying rate which exceeds the noise sampling rate, in order to rapidly change the phase and hence shape and position of the far-field intensity pattern. By way of example, the noise sampling rate may be of the order of 10-1000 Hz whereas the phase varying rate may be greater than 10,000 Hz.

The different rates and time scales over which the noise cancellation and phase variation are preferably performed in embodiments of the present invention may be best understood with reference to a graph 280 seen in FIG. 2A and an enlarged version thereof shown in FIG. 2B.

As seen most clearly in FIG. 2B, graph 280 includes an upper portion 282 displaying variation in intensity over time of far-field intensity pattern 272 as measured at detector 250 and a lower portion 284, displaying variation over the same time period of the relative phases of a number of sub-beams contributing to output beam 222 and reference beam 270. For the sake of simplicity, the relative phases of ten sub-beams are displayed in graph 280, although it is appreciated that OPA system 200 and hence the explanation provided herein is applicable to a fewer or, more typically, a far greater number of sub-beams.

As seen in upper portion 282, intensity peaks 286 represent measured intensity of the reference beam 270 when the far field intensity pattern 272 passes over detector 250. As seen in lower portion 284, intensity peaks 286 occur at intermittent times $T_i$ at which the relative phase of each sub-beam is zero, meaning that there is no shift in phase between the sub-beams, the position of the combined output beam is therefore not being changed and the far field intensity pattern 272 is hence directly incident on the detector 250. It is understood that detector 250 may alternatively be positioned such that the relative phase of the sub-beams thereat is non-zero. Furthermore, more than a single detector may be employed so as to allow measurement of the far field intensity pattern 272 at more than one location therealong, as detailed henceforth with reference to FIGS. 6-8 and 15-21.

Between intensity peaks 286 the measured intensity is close to zero, as the far-field intensity pattern 272 is moved to the either side of detector 250 and thus is not directly incident on the detector 250. As appreciated from consideration of upper portion 282, the magnitude of intensity peaks 286 is not constant due to the presence of noise in the laser output beam, which noise degrades the far field intensity pattern 272.

As seen in lower portion 284, the relative phases of the sub-beams are varied at time interstices $T_{between}$ between intermittent times $T_i$. In the phase variation function illustrated herein, the relative phases of the sub-beams are shown to be varied in a periodic, regularly repeating pattern, with equal phase shifts being applied in the positive and negative directions. It is appreciated that such a simplistic pattern is illustrative only and that the phase variation is not necessarily regularly repeating, nor necessarily symmetrical in positive and negative directions. Furthermore, it is understood that time interstices $T_{between}$ preferably but not necessarily do not overlap with intermittent times $T_i$. Additionally, it is appreciated that at least one of the phase varying rate and the noise sampling rate may be constant or may change over time.

Noise cancellation subsystem 240 preferably operates by taking into consideration the noise at intermittent times $T_i$ and providing a noise cancellation phase correction output based on the noise sensed at intermittent times $T_i$. Noise cancellation subsystem 240 preferably employs an algorithm in order to sense noise and correct for the sensed noise accordingly.

According to one exemplary embodiment of the present invention, noise cancellation subsystem 240 employs an algorithm in which the relative phase of one channel is changed in such a way that the relative phase is modified by a given phase change $\Delta\varphi$ during each cycle of travel of the far-field intensity pattern 272 with respect to detector 250. Following a number of such cycles, in which a different phase change $\Delta\varphi$ is applied to the selected sub-beam over each cycle, the algorithm ascertains the maximum output intensity over all of the cycles and finds the optimum phase change $\Delta\varphi$ that produced this maximum intensity. The phase change of the selected sub-beam is then fixed at the optimum phase change $\Delta\varphi$ for subsequent cycles and the algorithm proceeds to optimize another sub-beam.

Graph 280 illustrates noise cancellation according to this exemplary algorithm in three sub-beams or channels A, B and C of the total of 10 sub-beams. Sub-beams A, B and C are displayed alone in FIG. 2C for the sake of clarity. It is appreciated that the line style of the traces representing phase variation and noise correction of sub-beams A, B and C respectively is modified in FIG. 2C in comparison to FIGS. 2A and 2B, in order to aid differentiation between the various sub-beams for the purposes of the explanation hereinbelow.

As seen initially in the case of channel A, and appreciated most clearly from consideration of an enlargement 290, the dashed trace represents the pattern of variation in relative phase of sub-beam A, as would be applied by phase control sub-system 230 in the absence of any noise correction. This trace may be termed $A_{uncorrected}$. The dotted-and dashed trace represents the actual relative phase of sub-beam A as modified by the noise correction algorithm in order to find the optimum phase noise correction. This trace may be termed $A_{corrected}$. The modified relative phase of $A_{corrected}$ is shifted with respect to the non-modified relative phase of $A_{uncorrected}$ by a different $\Delta\varphi_A$ over the first five cycles of sub-beam A. The intensity 286 measured at detector 250 varies over the first five cycles of optimization of sub-beam A due to the deliberate change in relative phase shift.

Following the first five cycles of sub-beam A, the algorithm ascertains the maximum intensity and finds the phase change $\Delta\varphi_A$ that produces the maximum intensity. In this case, the maximum intensity is seen to be $IA_{max}$ produced by the second phase shift $\Delta\varphi_A$. The phase change applied to relative phase variation of sub-beam A is thus fixed at the second phase shift $\Delta\varphi_A$ for subsequent cycles and the algorithm proceeds to optimize sub-beam B.

It is appreciated that during the sequential cycles of optimization of sub-beam A, the relative phases of the remainder of the sub-beams are varied as usual, each at a phase varying rate that far exceeds the noise sampling rate at which the noise in sub-beam A is taken into consideration.

As seen further in the case of sub-beam B, and appreciated most clearly from consideration of an enlargement 292, the thicker trace during optimization of channel B represents the pattern of variation in relative phase of sub-beam B, as would be applied by phase control sub-system 230 in the absence of any noise correction. This trace may be termed $B_{uncorrected}$. The thinner trace during optimization of channel B represents the actual relative phase of sub-beam B as modified by the noise correction algorithm in order to find the optimum phase noise correction. This trace may be termed $B_{corrected}$. The modified relative phase of $B_{corrected}$ is shifted with respect to the non-modified relative phase of $B_{uncorrected}$ by a different $\Delta\varphi_B$ over five cycles of optimization sub-beam B. The intensity 286 measured at detector 250 varies over these five cycles of optimization sub-beam B due to the deliberate change in relative phase shift.

Following these five cycles of sub-beam B, the algorithm ascertains the maximum intensity and finds the phase change $\Delta\varphi_B$ that produces the maximum intensity. In this case, the maximum intensity is seen to be $IAB_{max}$ produced by the fourth phase shift $\Delta\varphi_B$. The phase change applied to relative phase variation of sub-beam B is then fixed at the fourth phase shift $\Delta\varphi_B$ for subsequent cycles and the algorithm proceeds to optimize sub-beam C.

It is appreciated that during the five cycles of optimization of sub-beam B, the relative phases of the remainder of the sub-beams are varied as usual, each at a phase varying rate that far exceeds the noise sampling rate at which the noise in sub-beam B is taken into consideration.

A similar optimization process is preferably implemented for sub-beam C, in which a phase change $\Delta\varphi_C$ is applied over several cycles in order to optimize the output beam intensity and correct for intensity degradation thereof due to phase noise in sub-beam C.

Detector 250 may operate continuously in order to continuously optimize the relative phases of the sub-beams and correct for phase noise therein. However, due to a finite response time of detector 250, detector 250 only takes into consideration the noise in reference beam 270 at intermittent times, at a relatively slow noise sampling rate. The noise sampling rate is preferably but not necessarily predetermined. The noise sampling rate may alternatively be random.

It is appreciated that the particular parameters of the noise correction algorithm depicted in graph 280 are exemplary only and may be readily modified, as will be understood by one skilled in the art. For example, the phase shift $\Delta\varphi$ may be optimized over a greater or fewer number of cycles than illustrated herein, each sub-beam may be fully optimized each time the sub-beam passes over detector 250 or several sub-beams or all of the sub-beams may be optimized during each cycle in which the far-field intensity pattern passes over detector 250. Furthermore, non-sequential noise correction optimization algorithms may alternatively be implemented, including, but not limited to, Stochastic parallel gradient descent optimization algorithms.

The use of dynamically shaped, noise corrected optical phased array output beams for laser additive manufacturing is highly advantageous and enables rapid beam steering, fast power modulation, fast beam focusing and beam shape tailoring. Both the speed and quality with which an item may be manufactured are improved using dynamically shaped, noise corrected optical phase array output in comparison to conventional laser 3D printing methods. It is appreciated that but for the provision of noise correction, in accordance with preferred embodiments of the present invention, the shape and position of the optical phased array output beam would be degraded, thereby degrading the quality, speed and precision of the laser additive manufacturing process.

In order to maintain output beam intensity as the far-field intensity pattern of the beam moves, as is advantageous in certain additive manufacturing applications, movement of the output beam may be controlled such that the beam spends more time at lower-intensity positions so as to compensate for reduced power delivery thereat. Additionally or alternatively, an intensity profile mask such as an ND filter may be applied to the output beam in order to modify the intensity thereof.

Figure 3A:
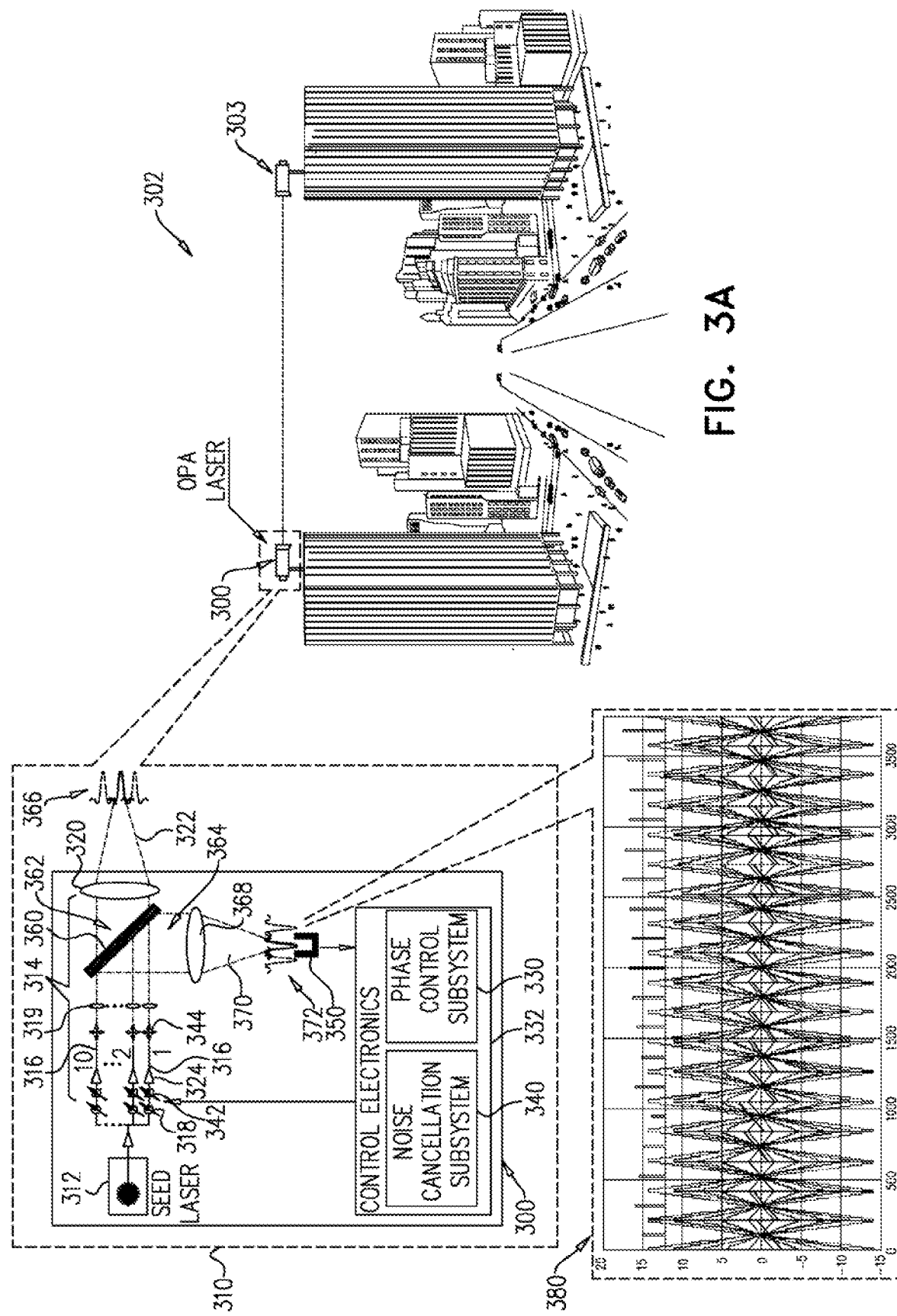
FIG. 3A is a simplified schematic illustration of an optical phased array laser system for noise corrected dynamic beam shaping, constructed and operative in accordance with a further preferred embodiment of the present invention.
Figure 3B:
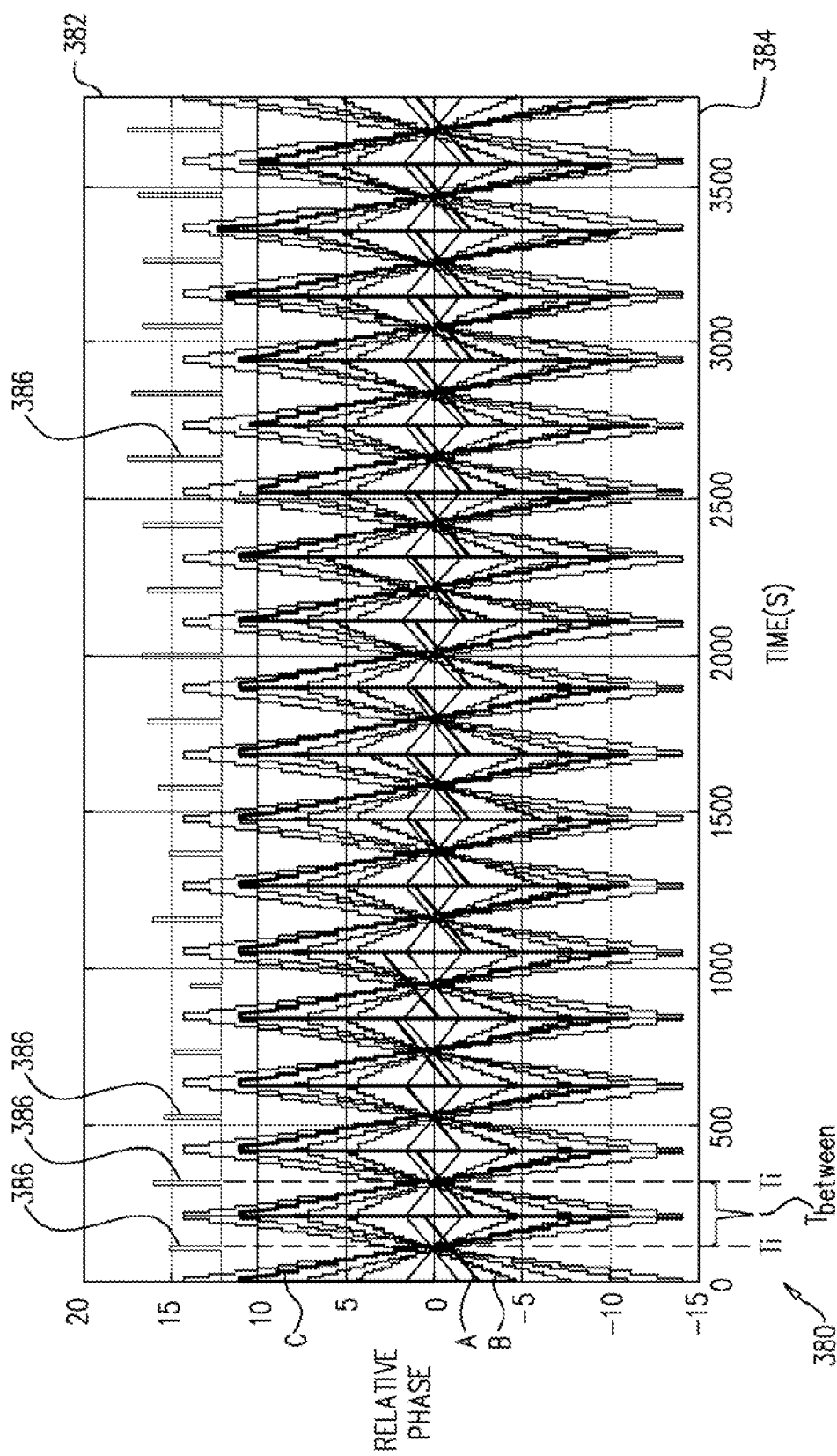
FIGS. 3B and 3C are simplified graphical representations of phase variation and noise correction in a system of the type illustrated in FIG. 3A.
Figure 3C:
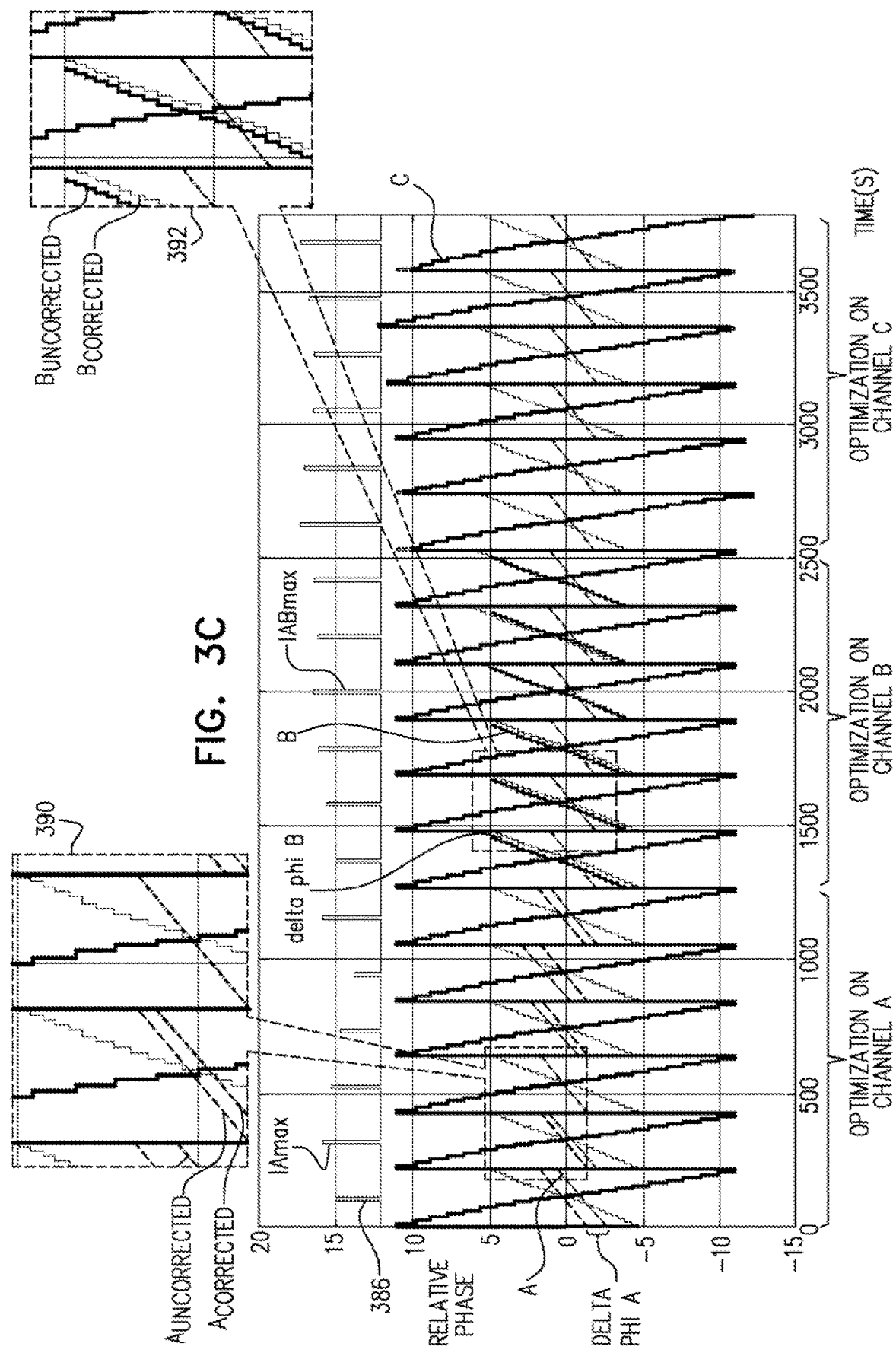

Reference is now made to FIG. 3A, which is a simplified schematic illustration of an optical phased array laser system for noise corrected dynamic beam shaping, constructed and operative in accordance with a further preferred embodiment of the present invention; and to FIGS. 3B and 3C, which are simplified graphical representations of phase variation and noise correction in a system of the type illustrated in FIG. 3A.

As seen in FIG. 3A, there is provided an optical phased array (OPA) laser system 300, here shown to be employed, by way of example, within a free space optical communication system 302. Free space optical communication system 302 may include OPA laser system 300 mounted at an outdoor location, such as on a building, in spaced relation to a receiver 303 for receiving optical signals emanating from OPA laser 300. It is understood that although free space optical communication system 302 is illustrated herein in the context of communication between two fixed points, free-space optical communication system 302 may be adapted for use in communications between two locations that are moving relative to one another, as will be appreciated by one skilled in the art. It is further understood that although free space optical communication system 302 is illustrated herein in the context of terrestrial communications, free-space optical communication system 302 may be adapted for use in extraterrestrial communications, as will be appreciated by one skilled in the art.

It is appreciated that free space optical communication system 302 is illustrated in FIG. 3A as including only a single OPA laser 300 and receiver 303 for the sake of simplicity only, and may include a greater number of each, depending on the communication requirements of system 302. It is further appreciated that receiver 303 may also be an OPA laser of a type resembling OPA laser 300 and having receiving functionality. Furthermore, OPA laser 300 may include receiving functionality so as to allow duplex operation of OPA lasers 300 and 303, for transmission and reception of optical signals therebetween.

As best seen at an enlargement 310, OPA laser 300 preferably comprises a seed laser 312 and a laser beam splitting and combining subsystem 314. Splitting and combining subsystem 314 preferably receives an output laser beam from seed laser 312 and splits the output laser beam into a plurality of sub-beams along a corresponding plurality of channels 316. Here, by way of example only, an output from seed laser 312 is shown to be split into ten sub-beams along ten channels 316 although it is appreciated that splitting and combining subsystem 314 may include a fewer or greater number of channels along which the output of seed laser 312 is split, and typically may include a far greater number of channels such as 32 or more channels.

The relative phase of each sub-beam may be individually modulated by a phase modulator 318, preferably located along each of channels 316. Each phase modulated sub-beam produced by the splitting and subsequent phase modulation of the output of seed laser 312 preferably propagates towards a collimating lens 319. The individually collimated, phase modulated sub-beams are subsequently combined, for example at a focal lens 320, to form an output beam 322.

Splitting and combining subsystem 314 may also provide laser amplification of the sub-beams, preferably following the splitting of the output beam of seed laser 312 into sub-beams and prior to the combining of the sub-beams to form output beam 322. Here, by way of example, splitting and combining subsystem 314 is shown to include a plurality of optical amplifiers 324 located along corresponding ones of channels 316 for amplifying each sub-beam. It is appreciated, however, that such amplification is optional and may be omitted, depending on the power output requirements of OPA laser 300.

The phase of output beam 322, and hence the position and shape of the far-field intensity pattern thereof, is controlled, at least in part, by the relative phases of the constituent sub-beams combined to form output beam 322. In many applications, such as free space optical communications as illustrated in FIG. 3A, it is desirable to dynamically move and shape the far-field intensity pattern of the output beam. This may be achieved in laser system 300 by laser splitting and combining subsystem 314 dynamically varying the relative phases of the individual sub-beams and thereby varying the phase of the combined laser output 322 so as dynamically to control the position and shape of the far-field intensity pattern thereof.

The relative phases of the sub-beams are preferably predetermined in accordance with a desired laser output pattern for transmission to receiver 303. Particularly preferably, the varying relative phases are applied by a phase control subsystem 330. Phase control subsystem 330 preferably forms a part of a control electronics module 332 in OPA laser 300 and preferably controls each phase modulator 318 so as to dynamically modulate the relative phases of the sub-beams along channels 316.

Due to noise inherent in OPA system 300, output beam 322 has noise. Noise in output beam 322 is typically phase noise created by thermal or mechanical effects and/or by the amplification process in the case that optical amplifiers 324 are present in OPA system 300. It is a particular feature of a preferred embodiment of the present invention that laser system 300 includes a noise cancellation subsystem 340 operative to provide a noise cancellation phase correction output in order to cancel out the noise in output beam 322 in a manner detailed henceforth.

Particularly preferably, noise cancellation subsystem 340 employs an algorithm to sense and correct phase noise in the combined laser output. The noise cancellation phase correction output is preferably provided by noise cancellation subsystem 340 to phase modulator 318 so as to correct phase noise in output beam 322 and thus avoid distortion of the shape and position of the far field intensity pattern of output beam 322 that would otherwise be caused by the noise. Noise cancellation subsystem 340 may be included in control electronics module 332.

It is understood that output beam 322 may be additionally or alternatively affected by types of noise other than phase noise, including intensity noise. In the case of output beam 322 having intensity noise, noise cancellation subsystem 340 may be operative to provide a noise cancellation phase correction output in order to cancel out the intensity noise in output beam 322. In such a case, OPA laser system 300 may optionally additionally include intensity modulators 342 along channels 316 for modulating the intensity of each of the sub-beams along channels 316.

It is understood that output beam 322 may be additionally or alternatively affected by mechanical noise which may affect the relative position of the sub-beams. In the case of output beam 322 having position noise, noise cancellation subsystem 340 may be operative to provide a noise cancellation phase correction output in order to cancel out the position noise in output beam 322. In such a case, OPA laser system 300 may optionally additionally include position modulators 344 along channels 316 for modulating the position of each of the sub-beams along channels 316.

In order to facilitate application of phase variation and noise correction to output beam 322, a portion of the output of OPA laser 300 is preferably extracted and directed towards at least one detector, here illustrated as a single detector 350. Detector 350 may alternatively be embodied as multiple detectors, as detailed henceforth with reference to FIGS. 6-8 and 15-21. The extracted portion of the output beam preferably functions as a reference beam, based on characteristics of which the required noise correction and/or phase variation may be calculated. In the embodiment shown in FIG. 3A, plurality of sub-beams along channels 316 are directed towards a beam splitter 360. Beam splitter 360 preferably splits each sub-beam into a transmitted portion 362 and a reflected portion 364 in accordance with a predetermined ratio. For example, beam splitter 360 may split each sub-beam with a 99.9% transmitted: 0.01% reflected ratio.

The transmitted portion 362 of the sub-beams preferably propagates towards focal lens 320, at which focal lens 320 the sub-beams are combined to form output beam 322 having a far-field intensity pattern 366. The reflected portion 364 of the sub-beams is preferably reflected towards an additional focal lens 368, at which additional focal lens 368 the sub-beams are combined to form an output reference beam 370 having a far-field intensity pattern 372 incident on a surface of detector 350.

It is understood that the particular structure and configuration of beam splitting and recombining elements shown herein, including beam splitter 360 and focal lenses 320 and 368, is exemplary only and depicted in a highly simplified form. It is appreciated that OPA laser system 300 may include a variety of such elements, as well as additional optical elements, including, by way of example only, additional or alternative lenses, optical fibers and coherent free-space far-field combiners.

As described hereinabove, the shape and position of far-field intensity pattern 366 of the output beam 322 and correspondingly of far-field intensity pattern 372 of the reference beam 370 are constantly changing, due to the ongoing variation of the relative phases of the sub-beams. As a result, far-field intensity pattern 372 is not fixed upon detector 350 but rather is constantly being moved around with respect to detector 350 depending on the combined relative phases of the constituent sub-beams. However, in order for detector 350 to provide the required noise cancellation phase correction output, far-field intensity pattern 372 must be incident upon detector 350 in order for detector to measure the intensity of far-field intensity pattern 372 and hence apply a noise correction accordingly, resulting in a fixed output beam.

The conflict between the dynamic nature of far-field intensity pattern 372 due to the phase-variation thereof and the fixed nature required of far-field intensity pattern 372 in order to derive and apply noise correction thereto, is advantageously resolved in the present invention by providing the noise cancellation and phase variation at mutually different times and rates.

The noise cancellation phase correction output is provided based on taking into consideration noise measured at detector 350 at a noise sampling rate. The output beam 322 is controlled in such a way that the far-field intensity pattern 372 is incident upon detector 350 during the course of the dynamic changes to the shape and position of output and reference far-field intensity patterns 366 and 372 at a rate that is equal to or higher than the required noise sampling rate. The noise in reference beam 370 is taken into consideration during those intermittent times at which the far-field intensity pattern 372 is returned to detector 350.

At time interstices between the intermittent times at which far-field intensity pattern 372 is incident upon detector 350, the phase of the combined output beams 322, 370 is varied in order to dynamically change the shape and position of the far-field intensity pattern thereof as required to perform additive manufacturing of item 206. The combined laser output is varied at a phase varying rate which exceeds the noise sampling rate, in order to rapidly change the phase and hence shape and position of the far-field intensity pattern. By way of example, the noise sampling rate may be of the order of 10-1000 Hz whereas the phase varying rate may be greater than 10,000 Hz.

The different rates and time scales over which the noise cancellation and phase variation are preferably performed in embodiments of the present invention may be best understood with reference to a graph 380 seen in FIG. 3A and an enlarged version thereof shown in FIG. 3B.

As seen most clearly in FIG. 3B, graph 380 includes an upper portion 382 displaying variation in intensity over time of far-field intensity pattern 372 as measured at detector 350 and a lower portion 384, displaying variation over the same time period of the relative phases of a number of sub-beams contributing to output beam 322 and reference beam 370. For the sake of simplicity, the relative phases of ten sub-beams are displayed in graph 380, although it is appreciated that OPA system 300 and hence the explanation provided herein is applicable to a fewer or, more typically, a far greater number of sub-beams.

As seen in upper portion 382, intensity peaks 386 represent measured intensity of the reference beam 370 when the far field intensity pattern 372 passes over detector 350. As seen in lower portion 384, intensity peaks 386 occur at intermittent times $T_i$ at which the relative phase of each sub-beam is zero, meaning that there is no shift in phase between the sub-beams, the position of the combined output beam is therefore not being changed and the far field intensity pattern 372 is hence directly incident on the detector 350. It is understood that detector 350 may alternatively be positioned such that the relative phase of the sub-beams thereat is non-zero. Furthermore, more than a single detector may be employed so as to allow measurement of the far field intensity pattern 372 at more than one location therealong, as detailed henceforth with reference to FIGS. 6-8 and 15-21.

Between intensity peaks 386 the measured intensity is close to zero, as the far-field intensity pattern 372 is moved to the either side of detector 350 and thus is not directly incident on the detector 350. As appreciated from consideration of upper portion 382, the magnitude of intensity peaks 386 is not constant due to the presence of noise in the laser output beam, which noise degrades the far field intensity pattern 372.

As seen in lower portion 384, the relative phases of the sub-beams are varied at time interstices $T_{between}$ between intermittent times $T_i$. In the phase variation function illustrated herein, the relative phases of the sub-beams are shown to be varied in a periodic, regularly repeating pattern, with equal phase shifts being applied in the positive and negative directions. It is appreciated that such a simplistic pattern is illustrative only and that the phase variation is not necessarily regularly repeating, nor necessarily symmetrical in positive and negative directions. Furthermore, it is understood that time interstices $T_{between}$ preferably but not necessarily do not overlap with intermittent times $T_i$. Additionally, it is appreciated that at least one of the phase varying rate and the noise sampling rate may be constant or may change over time.

Noise cancellation subsystem 340 preferably operates by taking into consideration the noise at intermittent times $T_i$ and providing a noise cancellation phase correction output based on the noise sensed at intermittent times $T_i$. Noise cancellation subsystem 340 preferably employs an algorithm in order to sense noise and correct for the sensed noise accordingly.

According to one exemplary embodiment of the present invention, noise cancellation subsystem 340 employs an algorithm in which the relative phase of one channel is changed in such a way that the relative phase is modified by a given phase change $\Delta\varphi$ during each cycle of travel of the far-field intensity pattern 372 with respect to detector 350. Following a number of such cycles, in which a different phase change $\Delta\varphi$ is applied to the selected sub-beam over each cycle, the algorithm ascertains the maximum output intensity over all of the cycles and finds the optimum phase change $\Delta\varphi$ that produced this maximum intensity. The phase change of the selected sub-beam is then fixed at the optimum phase change $\Delta\varphi$ for subsequent cycles and the algorithm proceeds to optimize another sub-beam.

Graph 380 illustrates noise cancellation according to this exemplary algorithm in three sub-beams or channels A, B and C of the total of 10 sub-beams. Sub-beams A, B and C are displayed alone in FIG. 3C for the sake of clarity. It is appreciated that the line style of the traces representing phase variation and noise correction of sub-beams A, B and C respectively is modified in FIG. 3C in comparison to FIGS. 3A and 3B, in order to aid differentiation between the various sub-beams for the purposes of the explanation hereinbelow.

As seen initially in the case of channel A, and appreciated most clearly from consideration of an enlargement 390, the dashed trace represents the pattern of variation in relative phase of sub-beam A, as would be applied by phase control sub-system 330 in the absence of any noise correction. This trace may be termed $A_{uncorrected}$. The dotted-and dashed trace represents the actual relative phase of sub-beam A as modified by the noise correction algorithm in order to find the optimum phase noise correction. This trace may be termed $A_{corrected}$. The modified relative phase of $A_{corrected}$ is shifted with respect to the non-modified relative phase of $A_{uncorrected}$ by a different $\Delta\varphi_A$ over the first five cycles of sub-beam A. The intensity 386 measured at detector 350 varies over the first five cycles of optimization of sub-beam A due to the deliberate change in relative phase shift.

Following the first five cycles of sub-beam A, the algorithm ascertains the maximum intensity and finds the phase change $\Delta\varphi_A$ that produces the maximum intensity. In this case, the maximum intensity is seen to be $IA_{max}$ produced by the second phase shift $\Delta\varphi_A$. The phase change applied to relative phase variation of sub-beam A is thus fixed at the second phase shift $\Delta\varphi_A$ for subsequent cycles and the algorithm proceeds to optimize sub-beam B.

It is appreciated that during the sequential cycles of optimization of sub-beam A, the relative phases of the remainder of the sub-beams are varied as usual, each at a phase varying rate that far exceeds the noise sampling rate at which the noise in sub-beam A is taken into consideration.

As seen further in the case of sub-beam B, and appreciated most clearly from consideration of an enlargement 392, the thicker trace during optimization of channel B represents the pattern of variation in relative phase of sub-beam B, as would be applied by phase control sub-system 330 in the absence of any noise correction. This trace may be termed $B_{uncorrected}$. The thinner trace during optimization of channel B represents the actual relative phase of sub-beam B as modified by the noise correction algorithm in order to find the optimum phase noise correction. This trace may be termed $B_{corrected}$. The modified relative phase of $B_{corrected}$ is shifted with respect to the non-modified relative phase of $B_{uncorrected}$ by a different $\Delta\varphi_B$ over five cycles of optimization sub-beam B. The intensity 386 measured at detector 350 varies over these five cycles of optimization sub-beam B due to the deliberate change in relative phase shift.

Following these five cycles of sub-beam B, the algorithm ascertains the maximum intensity and finds the phase change $\Delta\varphi_B$ that produces the maximum intensity. In this case, the maximum intensity is seen to be $IAB_{max}$ produced by the fourth phase shift $\Delta\varphi_B$. The phase change applied to relative phase variation of sub-beam B is then fixed at the fourth phase shift $\Delta\varphi_B$ for subsequent cycles and the algorithm proceeds to optimize sub-beam C.

It is appreciated that during the five cycles of optimization of sub-beam B, the relative phases of the remainder of the sub-beams are varied as usual, each at a phase varying rate that far exceeds the noise sampling rate at which the noise in sub-beam B is taken into consideration.

A similar optimization process is preferably implemented for sub-beam C, in which a phase change $\Delta\varphi_C$ is applied over several cycles in order to optimize the output beam intensity and correct for intensity degradation thereof due to phase noise in sub-beam C.

Detector 350 may operate continuously in order to continuously optimize the relative phases of the sub-beams and correct for phase noise therein. However, due to a finite response time of detector 350, detector 350 only takes into consideration the noise in reference beam 370 at intermittent times, at a relatively slow noise sampling rate. The noise sampling rate is preferably but not necessarily predetermined. The noise sampling rate may alternatively be random.

It is appreciated that the particular parameters of the noise correction algorithm depicted in graph 380 are exemplary only and may be readily modified, as will be understood by one skilled in the art. For example, the phase shift $\Delta\varphi$ may be optimized over a greater or fewer number of cycles than illustrated herein, each sub-beam may be fully optimized each time the sub-beam passes over detector 350 or several sub-beams or all of the sub-beams may be optimized during each cycle in which the far-field intensity pattern passes over detector 350. Furthermore, non-sequential noise correction optimization algorithms may alternatively be implemented, including, but not limited to, Stochastic parallel gradient descent optimization algorithms.

The use of dynamically shaped, noise corrected optical phased array output beams for free-space optical communication is highly advantageous and enables rapid beam steering, fast power modulation, fast beam focusing and beam shape tailoring. Both the speed and quality of communication are improved using dynamically shaped, noise corrected optical phase array output in comparison to conventional free space optical communication methods. It is appreciated that but for the provision of noise correction, in accordance with preferred embodiments of the present invention, the shape and position of the optical phased array output beam would be degraded, thereby degrading the quality, speed and precision of the transmitted laser output.

In order to maintain output beam intensity as the far-field intensity pattern of the beam moves, as is advantageous in certain optical communication applications, movement of the output beam may be controlled such that the beam spends more time at lower-intensity positions so as to compensate for reduced power delivery thereat. Additionally or alternatively, an intensity profile mask such as an ND filter may be applied to the output beam in order to modify the intensity thereof.

Figure 4A:
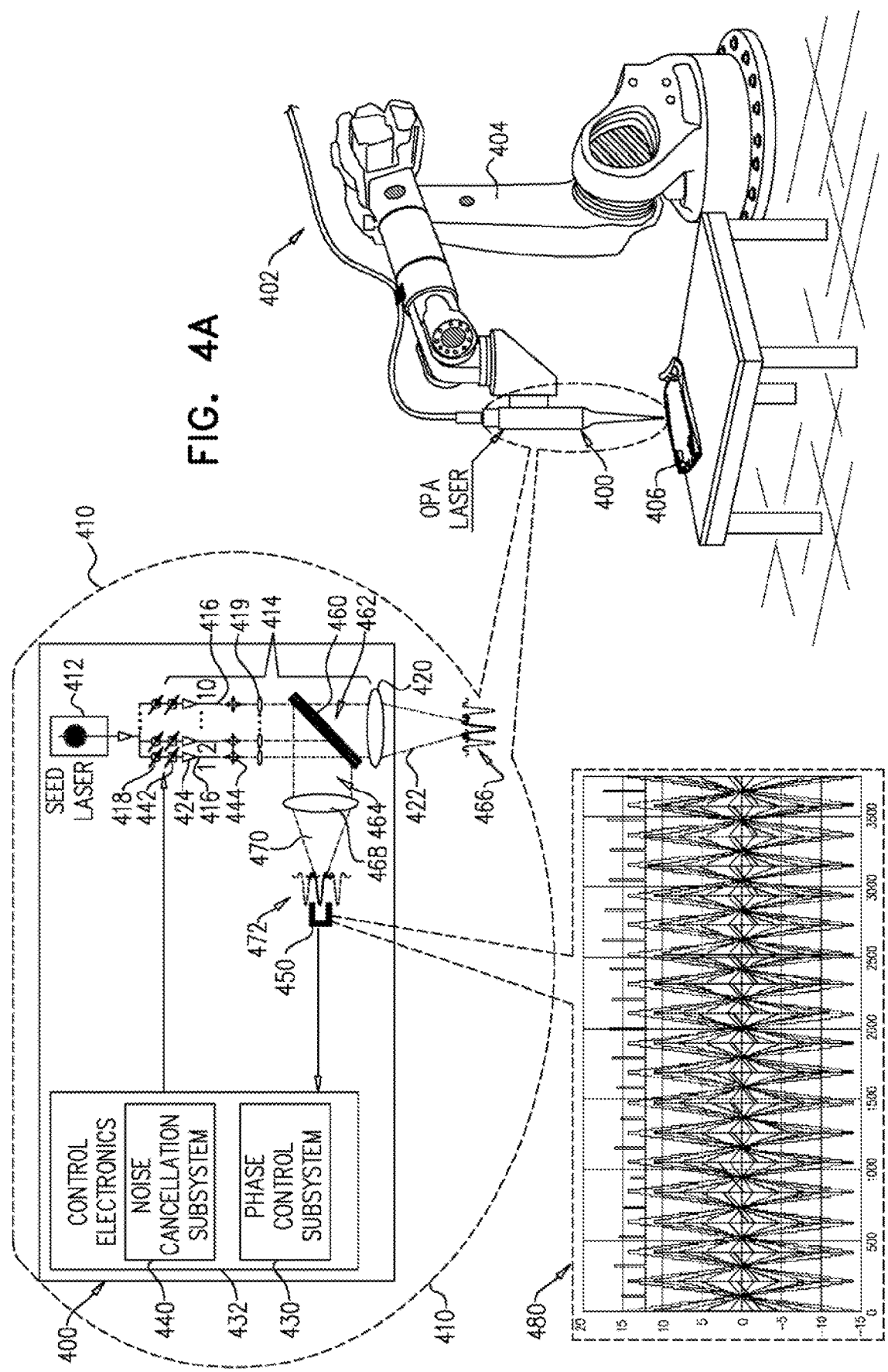
FIG. 4A is a simplified schematic illustration of an optical phased array laser system for noise corrected dynamic beam shaping, constructed and operative in accordance with a still further preferred embodiment of the present invention.
Figure 4B:
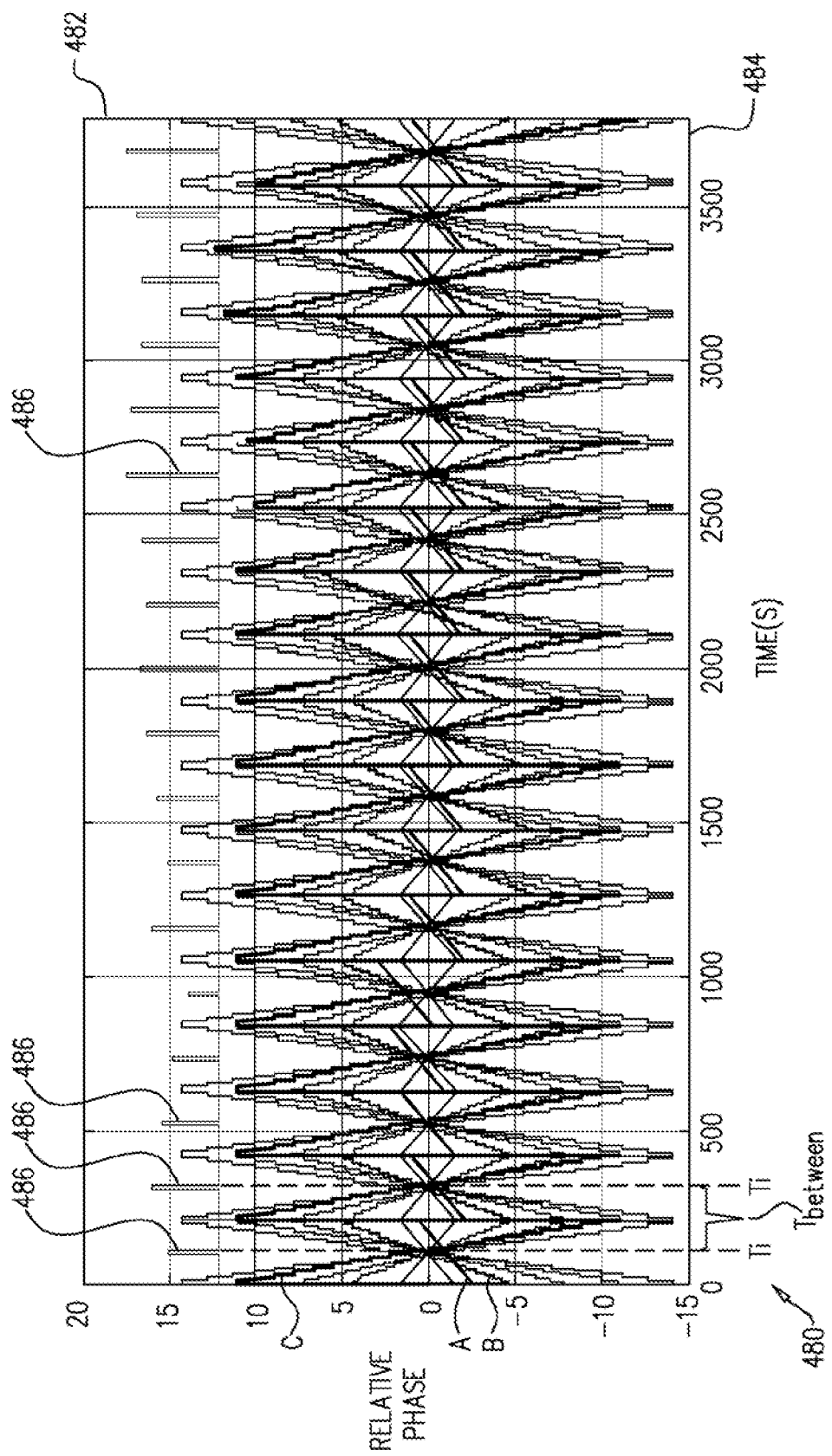
FIGS. 4B and 4C are simplified graphical representations of phase variation and noise correction in a system of the type illustrated in FIG. 4A.
Figure 4C:
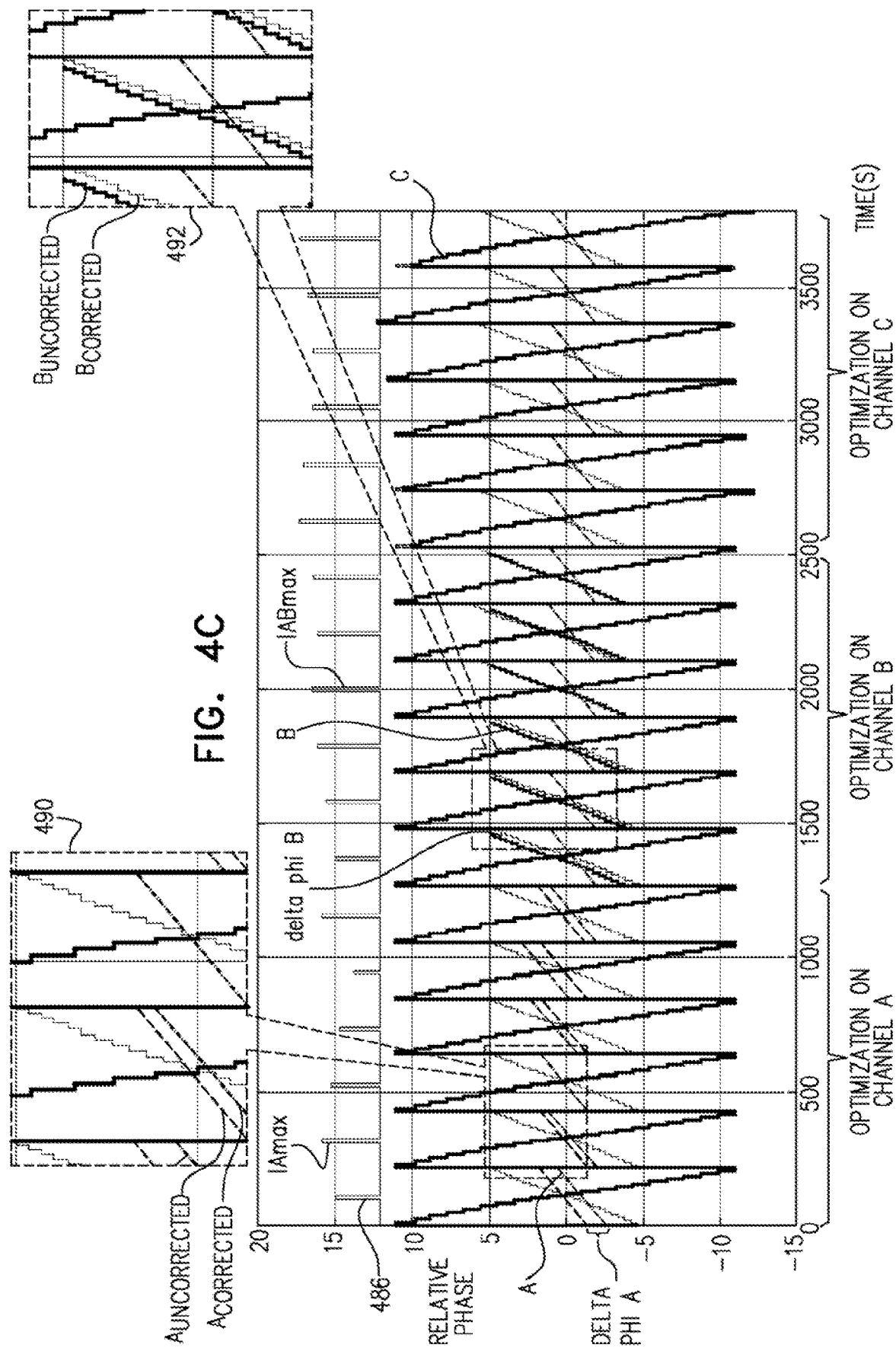

Reference is now made to FIG. 4A, which is a simplified schematic illustration of an optical phased array laser system for noise corrected dynamic beam shaping, constructed and operative in accordance with yet another preferred embodiment of the present invention; and to FIGS. 4B and 4C, which are simplified graphical representations of phase variation and noise correction in a system of the type illustrated in FIG. 4A.

As seen in FIG. 4A, there is provided an optical phased array (OPA) laser system 400, here shown to be employed, by way of example, within a laser welding system 402. Laser welding system 402 may include OPA laser system 400 mounted on or within a portion of a laser welding robot 404. An item, such as an item 406, may be welded by laser welding robot 404, as is detailed henceforth. It is understood that although laser welding system 402 is illustrated herein in the context of welding robot 404, system 402 may be adapted for use in any welding setup, as will be appreciated by one skilled in the art.

As best seen at an enlargement 410, OPA laser 400 preferably comprises a seed laser 412 and a laser beam splitting and combining subsystem 414. Splitting and combining subsystem 414 preferably receives an output laser beam from seed laser 412 and splits the output laser beam into a plurality of sub-beams along a corresponding plurality of channels 416. Here, by way of example only, an output from seed laser 412 is shown to be split into ten sub-beams along ten channels 416 although it is appreciated that splitting and combining subsystem 414 may include a fewer or greater number of channels along which the output of seed laser 412 is split, and typically may include a far greater number of channels such as 32 or more channels.

The relative phase of each sub-beam may be individually modulated by a phase modulator 418, preferably located along each of channels 416. Each phase modulated sub-beam produced by the splitting and subsequent phase modulation of the output of seed laser 412 preferably propagates towards a collimating lens 419. The individually collimated, phase modulated sub-beams are subsequently combined, for example at a focal lens 420, to form an output beam 422.

Splitting and combining subsystem 414 may also provide laser amplification of the sub-beams, preferably following the splitting of the output beam of seed laser 412 into sub-beams and prior to the combining of the sub-beams to form output beam 422. Here, by way of example, splitting and combining subsystem 414 is shown to include a plurality of optical amplifiers 424 located along corresponding ones of channels 416 for amplifying each sub-beam. It is appreciated, however, that such amplification is optional and may be omitted, depending on the power output requirements of OPA laser 400.

The phase of output beam 422, and hence the position and shape of the far-field intensity pattern thereof, is controlled, at least in part, by the relative phases of the constituent sub-beams combined to form output beam 422. In many applications, such as laser welding as illustrated in FIG. 4A, it is desirable to dynamically move and shape the far-field intensity pattern of the output beam. This may be achieved in laser system 400 by laser splitting and combining subsystem 414 dynamically varying the relative phases of the individual sub-beams and thereby varying the phase of the combined laser output 422 so as dynamically to control the position and shape of the far-field intensity pattern thereof.

The relative phases of the sub-beams are preferably predetermined in accordance with the desired laser output pattern for the welding of item 406. Particularly preferably, the varying relative phases are applied by a phase control subsystem 430. Phase control subsystem 430 preferably forms a part of a control electronics module 432 in OPA laser 400 and preferably controls each phase modulator 418 so as to dynamically modulate the relative phases of the sub-beams along channels 416.

Due to noise inherent in OPA system 400, output beam 422 has noise. Noise in output beam 422 is typically phase noise created by thermal or mechanical effects and/or by the amplification process in the case that optical amplifiers 424 are present in OPA system 400. It is a particular feature of a preferred embodiment of the present invention that laser system 400 includes a noise cancellation subsystem 440 operative to provide a noise cancellation phase correction output in order to cancel out the noise in output beam 422 in a manner detailed henceforth.

Particularly preferably, noise cancellation subsystem 440 employs an algorithm to sense and correct phase noise in the combined laser output. The noise cancellation phase correction output is preferably provided by noise cancellation subsystem 440 to phase modulator 418 so as to correct phase noise in output beam 422 and thus avoid distortion of the shape and position of the far field intensity pattern of output beam 422 that would otherwise be caused by the noise. Noise cancellation subsystem 440 may be included in control electronics module 432.

It is understood that output beam 422 may be additionally or alternatively affected by types of noise other than phase noise, including intensity noise. In the case of output beam 422 having intensity noise, noise cancellation subsystem 440 may be operative to provide a noise cancellation phase correction output in order to cancel out the intensity noise in output beam 422. In such a case, OPA laser system 400 may optionally additionally include intensity modulators 442 along channels 416 for modulating the intensity of each of the sub-beams along channels 416.

It is understood that output beam 422 may be additionally or alternatively affected by mechanical noise which may affect the relative position of the sub-beams. In the case of output beam 422 having position noise, noise cancellation subsystem 440 may be operative to provide a noise cancellation phase correction output in order to cancel out the position noise in output beam 422. In such a case, OPA laser system 400 may optionally additionally include position modulators 444 along channels 416 for modulating the position of each of the sub-beams along channels 416.

In order to facilitate application of phase variation and noise correction to output beam 422, a portion of the output of OPA laser 400 is preferably extracted and directed towards at least one detector, here illustrated as a single detector 450. Detector 450 may alternatively be embodied as multiple detectors, as detailed henceforth with reference to FIGS. 6-8 and 15-21. The extracted portion of the output beam preferably functions as a reference beam, based on characteristics of which the required noise correction and/or phase variation may be calculated. In the embodiment shown in FIG. 4A, plurality of sub-beams along channels 416 are directed towards a beam splitter 460. Beam splitter 460 preferably splits each sub-beam into a transmitted portion 462 and a reflected portion 464 in accordance with a predetermined ratio. For example, beam splitter 460 may split each sub-beam with a 99.9% transmitted: 0.01% reflected ratio.

The transmitted portion 462 of the sub-beams preferably propagates towards focal lens 420, at which focal lens 420 the sub-beams are combined to form output beam 422 having a far-field intensity pattern 466 incident on item 406. The reflected portion 464 of the sub-beams is preferably reflected towards an additional focal lens 468, at which additional focal lens 468 the sub-beams are combined to form an output reference beam 470 having a far-field intensity pattern 472 incident on a surface of detector 450.

It is understood that the particular structure and configuration of beam splitting and recombining elements shown herein, including beam splitter 460 and focal lenses 420 and 468, is exemplary only and depicted in a highly simplified form. It is appreciated that OPA laser system 400 may include a variety of such elements, as well as additional optical elements, including, by way of example only, additional or alternative lenses, optical fibers and coherent free-space far-field combiners.

As described hereinabove, the shape and position of far-field intensity pattern 466 of the output beam 422 and correspondingly of far-field intensity pattern 472 of the reference beam 470 are constantly changing, due to the ongoing variation of the relative phases of the sub-beams. As a result, far-field intensity pattern 472 is not fixed upon detector 450 but rather is constantly being moved around with respect to detector 450 depending on the combined relative phases of the constituent sub-beams. However, in order for detector 450 to provide the required noise cancellation phase correction output, far-field intensity pattern 472 must be incident upon detector 450 in order for detector to measure the intensity of far-field intensity pattern 472 and hence apply a noise correction accordingly, resulting in a fixed output beam.

The conflict between the dynamic nature of far-field intensity pattern 472 due to the phase-variation thereof and the fixed nature required of far-field intensity pattern 472 in order to derive and apply noise correction thereto, is advantageously resolved in the present invention by providing the noise cancellation and phase variation at mutually different times and rates.

The noise cancellation phase correction output is provided based on taking into consideration noise measured at detector 450 at a noise sampling rate. The output beam 422 is controlled in such a way that the far-field intensity pattern 472 is incident upon detector 450 during the course of the dynamic changes to the shape and position of output and reference far-field intensity patterns 466 and 472 at a rate that is equal to or higher than the required noise sampling rate. The noise in reference beam 470 is taken into consideration during those intermittent times at which the far-field intensity pattern 472 is returned to detector 450.

At time interstices between the intermittent times at which far-field intensity pattern 472 is incident upon detector 450, the phase of the combined output beams 422, 470 is varied in order to dynamically change the shape and position of the far-field intensity pattern thereof as required to perform laser welding of item 406. The combined laser output is varied at a phase varying rate which exceeds the noise sampling rate, in order to rapidly change the phase and hence shape and position of the far-field intensity pattern. By way of example, the noise sampling rate may be of the order of 10-1000 Hz whereas the phase varying rate may be greater than 10,000 Hz.

The different rates and time scales over which the noise cancellation and phase variation are preferably performed in embodiments of the present invention may be best understood with reference to a graph 480 seen in FIG. 4A and an enlarged version thereof shown in FIG. 4B.

As seen most clearly in FIG. 4B, graph 480 includes an upper portion 482 displaying variation in intensity over time of far-field intensity pattern 472 as measured at detector 450 and a lower portion 484, displaying variation over the same time period of the relative phases of a number of sub-beams contributing to output beam 422 and reference beam 470. For the sake of simplicity, the relative phases of ten sub-beams are displayed in graph 480, although it is appreciated that OPA system 400 and hence the explanation provided herein is applicable to a fewer or, more typically, a far greater number of sub-beams.

As seen in upper portion 482, intensity peaks 486 represent measured intensity of the reference beam 470 when the far field intensity pattern 472 passes over detector 450. As seen in lower portion 484, intensity peaks 486 occur at intermittent times $T_i$ at which the relative phase of each sub-beam is zero, meaning that there is no shift in phase between the sub-beams, the position of the combined output beam is therefore not being changed and the far field intensity pattern 472 is hence directly incident on the detector 450. It is understood that detector 450 may alternatively be positioned such that the relative phase of the sub-beams thereat is non-zero. Furthermore, more than a single detector may be employed so as to allow measurement of the far field intensity pattern 472 at more than one location therealong, as detailed henceforth with reference to FIGS. 6-8 and 15-21.

Between intensity peaks 486 the measured intensity is close to zero, as the far-field intensity pattern 472 is moved to the either side of detector 450 and thus is not directly incident on the detector 450. As appreciated from consideration of upper portion 482, the magnitude of intensity peaks 486 is not constant due to the presence of noise in the laser output beam, which noise degrades the far field intensity pattern 472.

As seen in lower portion 484, the relative phases of the sub-beams are varied at time interstices $T_{between}$ between intermittent times $T_i$. In the phase variation function illustrated herein, the relative phases of the sub-beams are shown to be varied in a periodic, regularly repeating pattern, with equal phase shifts being applied in the positive and negative directions. It is appreciated that such a simplistic pattern is illustrative only and that the phase variation is not necessarily regularly repeating, nor necessarily symmetrical in positive and negative directions. Furthermore, it is understood that time interstices $T_{between}$ preferably but not necessarily do not overlap with intermittent times $T_i$. Additionally, it is appreciated that at least one of the phase varying rate and the noise sampling rate may be constant or may change over time.

Noise cancellation subsystem 440 preferably operates by taking into consideration the noise at intermittent times $T_i$ and providing a noise cancellation phase correction output based on the noise sensed at intermittent times $T_i$. Noise cancellation subsystem 440 preferably employs an algorithm in order to sense noise and correct for the sensed noise accordingly.

According to one exemplary embodiment of the present invention, noise cancellation subsystem 440 employs an algorithm in which the relative phase of one channel is changed in such a way that the relative phase is modified by a given phase change $\Delta\varphi$ during each cycle of travel of the far-field intensity pattern 472 with respect to detector 150. Following a number of such cycles, in which a different phase change $\Delta\varphi$ is applied to the selected sub-beam over each cycle, the algorithm ascertains the maximum output intensity over all of the cycles and finds the optimum phase change $\Delta\varphi$ that produced this maximum intensity. The phase change of the selected sub-beam is then fixed at the optimum phase change $\Delta\varphi$ for subsequent cycles and the algorithm proceeds to optimize another sub-beam.

Graph 480 illustrates noise cancellation according to this exemplary algorithm in three sub-beams or channels A, B and C of the total of 10 sub-beams. Sub-beams A, B and C are displayed alone in FIG. 4C for the sake of clarity. It is appreciated that the line style of the traces representing phase variation and noise correction of sub-beams A, B and C respectively is modified in FIG. 4C in comparison to FIGS. 4A and 4B, in order to aid differentiation between the various sub-beams for the purposes of the explanation hereinbelow.

As seen initially in the case of channel A, and appreciated most clearly from consideration of an enlargement 490, the dashed trace represents the pattern of variation in relative phase of sub-beam A, as would be applied by phase control sub-system 430 in the absence of any noise correction. This trace may be termed $A_{uncorrected}$. The dotted-and dashed trace represents the actual relative phase of sub-beam A as modified by the noise correction algorithm in order to find the optimum phase noise correction. This trace may be termed $A_{corrected}$. The modified relative phase of $A_{corrected}$ is shifted with respect to the non-modified relative phase of $A_{uncorrected}$ by a different $\Delta\varphi_A$ over the first five cycles of sub-beam A. The intensity 486 measured at detector 450 varies over the first five cycles of optimization of sub-beam A due to the deliberate change in relative phase shift.

Following the first five cycles of sub-beam A, the algorithm ascertains the maximum intensity and finds the phase change $\Delta\varphi_A$ that produces the maximum intensity. In this case, the maximum intensity is seen to be $IA_{max}$ produced by the second phase shift $\Delta\varphi_A$. The phase change applied to relative phase variation of sub-beam A is thus fixed at the second phase shift $\Delta\varphi_A$ for subsequent cycles and the algorithm proceeds to optimize sub-beam B.

It is appreciated that during the sequential cycles of optimization of sub-beam A, the relative phases of the remainder of the sub-beams are varied as usual, each at a phase varying rate that far exceeds the noise sampling rate at which the noise in sub-beam A is taken into consideration.

As seen further in the case of sub-beam B, and appreciated most clearly from consideration of an enlargement 492, the thicker trace during optimization of channel B represents the pattern of variation in relative phase of sub-beam B, as would be applied by phase control sub-system 430 in the absence of any noise correction. This trace may be termed $B_{uncorrected}$. The thinner trace during optimization of channel B represents the actual relative phase of sub-beam B as modified by the noise correction algorithm in order to find the optimum phase noise correction. This trace may be termed $B_{corrected}$. The modified relative phase of $B_{corrected}$ is shifted with respect to the non-modified relative phase of $B_{uncorrected}$ by a different $\Delta\varphi_B$ over five cycles of optimization sub-beam B. The intensity 486 measured at detector 450 varies over these five cycles of optimization sub-beam B due to the deliberate change in relative phase shift.

Following these five cycles of sub-beam B, the algorithm ascertains the maximum intensity and finds the phase change $\Delta\varphi_B$ that produces the maximum intensity. In this case, the maximum intensity is seen to be $IAB_{max}$ produced by the fourth phase shift $\Delta\varphi_B$. The phase change applied to relative phase variation of sub-beam B is then fixed at the fourth phase shift $\Delta\varphi_B$ for subsequent cycles and the algorithm proceeds to optimize sub-beam C.

It is appreciated that during the five cycles of optimization of sub-beam B, the relative phases of the remainder of the sub-beams are varied as usual, each at a phase varying rate that far exceeds the noise sampling rate at which the noise in sub-beam B is taken into consideration.

A similar optimization process is preferably implemented for sub-beam C, in which a phase change $\Delta\varphi_C$ is applied over several cycles in order to optimize the output beam intensity and correct for intensity degradation thereof due to phase noise in sub-beam C.

Detector 450 may operate continuously in order to continuously optimize the relative phases of the sub-beams and correct for phase noise therein. However, due to a finite response time of detector 450, detector 450 only takes into consideration the noise in reference beam 470 at intermittent times, at a relatively slow noise sampling rate. The noise sampling rate is preferably but not necessarily predetermined. The noise sampling rate may alternatively be random.

It is appreciated that the particular parameters of the noise correction algorithm depicted in graph 480 are exemplary only and may be readily modified, as will be understood by one skilled in the art. For example, the phase shift $\Delta\varphi$ may be optimized over a greater or fewer number of cycles than illustrated herein, each sub-beam may be fully optimized each time the sub-beam passes over detector 450 or several sub-beams or all of the sub-beams may be optimized during each cycle in which the far-field intensity pattern passes over detector 450. Furthermore, non-sequential noise correction optimization algorithms may alternatively be implemented, including, but not limited to, Stochastic parallel gradient descent optimization algorithms.

The use of dynamically shaped, noise corrected optical phased array output beams for laser welding is highly advantageous and enables rapid beam steering, fast power modulation, fast beam focusing and beam shape tailoring. Both the speed and quality with which a material may be cut are improved using dynamically shaped, noise corrected optical phase array output in comparison to conventional laser cutting methods. It is appreciated that but for the provision of noise correction, in accordance with preferred embodiments of the present invention, the shape and position of the optical phased array output beam would be degraded, thereby degrading the quality, speed and precision of the laser cutting process.

In order to maintain output beam intensity as the far-field intensity pattern of the beam moves, as is advantageous in certain laser cutting applications, movement of the output beam may be controlled such that the beam spends more time at lower-intensity positions so as to compensate for reduced power delivery thereat. Additionally or alternatively, an intensity profile mask such as an ND filter may be applied to the output beam in order to modify the intensity thereof.

Reference is now made to FIGS. 5A-5G, which are simplified illustrations of possible far-field motion of an output of an optical phased array laser system of the types illustrated in FIGS. 1A-4C.

Figure 5A:
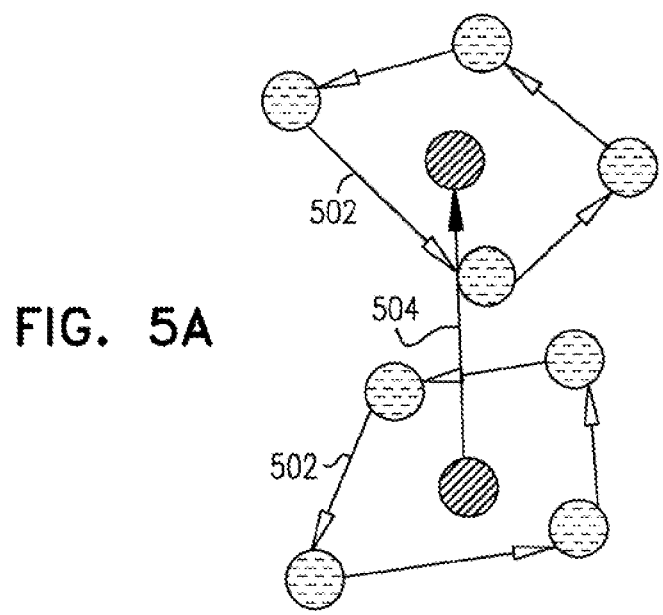
FIGS. 5A-5G are simplified illustrations of possible far-field motion of an output of an optical phased array laser system of any of the types illustrated in FIGS. 1A-4C.
Figure 5B:
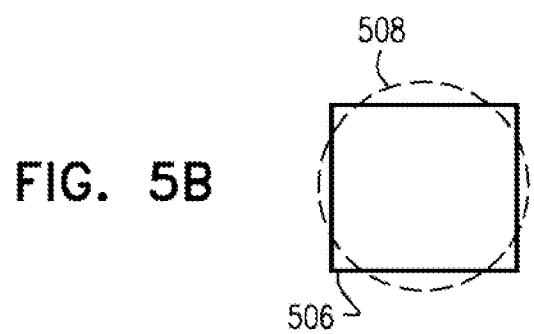

As detailed hereinabove, the use of dynamically shaped, noise corrected optical phased array output beams in various laser applications, including but not limited to laser cutting, laser additive manufacturing, laser welding and laser free-space optical communication, is highly advantageous and enables rapid beam steering, fast power modulation, fast beam focusing and beam shape tailoring. Exemplary far-field patterns illustrating rapid beam steering in accordance with embodiments of the present invention are shown in FIGS. 5A and 5B. These beam steering patterns may be provided in combination with and so as to compliment mechanical spatial modulation of the beam, such as mechanical beam steering. Mechanical beam steering may be due to motion provided by positioning table 104 shown in FIG. 1A; due to mirror scanning, such as in an additive manufacturing system of the type shown in FIG. 2A; due to mechanical motion between laser system 300 and receiver 303 shown in FIG. 3A; due to motion provide by robot 404 shown in FIG. 4A, or due to any other source of mechanical motion.

The mechanical motion may be desired or undesired motion. Preferably, the far-field rapid beam steering provided by embodiments of the present invention compliments the mechanical motion so as to achieve the desired combined beam motion. The desired combined motion may be faster and/or more precise than would be produced as a result of mechanical beam modulation alone.

As seen in FIG. 5A, dynamically shaped, noise corrected optical phased array output beams may exhibit rapid multipoint jumping, as illustrated by first beam paths 502, which rapid multipoint jumping compliments beam motion due to mechanical scanning, represented by a second beam path 504.

By way of example, such multipoint jumping may be advantageous in material processing, wherein time is taken for energy to be absorbed at each point of the material being processed. Multipoint jumping allows the beam to jump between points, returning to each point multiple times, thus facilitating the processing of many points in parallel. Further by way of example, such multipoint jumping may be advantageous in communication systems by allowing transmission to multiple locations in parallel.

As seen in FIG. 5B, the use of dynamically shaped, noise corrected optical phased array output beams also facilitates rapid scanning, as illustrated by a third beam path 506, which rapid scanning compliments beam motion due to mechanical scanning represented by a fourth beam path 508. Such rapid scanning facilitates continuous, smooth mechanical beam motion, fine features of which may be provided by far-field dynamic shaping in accordance with embodiments of the present invention. Furthermore, dynamic noise corrected far field modulation may be provided in combination with mechanical beam motion in order to correct inaccuracies that may be present in the mechanically modulated beam patterns.

Figure 5C:
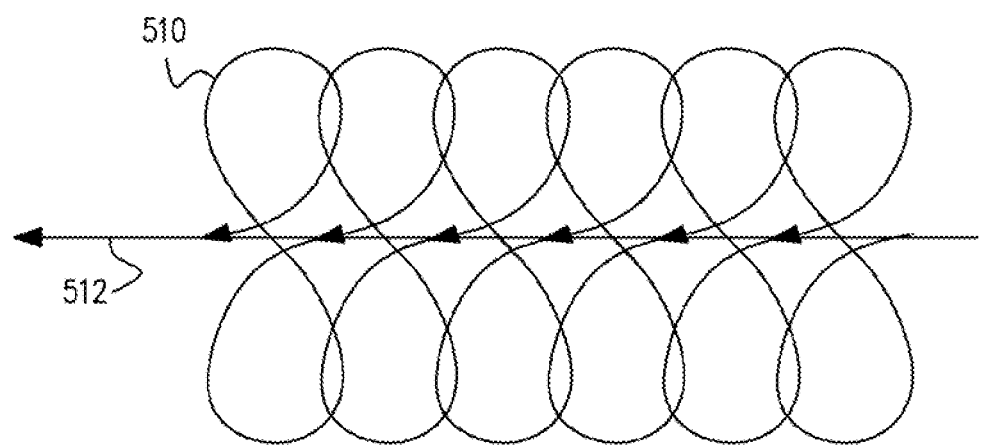

An exemplary far field beam pattern illustrating electro-optical beam wobble in accordance with preferred embodiments of the present invention is shown in FIG. 5C. As seen in FIG. 5C, the dynamically shaped, noise corrected optical phased array output beam is controlled so as to exhibit a rapid beam wobble 510 along a direction of beam motion 512, particularly useful, for example, in a laser welding system such as that illustrated in FIG. 4A.

Figure 5D:
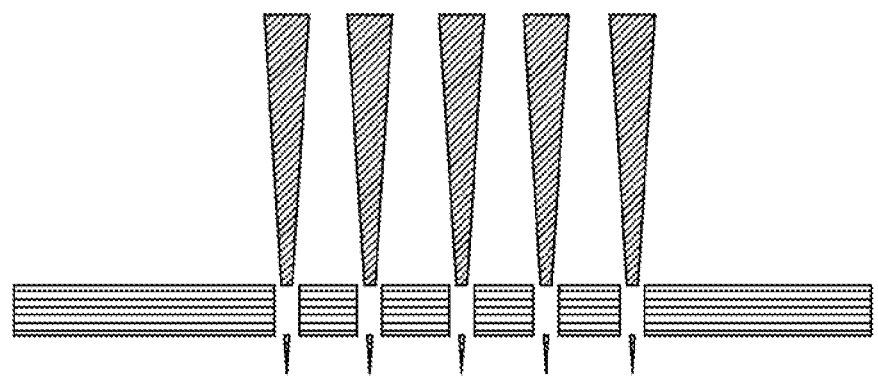
Figure 5E:
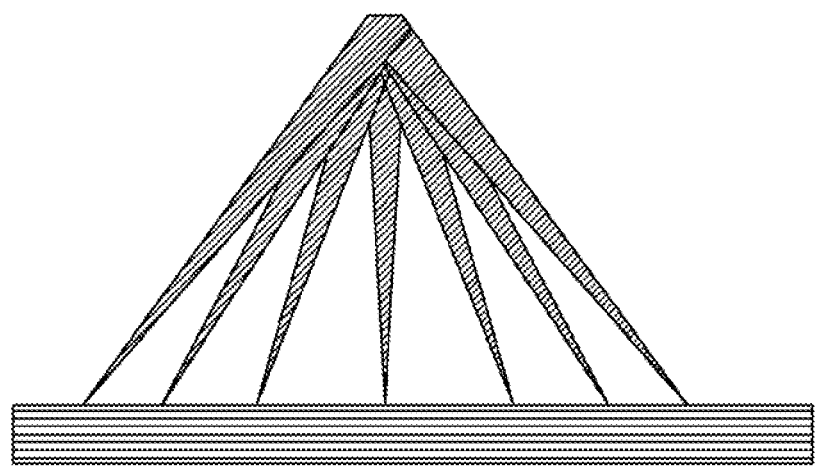
Figure 5F:
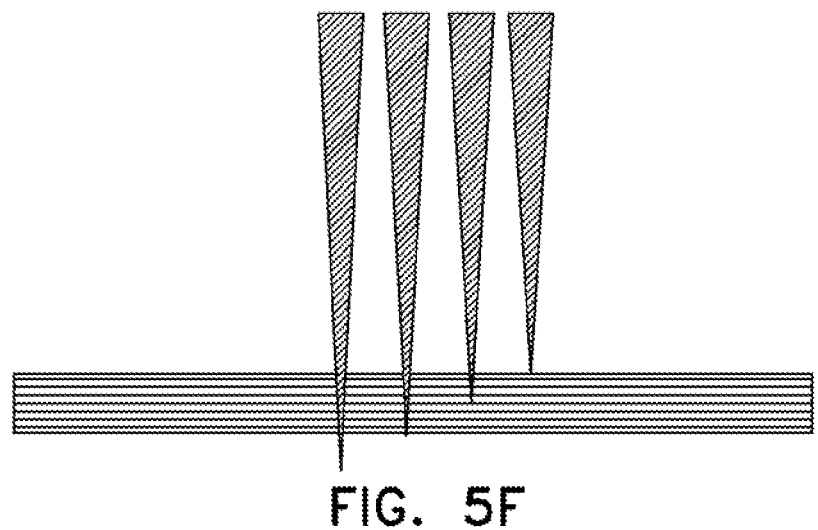

Exemplary far-field beam patterns illustrating dynamic modification of depth of focus in accordance with preferred embodiments of the present invention are shown in FIGS. 5D-5F. As seen in FIGS. 5D-5F, the depth of the beam focus may be dynamically changed by systems of the present invention, allowing variable beam focal length for scanning (FIG. 5E) and for deep cutting (FIGS. 5D and 5F), particularly useful, for example, in cutting, additive manufacturing and welding systems of the types illustrated in FIGS. 1A, 2A and 4A.

Figure 5G:
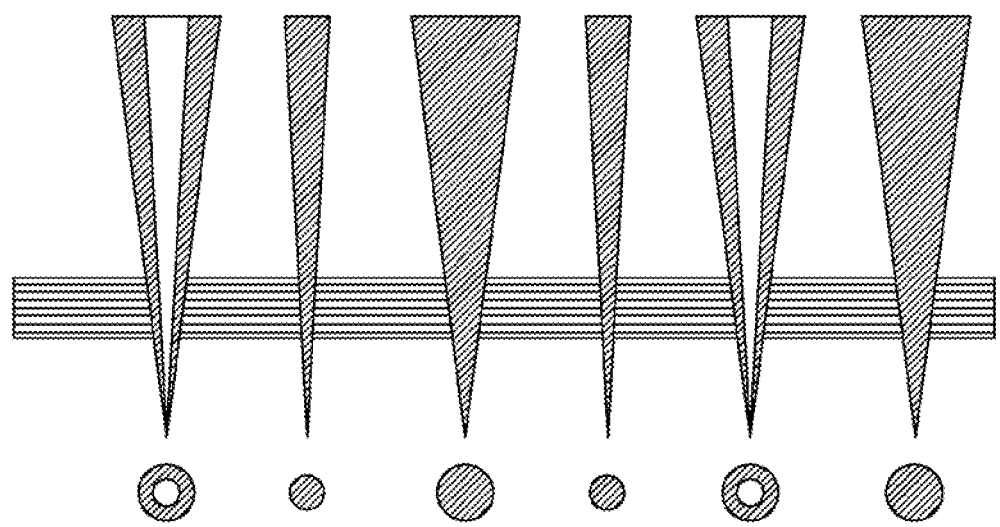

Exemplary far-field beam patterns illustrating dynamic beam shaping in accordance with preferred embodiments of the present invention are shown in FIG. 5G. As seen in FIG. 5G, the shape of the beam may be dynamically changed to create a desired beam shape output. This may be particularly useful, for example, in cutting, additive manufacturing and welding systems of the types illustrated in FIGS. 1A, 2A and 4A, as well as in other contexts. As is well known in the art, the quality and speed of laser cutting, welding and 3D printing are typically influenced by beam size and shape. The present invention allows dynamic adaptation of the beam to the optimum shape at any point.

It is appreciated that the various far-field beam motion patterns illustrated in FIGS. 5A-5G are all preferably produced by systems of the present invention using digital electronic controls and without requiring any moving parts.

Figure 6:
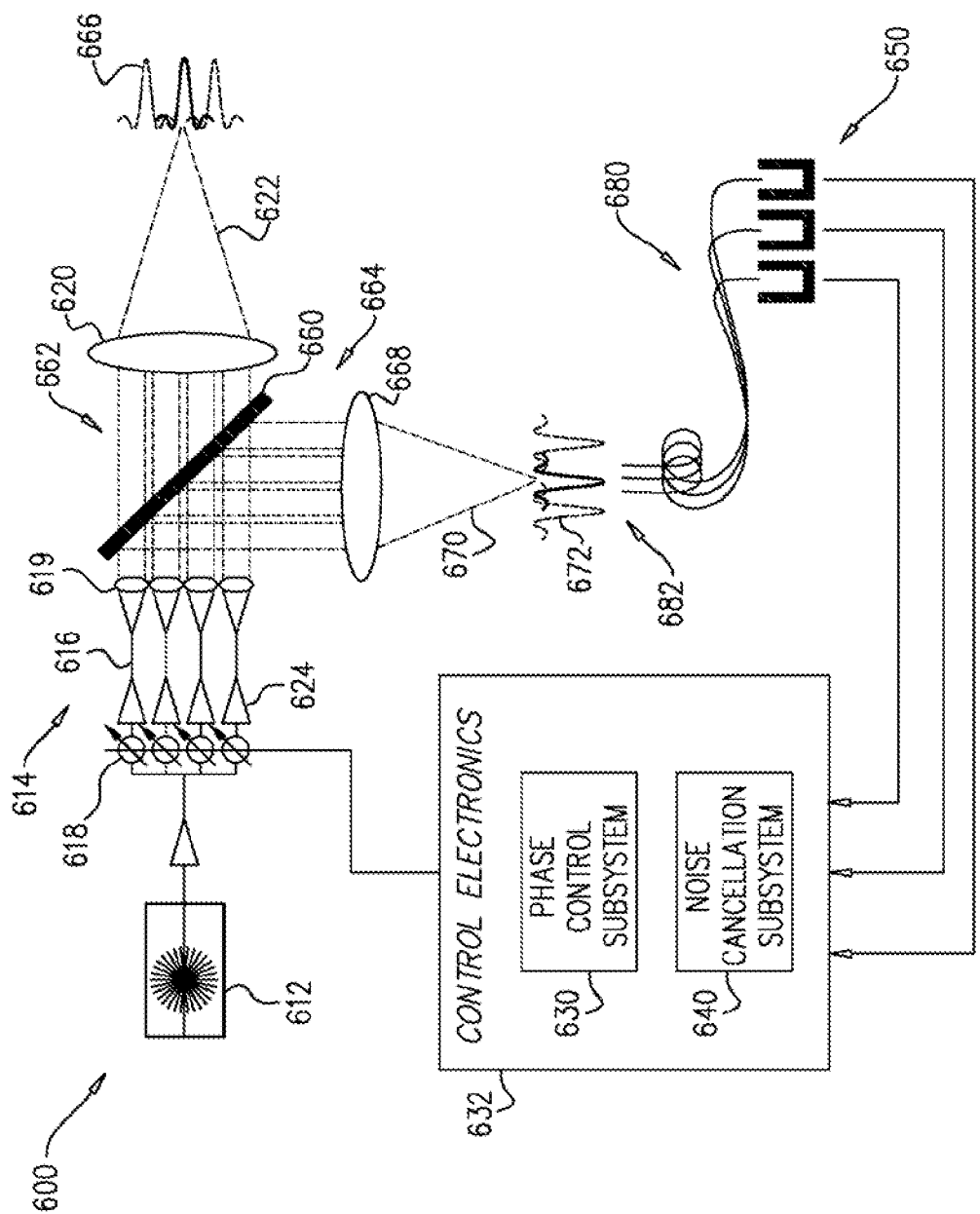
FIG. 6 is a simplified schematic illustration of an optical phased array laser system including multiple detectors and corresponding multiple closely spaced optical pathways, constructed and operative in accordance with yet another preferred embodiment of the present invention.

Reference is now made to FIG. 6, which is a simplified schematic illustration of an optical phased array laser system including multiple detectors and corresponding multiple closely spaced optical pathways, constructed and operative in accordance with a preferred embodiment of the present invention.

As seen in FIG. 6, there is provided an optical phased array (OPA) laser 600. OPA laser 600 may be generally of the type shown in any of FIGS. 1A-4C and preferably includes a seed laser 612 and a laser beam splitting and combining subsystem 614. Splitting and combining subsystem 614 preferably receives an output laser beam from seed laser 612 and splits the output laser beam into a plurality of sub-beams along a corresponding plurality of channels 616. Here, by way of example only, an output from seed laser 612 is shown to be split into four sub-beams along four channels 616 although it is appreciated that splitting and combining subsystem 614 may include a fewer or greater number of channels along which the output of seed laser 612 is split, and typically may include a far greater number of channels such as 32 or more channels.

The relative phase of each sub-beam may be individually modulated by a phase modulator 618, preferably located along each of channels 616. Each phase modulated sub-beam produced by the splitting and subsequent phase modulation of the output of seed laser 612 preferably propagates towards a collimating lens 619. The individually collimated, phase modulated sub-beams are subsequently combined, for example at a focal lens 620, to form an output beam 622.

Splitting and combining subsystem 614 may also provide laser amplification of the sub-beams, preferably following the splitting of the output beam of seed laser 612 into sub-beams and prior to the combining of the sub-beams to form output beam 622. Here, by way of example, splitting and combining subsystem 614 is shown to include a plurality of optical amplifiers 624 located along corresponding ones of channels 616 for amplifying each sub-beam. It is appreciated, however, that such amplification is optional and may be omitted, depending on the power output specifications of OPA laser 600.

The phase of output beam 622, and hence the position and shape of the far-field intensity pattern thereof, is controlled, at least in part, by the relative phases of the constituent sub-beams combined to form output beam 622. As described hereinabove with reference to FIGS. 1A-5G, in many applications, such as laser cutting, laser welding, laser additive manufacturing and optical free space communications, it is desirable to dynamically move and shape the far-field intensity pattern of the output beam. This may be achieved in laser system 600 by laser splitting and combining subsystem 614 dynamically varying the relative phases of the individual sub-beams and thereby varying the phase of the combined laser output 622 so as dynamically to control the position and shape of the far-field intensity pattern thereof.

The relative phases of the sub-beams are preferably predetermined in accordance with the desired laser output pattern. Particularly preferably, the varying relative phases are applied by a phase control subsystem 630. Phase control subsystem 630 preferably forms a part of a control electronics module 632 in OPA laser 600 and preferably controls each phase modulator 618 so as to dynamically modulate the relative phases of the sub-beams along channels 616, as described hereinabove with reference to phase control subsystem 130, 230, 330, 430 of FIGS. 1A, 2A, 3A and 4A respectively.

Due to noise inherent in OPA system 600, output beam 622 has noise. Noise in output beam 622 is typically phase noise created by thermal or mechanical effects and/or by the amplification process in the case that optical amplifiers 624 are present in OPA system 600. OPA system 600 preferably includes a noise cancellation subsystem 640 operative to provide a noise cancellation phase correction output in order to cancel out the noise in output beam 622 in a manner detailed henceforth.

Particularly preferably, noise cancellation subsystem 640 employs an algorithm to sense and correct phase noise in the combined laser output, preferably, although not necessarily, of the type described hereinabove with reference to FIGS. 1A-4C. The noise cancellation phase correction output is preferably provided by noise cancellation subsystem 640 to phase modulators 618 so as to correct phase noise in output beam 622 and thus avoid distortion of the shape and position of the far field intensity pattern of output beam 622 that would otherwise be caused by the noise. Noise cancellation subsystem 640 may be included in control electronics module 632.

In order to facilitate application of phase variation and noise correction to output beam 622, a portion of the output of OPA laser 600 is preferably extracted and directed towards a plurality of detectors 650. The extracted portion of the output beam preferably functions as a reference beam, based on characteristics of which the required noise correction and/or phase variation may be calculated.

In accordance with a preferred embodiment of the present invention, plurality of sub-beams along channels 616 are directed towards a beam splitter 660. Beam splitter 660 preferably splits each sub-beam into a transmitted portion 662 and a reflected portion 664 in accordance with a predetermined ratio. For example, beam splitter 660 may split each sub-beam with a 99.9% transmitted: 0.01% reflected ratio.

The transmitted portion 662 of the sub-beams preferably propagates towards focal lens 620, at which focal lens 620 the sub-beams are combined to form output beam 622 having a far-field intensity pattern 666. The reflected portion 664 of the sub-beams is preferably reflected towards an additional focal lens 668, at which additional focal lens 668 the sub-beams are combined to form an output reference beam 670 having a far-field intensity pattern 672 incident on a surface of one or more of plurality of detectors 650.

As described hereinabove with reference to FIGS. 1A-4C, the noise cancellation phase correction output is preferably provided based on taking into consideration noise measured at detectors 650 at a noise sampling rate. The output beam 622 is controlled in such a way that the far-field intensity pattern 672 is incident upon detectors 650 during the course of the dynamic changes to the shape and position of output and reference far-field intensity patterns 666, 672 at a rate that is equal to or higher than the required noise sampling rate. The noise in reference beam 670 is taken into consideration during those intermittent times at which the far-field intensity pattern 672 is returned to detectors 650.

At time interstices between the intermittent times at which far-field intensity pattern 672 is incident upon detectors 650, the phase of the combined output beams 622, 670 is varied in order to dynamically change the shape and position of the far-field intensity pattern thereof. The combined laser output is varied at a phase varying rate which exceeds the noise sampling rate, in order to rapidly change the phase and hence shape and position of the far-field intensity pattern. The noise cancellation and phase variation are thus preferably provided at mutually different times and rates.

The use of a plurality of detectors 650, rather than a single detector, has been found to be highly advantageous in certain embodiments of the present invention, giving rise to various advantages detailed henceforth. However, in the case of the focal length of additional focal lens 668 being relatively short, as is desirable in order for system 600 to be formed in a compact manner, ones of plurality of detectors 650 would preferably be required to be positioned very close to one another. The desirable inter-detector spacing may be of the order of several microns. Such a high spatial density arrangement of detectors 650 is typically impractical, particularly in the case of conventional detectors having dimensions far greater than the preferred inter-detector spacing.

In order to allow high spatial density sampling of far-field intensity pattern 672 by plurality of detectors 650, OPA system 600 preferably includes a plurality of optical pathways, here embodied by way of example as a plurality of optical fibers 680, correspondingly coupled to plurality of detectors 650. Reference beam 670 preferably enters one or more of a plurality of open ends 682 of optical fibers 680 and travels therealong to corresponding ones of detectors 650. Plurality of ends 682 of plurality of optical fibers 680 is preferably arranged so as to have a spatial density greater than a spatial density of plurality of detectors 650, meaning that the spacing between open ends 682 of adjacent ones of optical fibers 680 is smaller than the spacing between corresponding adjacent ones of detectors 650. This allows detectors 650 to detect far-field intensity pattern 672 at closely spaced intervals therealong, without detectors 650 being required to be themselves physically located at those closely spaced positions at which the far-field intensity pattern 672 is sampled.

By way of example, ends 682 of optical fibers 680 may be interspaced by a distance of several microns, whereas detectors 650 coupled to corresponding ones of optical fibers 680 may be interspaced by a distance of several millimeters. It is appreciated that such an arrangement allows the use of conventional detectors in system 600, and obviates the need for expensive and complex miniaturized detection systems.

The inclusion of a plurality of detectors 650, effectively closely spaced as facilitated by the actual physical close spacing of ends 682 of optical fibers 680, has been found to be highly advantageous in preferred embodiments of the present invention. In particular, the use of a plurality of detectors 650 rather than only a single detector 150, as shown in FIGS. 1A, 2A, 3A and 4A, allows the far-field intensity pattern 672 to be sampled at a plurality of locations rather than at only a single location. This facilitates more efficient and/or more frequent noise correction during the dynamic variation of output beam 622.

It is appreciated that the plurality of closely spaced optical pathways is not limited to being embodied as a plurality of optical fibers 680 having ends 682 very closely interspaced, with an inter-fiber end spacing of less than the inter-detector spacing of detectors 650. Rather, the scope of the present invention extends to include any suitable plurality of optical pathways that may deliver therealong far-field intensity reference pattern 672 to plurality of detectors 650, and may be arranged with a sufficiently great spatial density.

Figure 7:
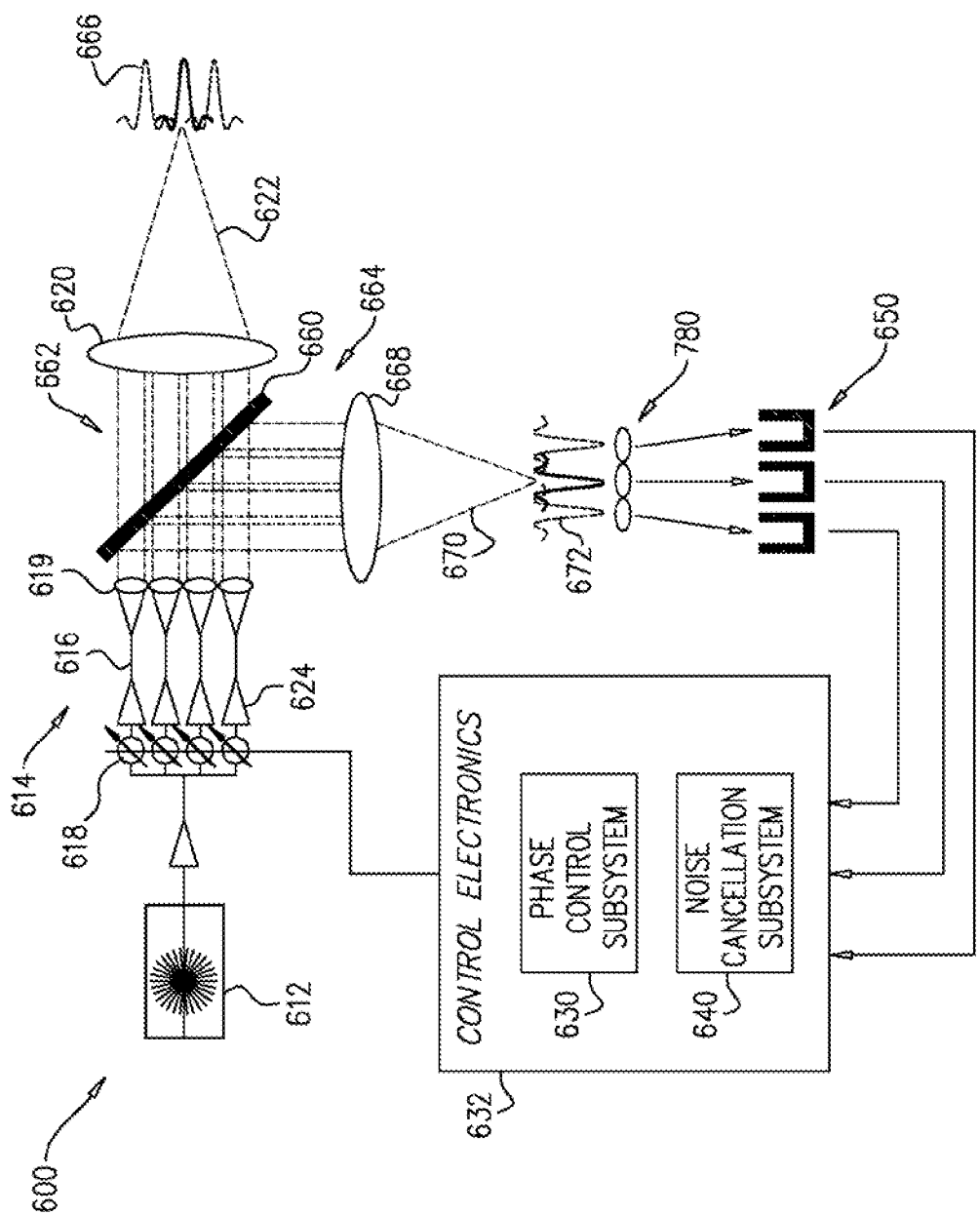
FIG. 7 is a simplified schematic illustration of an optical phased array laser system including multiple detectors and corresponding multiple closely spaced optical pathways, constructed and operative in accordance with still another preferred embodiment of the present invention.
Figure 8:
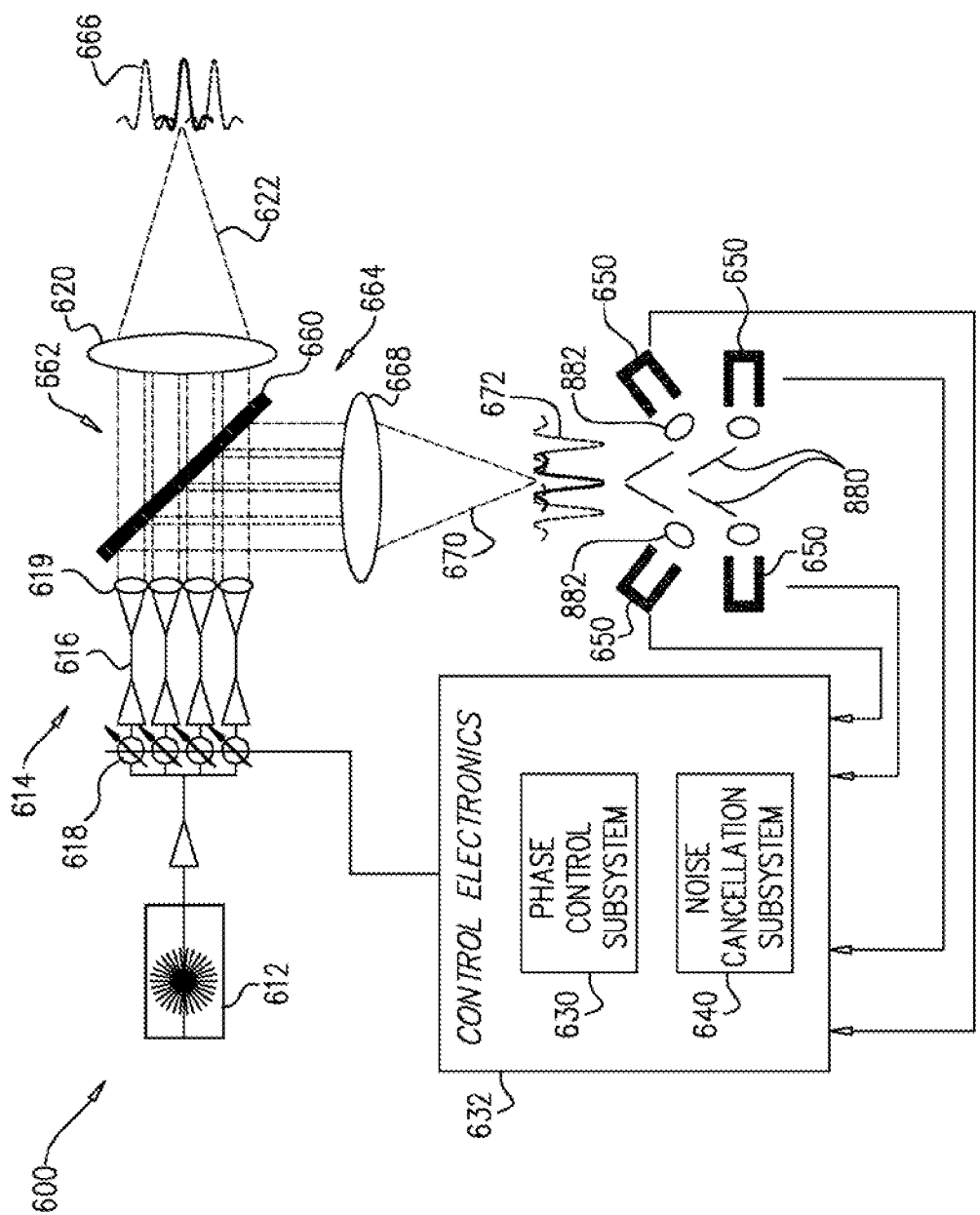
FIG. 8 is a simplified schematic illustration of an optical phased array laser system including multiple detectors and corresponding multiple closely spaced optical pathways, constructed and operative in accordance with yet a further preferred embodiment of the present invention.

By way of example, the plurality of closely spaced optical pathways may be embodied as a plurality of lenses 780 as illustrated in FIG. 7. Plurality of lenses 780 may be very closely spaced so as to focus portions of far-field intensity reference pattern 672 towards plurality of less closely spaced detectors 650. Further by way of example, the plurality of closely spaced optical pathways may be embodied as a plurality of mirrors 880 operating in cooperation with a corresponding plurality of lenses 882 as illustrated in FIG. 8. Plurality of mirrors 880 may be very closely spaced so as to reflect portions of far-field intensity reference pattern 672 towards plurality of less closely spaced detectors 650.

It is appreciated that an OPA laser system of the type shown in any of FIGS. 6-8, including multiple detectors, may be incorporated in an OPA laser system of the type shown in any of FIGS. 1A, 2A, 3A and 4A in order to provide more efficient and/or more frequent noise correction to the phase-varied output thereof.

Figure 9:
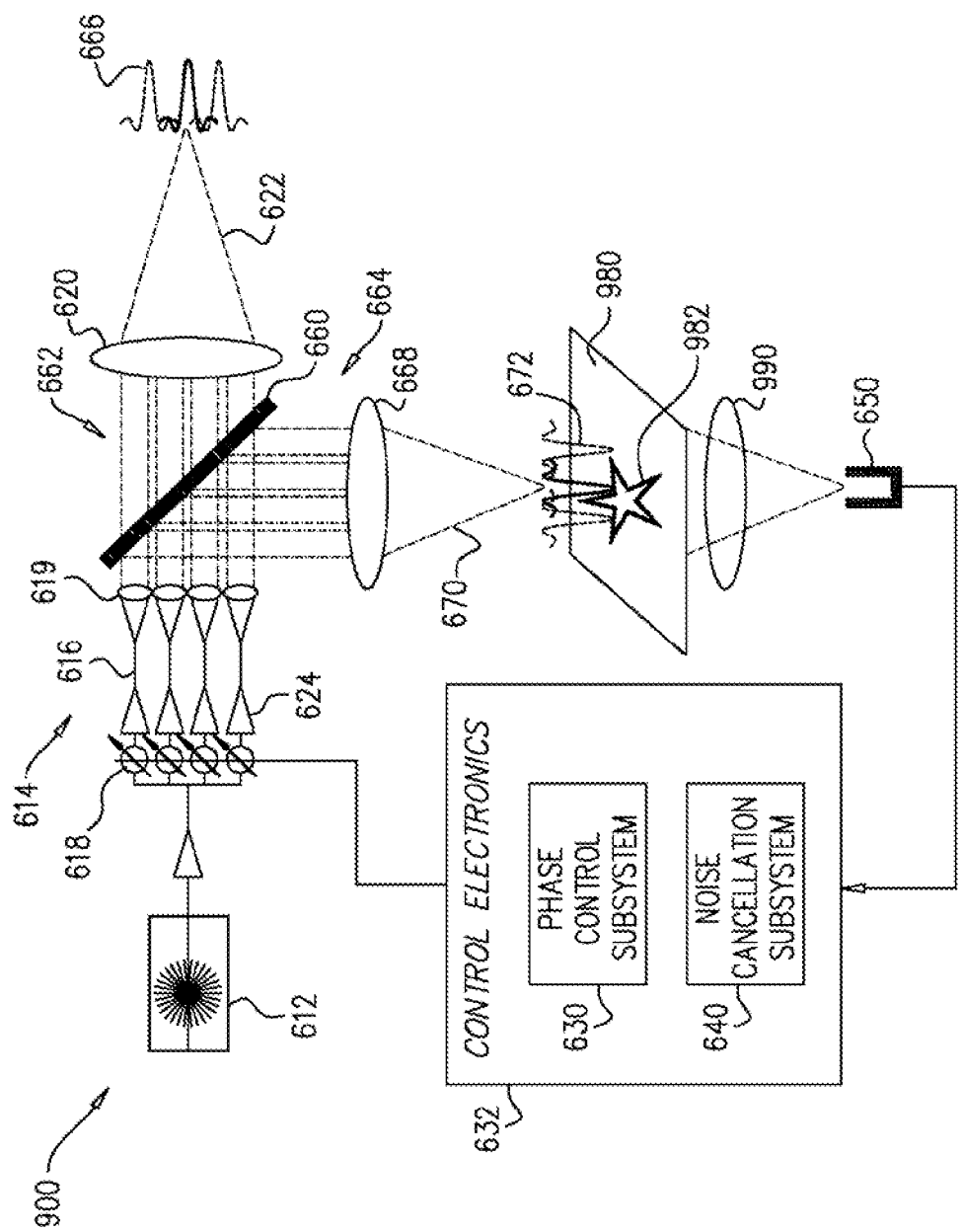
FIG. 9 is a simplified schematic illustration of an optical phased array laser system including a detector mask configured in accordance with an exemplary laser beam trajectory, constructed and operative in accordance with a preferred embodiment of the present invention.

Reference is now made to FIG. 9, which is a simplified schematic illustration of an optical phased array laser system including a detector mask configured in accordance with an exemplary laser beam trajectory, constructed and operative in accordance with a preferred embodiment of the present invention.

As seen in FIG. 9, there is provided an optical phased array (OPA) laser 900. OPA laser 900 may generally resemble OPA laser 600 of FIG. 6 in relevant aspects thereof, with the exception of the detector arrangement employed therein. Whereas OPA laser 600 preferably employs multiple detectors receiving an output beam by way of corresponding multiple closely spaced optical pathways, OPA laser 900 does not necessarily employ more than one detector.

It is particular feature of a preferred embodiment of the present invention illustrated in FIG. 9 that OPA laser 900 preferably includes an optical mask 980 having at least one transmissive region 982 for providing therethrough output reference beam 670 to at least one detector 650, here illustrated to comprise a single detector 650. Optical mask 980 is preferably an optically opaque element transmissive to beam 670 only in transmissive region 982. Here, by way of example, transmissive region 982 is shown to be formed as a star-shaped transmissive path, configured in accordance with a star-shaped trajectory of output and reference far-field intensity patterns 666, 672.

Output reference beam 670 is preferably transmitted through transmissive region 982 and focused on detector 650 by way of a focusing subsystem, here embodied by way of example, as a focusing lens 990. A noise cancellation phase correction output is preferably provided by noise cancellation subsystem 630 based on taking into consideration the intensity of far-field intensity pattern 672 focused and incident upon detector 650.

More specifically, the phases of output and reference beams 622, 670 are preferably dynamically varied by phase control subsystem 630 so as to cause output and reference beams 622 and 670 to traverse a predetermined trajectory, such as a star-shaped trajectory corresponding to the shape of star-shaped transmissive region 982. In the absence of noise in OPA laser 900, the trajectory traversed by output and reference beams 622 and 670 would at least nearly exactly correspond to the shape of transmissive region 982, such that an intensity of far-field intensity pattern 672 as detected by detector 650 would be a maximal, non-degraded intensity. However, due to the presence of noise in output and reference beams 622 and 670, a trajectory and shape of far-field intensity pattern 672 may somewhat deviate from the shape of transmissive region 982, such that a portion of reference beam 670 is incident upon opaque regions of mask 980 rather than on transmissive region 982, and thus not transmitted to detector 650 through transmissive region 982. In such a case, the intensity of far-field intensity pattern 672 as detected by detector 650 is lower than the maximal intensity that would be detected in the absence of noise.

The degradation in intensity of far-field intensity pattern 672 as measured by detector 650 is thus preferably indicative of the noise-resultant distortion of the trajectory of output and reference beams 622, 670 and thereby may be used to derive the required noise cancellation phase correction output, to be applied by noise cancellation subsystem 640.

It is appreciated that the above-described arrangement of detector 650 positioned behind mask 980 allows only a single detector 650 to be employed in order to sense the output intensity of reference beam 670 along a trajectory thereof, based on which a noise cancellation phase correction output may be applied. This is contrast to alternative detector arrangements not including mask 980, such as those described hereinabove with reference to FIGS. 6-8, in which multiple detectors may be employed in order to provide sufficiently efficient and/or frequent noise correction during the dynamic variation of output beam 622.

In addition to the variation of intensity of reference beam 670 as measured by detector 650 due to the distortion of the beam trajectory due to noise, the intensity of reference beam 670 typically may vary along the trajectory thereof, due to inherent intensity variations in far-field intensity pattern 672. This may complicate the noise correction feedback provided by detector 650, since variations in intensity of reference beam 670 may be attributable to noise or to inherent intensity variations not related to noise.

In order to improve the reliability of the noise correction feedback provided by detector 650, transmissive region 982 of mask 980 may be provided with regions of varying transparency, the transparency levels of which are set so as to compensate for inherent intensity variations in reference beam 670 along the trajectory thereof.

Figure 10:
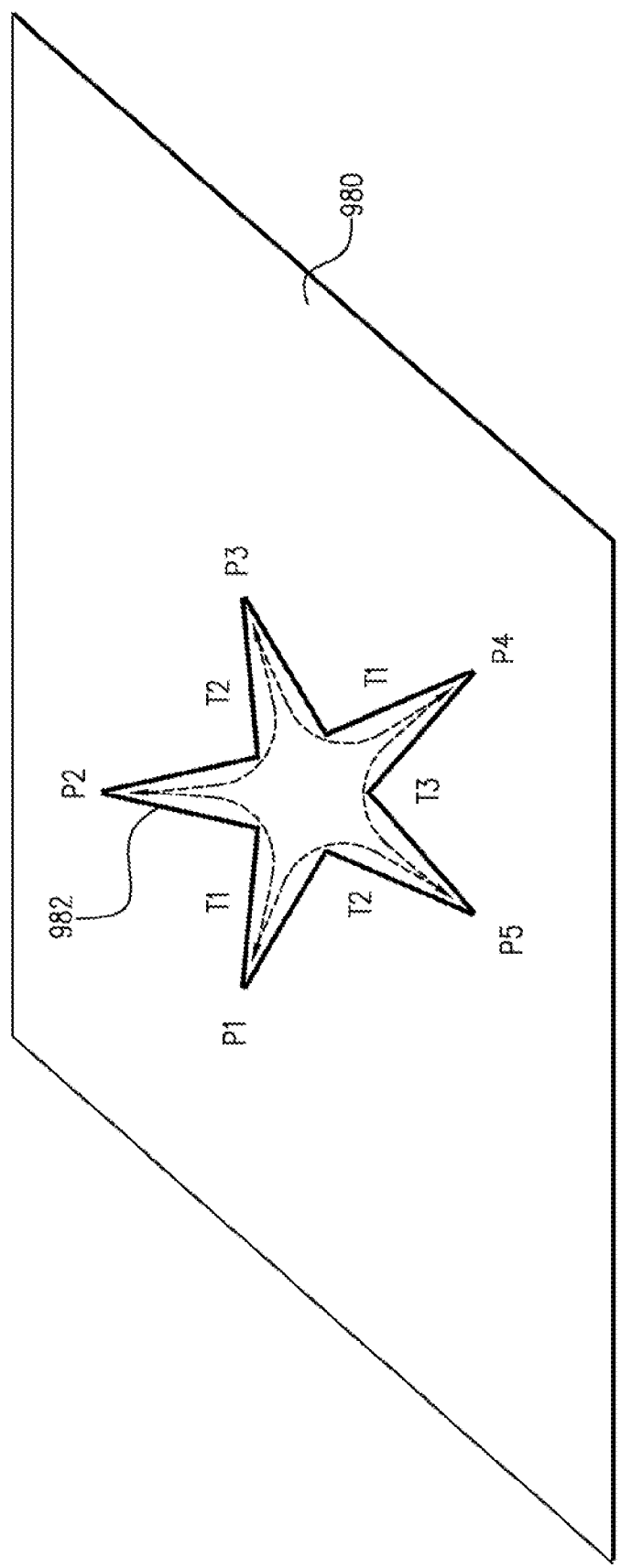
FIG. 10 is a simplified schematic illustration of a detector mask of the type illustrated in FIG. 9 showing varying levels of transparency thereof.

A highly simplified representation of transmissive region 982 of mask 980 having non-uniform transparency is shown in FIG. 10. As seen in FIG. 10, a first portion of transmissive region 982 defined between a first point P1 and a second point P2 thereof may have a first transparency T1; a second portion of transmissive region 982 defined between second point P2 and a third point P3 may have a second transparency T2, different from first transparency T1; a third portion of transmissive region 982 defined between third point P3 and a fourth point P4 may have first transparency T1; a fourth portion of transmissive region 982 defined between fourth point P4 and a fifth point P5 may have a third transparency T3, different from first and second transparencies T1 and T2; and a fifth point of transmissive region 982 defined between fifth point P5 and first point P1 may have second transparency T2.

It is appreciated that various portions of transmissive region 982 may have discretely differing transparency values or that the transparency of transmissive region 982 may gradually vary in a gradated way across various portions thereof, in accordance with the intensity compensation requirement of far-field intensity pattern 672.

Preferably, although not necessarily, mask 980 is an electronically modulated device such as an LCD screen or similar device. Properties of transmissive region 982 thus may be readily electronically modified in accordance with the output characteristics of reference beam 670.

It is appreciated that the particular shape of transmissive region 982 illustrated in FIGS. 9 and 10 is exemplary only and that transmissive region 982 may be configured in accordance with any trajectory of output and reference far-field intensity patterns 666 and 672. Additionally, it is appreciated that transmissive region 982 may include more than one transmissive region. In such a case, a single detector 650 may be used to receive light from all transmissive regions, or a corresponding number of detectors may be positioned with respect to each transmissive region.

Furthermore, it is appreciated that transmissive region 982 may additionally or alternatively be configured in accordance with a shape of output and reference far-field intensity patterns 666 and 672, rather than a trajectory thereof, as is detailed with reference to FIGS. 11 and 12.

Figure 11:
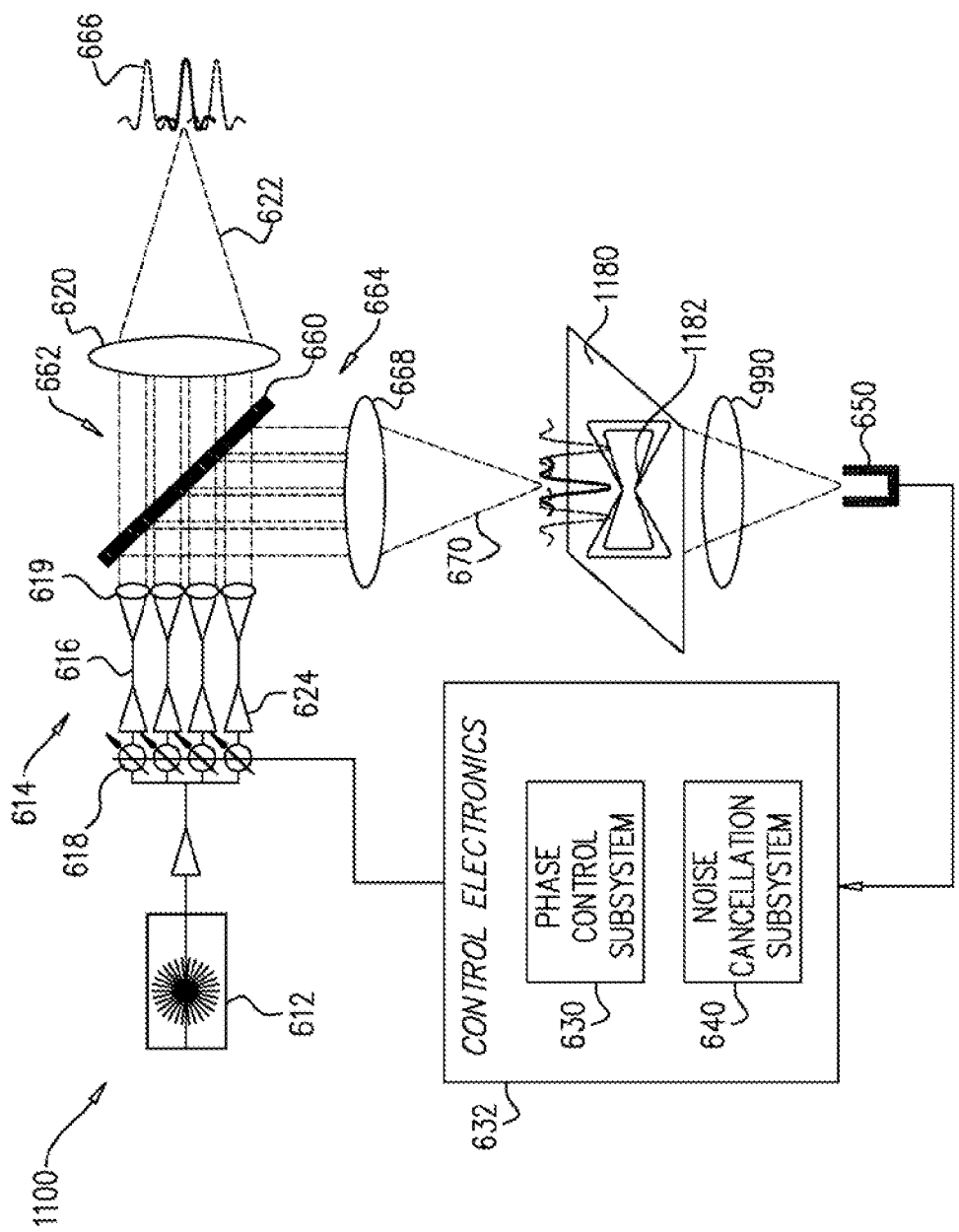
FIG. 11 is a simplified schematic illustration of an optical phased array laser system including a detector mask configured in accordance with an exemplary laser beam shape, constructed and operative in accordance with another preferred embodiment of the present invention.

Reference is now made to FIG. 11, which is simplified schematic illustration of an optical phased array laser system including a detector mask configured in accordance with an exemplary laser beam shape, constructed and operative in accordance with another preferred embodiment of the present invention.

As seen in FIG. 11, a system 1100 generally resembling system 900 in relevant aspects thereof may include an optical mask 1180 having at least one transmissive region 1182, replacing optical mask 980 of FIGS. 9 and 10. Optical mask 1180 may resemble optical mask 980 in all relevant aspects thereof, with the exception of transmissive region 1182 being configured in accordance with a shape of reference beam 670 rather than a trajectory thereof. Here, by way of example, transmissive region 1182 is shown to be a bow-tie shaped transmissive region, configured in accordance with a bow-tie shaped output and reference far-field intensity pattern 666 and 672.

Figure 12:
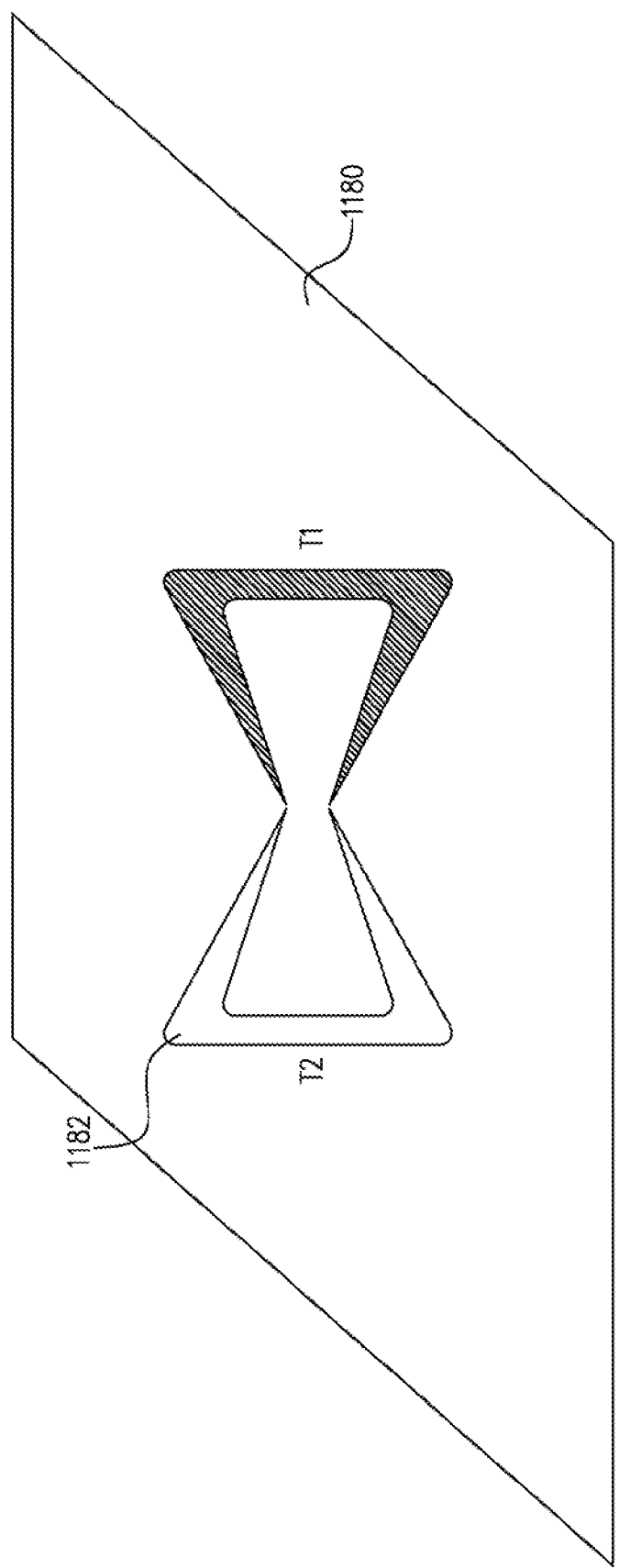
FIG. 12 is a simplified schematic illustration of a detector mask of the type illustrated in FIG. 11, showing varying levels of transparency thereof.

Transmissive region 1182 may have non-uniform transparency, a highly simplified representation of which is illustrated in FIG. 12. As seen in FIG. 12, a first portion of transmissive region 1182 may have a first transparency T1 and a second portion of transmissive region 1182 may have a second transparency T2, different from first transparency T1. As detailed hereinabove with reference to FIG. 10, various levels of transparency of transmissive region 1182 may be employed in order to compensate for inherent intensity variation in output beam 670 and thus improve the noise correction output provided based on the intensity detected at detector 650.

It is appreciated that transmissive regions 982 and 1182 of masks 980 and 1180 respectively may additionally or alternatively be embodied as reflective regions, reflecting therefrom output reference beam 670 towards detector 650. In such an arrangement, appropriate modifications and/or additions to focusing subsystem, here embodied by way of example as focusing lens 990, would be required, in order to direct output reference beam 670 from reflective region 982, 1182 onto a surface of detector 650. The reflective regions of masks 980 and 1180 may have uniform reflectivity. Alternatively, reflective regions of masks 980 and 1180 may have non-uniform reflectivity, in order to compensate for inherent intensity variations in output reference beam 670, as described hereinabove.

In the case that masks 980 and 1180 include a reflective region, masks 980 and 1180 may be embodied as an electrically modulated device such as a digital micromirror device (DMD) or other similar device.

It is appreciated that an OPA laser system of the type shown in any of FIGS. 9-12, including at least one detector receiving an output reference beam via a transmissive or reflective optical mask, may be incorporated in an OPA laser system of the type shown in any of FIGS. 1A, 2A, 3A and 4A in order to provide more efficient noise correction to the phase-varied output thereof.

Figure 13:
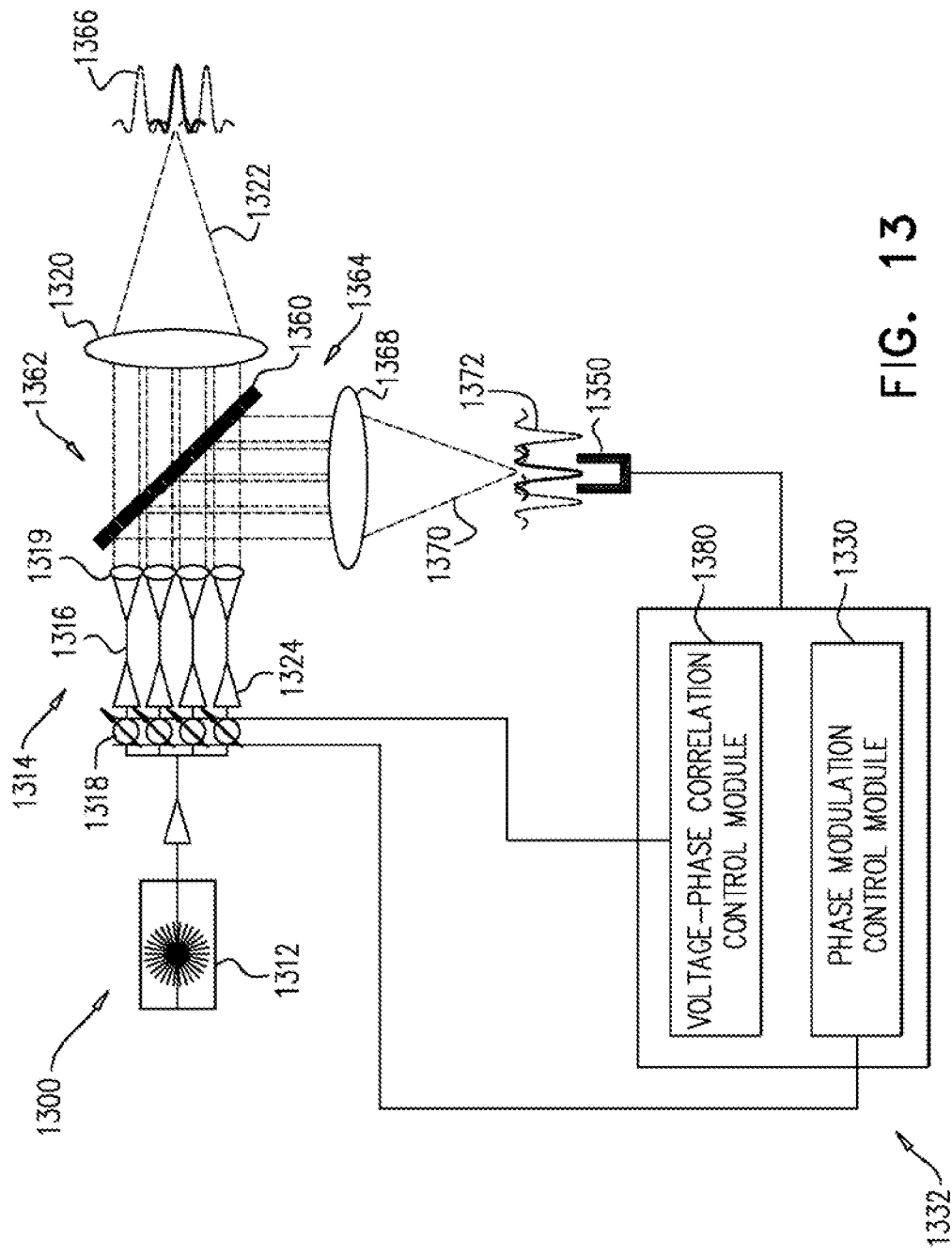
FIG. 13 is a simplified schematic illustration of an optical phased array laser system including voltage-phase correlating functionality, constructed and operative in accordance with a preferred embodiment of the present invention.

Reference is now made to FIG. 13, which is a simplified schematic illustration of an optical phased array laser system including voltage-phase correlating functionality, constructed and operative in accordance with a preferred embodiment of the present invention.

As seen in FIG. 13, there is provided an OPA laser system 1300. OPA laser 1300 may be of a type generally resembling OPA lasers 100, 200, 300, 400 described hereinabove with reference to FIGS. 1A-4C. OPA laser 1300 preferably comprises a seed laser 1312 and a laser beam splitting and combining subsystem 1314. Splitting and combining subsystem 1314 preferably receives an output laser beam from seed laser 1312 and splits the output laser beam into a plurality of sub-beams along a corresponding plurality of channels 1316.

The relative phase of each sub-beam may be individually modulated by a phase modulator 1318, preferably located along each of channels 1316. Each phase modulated sub-beam produced by the splitting and subsequent phase modulation of the output of seed laser 1312 preferably propagates towards a collimating lens 1319. The individually collimated, phase modulated sub-beams are subsequently combined, for example at a focal plane of a lens 1320, to form an output beam 1322.

Splitting and combining subsystem 1314 may also provide laser amplification of the sub-beams, preferably following the splitting of the output beam of seed laser 1312 into sub-beams and prior to the combining of the sub-beams to form output beam 1322. Here, by way of example, splitting and combining subsystem 1314 is shown to include a plurality of optical amplifiers 1324 located along corresponding ones of channels 1316 for amplifying each sub-beam. It is appreciated, however, that such amplification is optional and may be omitted, depending on the power output specifications of OPA laser 1300.

The phase of output beam 1322, and hence the position and shape of the far-field intensity pattern thereof, is controlled, at least in part, by the relative phases of the constituent sub-beams combined to form output beam 1322. In many applications, such as laser cutting, laser welding, free-space optical communications and laser additive manufacturing described hereinabove, it is desirable to dynamically move and shape the far-field intensity pattern of the output beam. As described hereinabove with reference to FIGS. 1A-4C, dynamic variation of parameters of the output beam may be achieved by dynamically varying the relative phases of the individual sub-beams along channels 1316 and thereby varying the phase of the combined laser output 1322 so as to dynamically control the position and shape of the far-field intensity pattern thereof.

The relative phases of the sub-beams are preferably predetermined in accordance with the desired laser output pattern. Particularly preferably, the varying relative phases are applied by a phase modulation control module 1330. Phase modulation control module 1330 preferably provides a voltage to phase modulators 1318 in order for phase modulators 1318 to produce the desired phase modulation of sub-beams along channels 1316. It is appreciated that phase modulation control module 1330 in combination with phase modulators 1318 forms a particularly preferred embodiment of a phase modulation subsystem 1332, which phase modulation subsystem 1332 is preferably operative to vary a phase of combined laser output 1322.

In order to facilitate application of phase variation to output beam 1322, a portion of the output of OPA laser 1300 is preferably extracted and directed towards at least one detector 1350. The extracted portion of the output beam preferably functions as a reference beam, based on characteristics of which the required phase variation may be calculated. In the embodiment shown in FIG. 13, plurality of sub-beams along channels 1316 are directed towards a beam splitter 1360. Beam splitter 1360 preferably splits each sub-beam into a transmitted portion 1362 and a reflected portion 1364 in accordance with a predetermined ratio. For example, beam splitter 1360 may split each sub-beam with a 99.9% transmitted: 0.01% reflected ratio.

The transmitted portion 1362 of the sub-beams preferably propagates towards focal lens 1320, at which focal lens 1320 the sub-beams are combined to form output beam 1322 having a far-field intensity pattern 1366. The reflected portion 1364 of the sub-beams preferably propagates towards an additional focal lens 1368, at which additional focal lens 1368 the sub-beams are combined to form an additional reference beam 1370 having a far-field intensity pattern 1372 incident on a surface of detector 1350.

Detector 1350 preferably samples the far-field intensity pattern 1372 incident thereon. It is appreciated that although detector 1350 is illustrated in FIG. 13 as being embodied as a single detector directly receiving far-field intensity pattern 1372 thereupon, multiple detectors may alternatively be employed in accordance with any of the multiple detector arrangements illustrated in any of FIGS. 6-8. Alternatively, a single detector such as detector 1350 may be employed in conjunction with an optical mask, in accordance with any of the arrangements illustrated in any of FIGS. 9-12.

Detector 1350, in cooperation with phase modulation subsystem 1332, then preferably optimizes the relative phases of the sub-beams in order to achieve a desired far-field intensity pattern 1372 and corresponding far-field intensity pattern 1366. Various algorithms suitable for phase optimization include sequential or non-sequential optimization algorithms, including the phase optimization regime described hereinabove with reference to FIGS. 1A-4C.

In operation of phase modulation subsystem 1332, phase modulation control module 1330 preferably applies a voltage to each of phase modulators 1318 and phase modulators 1318 consequently produce a phase modulating output corresponding to the voltage applied. It is appreciated that in order for phase modulators 1318 to produce the required phase shift so as to dynamically shape far-field intensity pattern 1366 in accordance with a predetermined pattern, phase modulation control module 1330 must apply to each phase modulator 1318 exactly that voltage corresponding to the specific phase modulation output required to be produced by each phase modulator 1318.

In order to ensure that the voltage applied by phase modulation control module 1330 to phase modulators 1318 produces the required and intended phase modulating output by phase modulators 1318, OPA laser 1300 preferably includes a voltage-to-phase correlation subsystem 1380. Voltage-to-phase correlation subsystem 1380 is preferably operative to correlate a voltage applied to phase modulation subsystem 1332 to a phase modulating output produced by phase modulation subsystem 1332 and more specifically by phase modulators 1318 thereof.

Furthermore, voltage-to-phase correlation subsystem 1380 is preferably operative to provide a voltage-to-phase correlation output useful in calibrating phase modulation subsystem 1332. Preferably, voltage-to-phase correlation subsystem performs the correlating between the voltage and phase modulating output periodically during the course of varying of the phase of combined laser output 1322.

It is appreciated that the inclusion of a correlation and calibration subsystem such as voltage-to-phase correlation subsystem 1380 in OPA laser 1300 is highly advantageous since it ensures that the voltages being applied to phase modulators 1318 are indeed those voltages required to produce the desired phase shift of output beam 1322 and hence shape of far-field intensity pattern 1366. This is particularly important given that phase modulators suitable for use in preferred embodiments of the present invention are typically highly sensitive devices, different ones of which typically exhibit different voltage-phase relationships. Furthermore, the voltage-phase relationship of an individual phase modulator is not constant but rather may vary over time and in response to operating conditions.

It is appreciated that the phase modulation and calibration provided by phase modulation control module 1330 and voltage-phase correlation control module 1380 respectively, are preferably, although not necessarily, performed in coordination with the application of noise correction to the output of OPA laser 1300 in the case that the output of laser 1300 has noise. In this case, phase modulation control module 1330 and voltage-phase correlation control module 1380 may be considered to combinedly form a particularly preferred embodiment of a phase control subsystem such as phase control subsystem 130 (FIG. 1A), 230 (FIG. 2A), 330 (FIG. 3A) and 430 (FIG. 4A).

Figure 14:
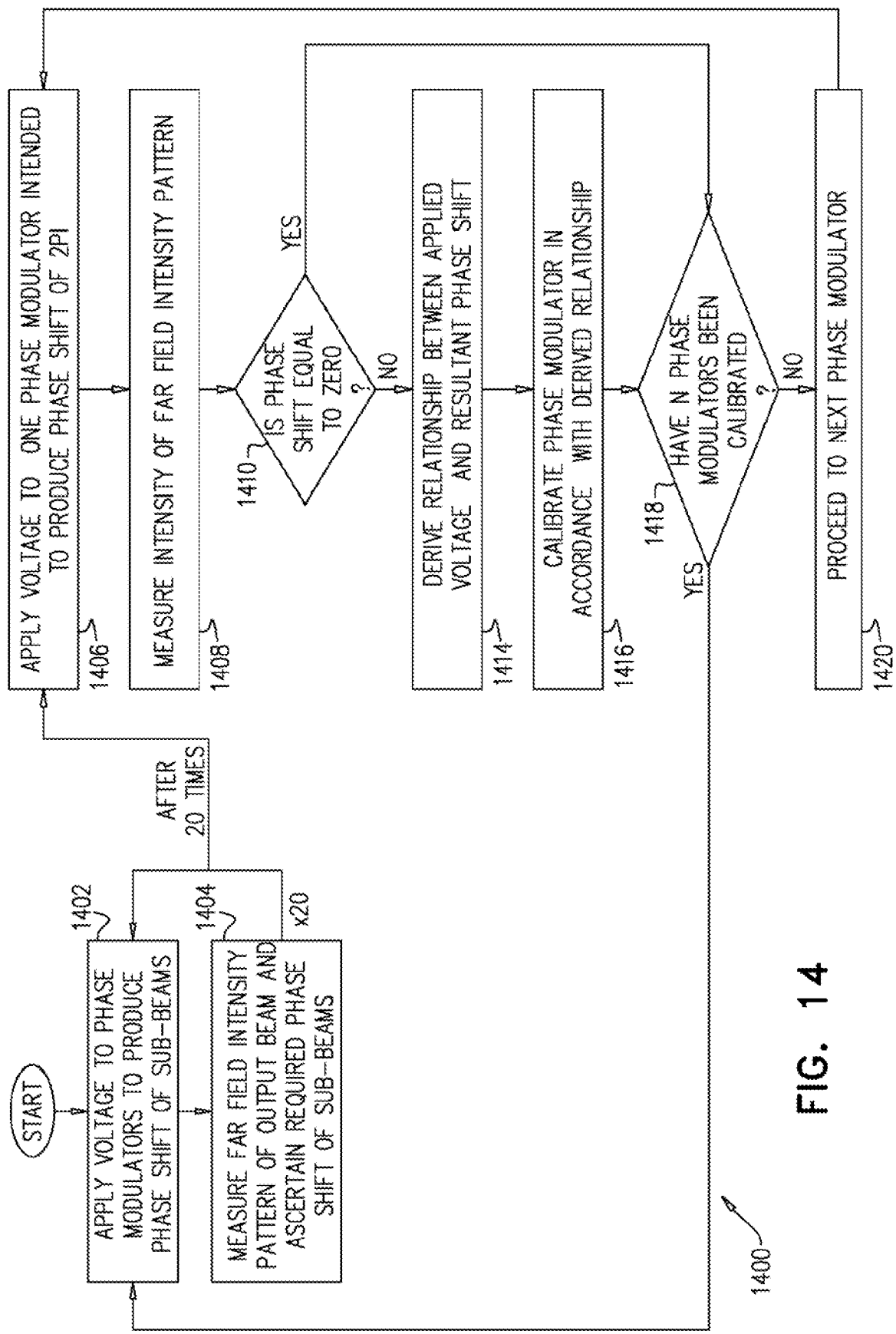
FIG. 14 is a simplified flow chart illustrating steps for performing voltage-phase correlation in a system of the type illustrated in FIG. 13.

An exemplary voltage-phase correlation and calibration regime suitable for use in the present invention is illustrated in a flow chart 1400 in FIG. 14. It is appreciated, however, that the specific steps of flow chart 1400 are exemplary only and that voltage-phase correlation subsystem 1380 may be implemented as any suitable subsystem within OPA laser 1300 capable of calibrating phase modulation subsystem 1332 periodically during the phase variation of output beam 1322. Furthermore, it is appreciated that the various steps illustrated in flow chart 1400 are not necessarily performed in the order shown and described and that various ones of the steps may be omitted, or may be supplemented by additional or alternative steps, as will be apparent to one skilled in the art.

As seen at a first step 1402, phase modulation control module 1330 preferably applies a voltage to phase modulators 1318 in order to produce the desired phase shift of sub-beams along channels 1316. The far-field intensity pattern of the reference output beam 1372 is then measured at detector 1350, as seen at a second step 1404. The required phase shift of the sub-beams is then ascertained and a voltage again applied to phase modulators 1318. The application of a voltage at first step 1402 and measurement of the reference output beam 1372 at second step 1404 may be periodically repeated a large number of times at a given repetition rate. By way of example only, first and second steps may be repeated 20 times at a rate of 1 million times per second.

Following the repetition of first and second steps 1402, 1404 a predetermined number of times, such as 20 times, voltage-to-phase correlation subsystem 1380 may be activated. As seen a third step 1406, a voltage intended to produce a phase shift of $2\pi$ is preferably applied to one phase modulator 1318. As seen at a fourth step 1408, the intensity of far-field intensity pattern 1372 is then measured, preferably at detector 1350.

The phase shift of far-field intensity pattern 1372 is then checked at a fifth step 1410 to ascertain whether the phase shift is zero. It is understood that in the case that the voltage applied at third step 1406 is indeed that voltage producing a phase shift of $2\pi$, the phase shift of beam 1322 would be zero and the intensity of far-field intensity pattern 1372 would thus not change in response to the voltage applied. In this case, the phase modulator 1318 to which the $2\pi$ phase shift was applied at third step 1406 is found to be correctly calibrated and no additional calibration of the particular phase modulator 1318 is required.

It is further understood that in the case that the voltage applied at third step 1406 does not produce a phase shift of $2\pi$, the phase shift of beam 1322 would be non-zero and the intensity of far-field intensity pattern 1372 would thus change in response to the voltage applied, as found to be the case at a seventh step 1414. In this case, the relationship between the applied voltage and the resultant phase shift is preferably derived at seventh step 1414. Phase modulator 1318 is preferably then calibrated in accordance with the voltage-phase relationship derived at seventh step 1414, as seen at an eighth step 1416.

As seen at a query 1418, following the calibration of a particular phase modulator 1318 at eighth calibration step 1416 or ascertainment of proper calibration of a particular phase modulator 1318 at fifth step 1410, voltage-to-phase correlation subsystem 1380 preferably checks whether a predetermined number of phase modulators 1318 has been calibrated and proceeds to calibrate the next phase modulator if necessary, as seen at a ninth step 1420. Voltage-to-phase correlation subsystem 1380 may successively calibrate all of phase modulators 1318 included in system 1300 or may successively calibrate a predetermined number of phase modulators 1318, such as N phase modulators 1318. Once the predetermined number of phase modulators 1318 has been calibrated, subsystem 1380 is preferably deactivated and phase variation of output beam 1322 is resumed at step 1402.

It is understood that the frequency at which voltage-to-phase correlation subsystem 1380 is activated is preferably significantly lower than the frequency at which phase variation of output beam 1322 is performed. By way of example phase variation of output beam 1322 may be performed 1 million times per second while voltage-to-phase correlation may be activated 1 time per second.

Furthermore, it is understood that although flow chart 1400 does not include steps for noise correction, such noise correction may be applied during the course of the phase shifting of the sub-beams contributing to output beam 1322, as described hereinabove with reference to FIGS. 1A-4C.

Figure 15:
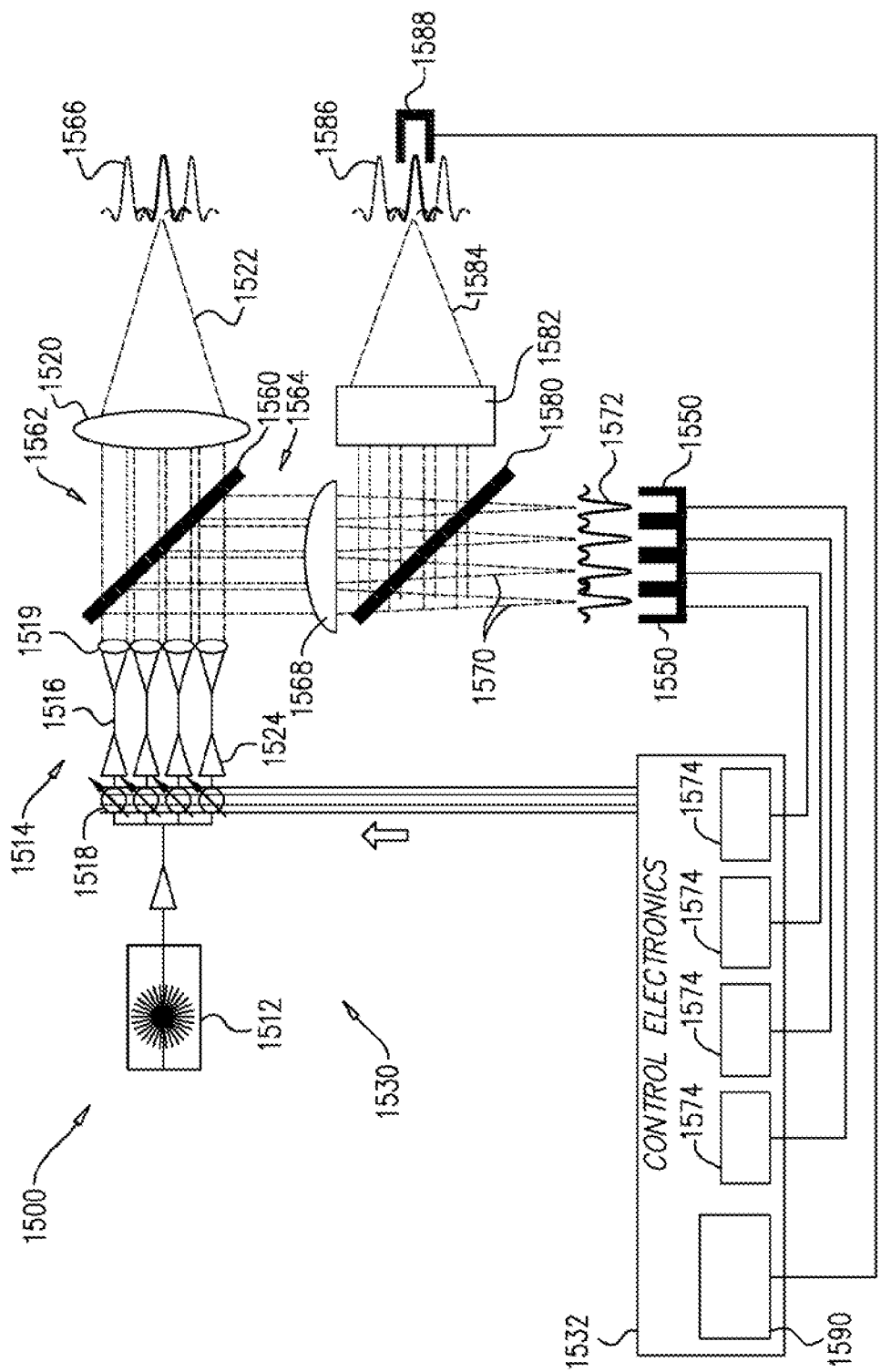
FIG. 15 is a simplified schematic plan view illustration of an optical phased array laser system including scaled phase modification of dynamic beams, constructed and operative in accordance with an additional preferred embodiment of the present invention.

Reference is now made to FIG. 15, which is a simplified schematic plan view illustration of an optical phased array laser system including scaled phase modification of dynamic beams, constructed and operative in accordance with an additional preferred embodiment of the present invention.

As seen in FIG. 15, there is provided an optical phased array (OPA) laser system 1500, which OPA laser 1500 may be of a type generally described hereinabove with reference to FIGS. 1A-4C. OPA laser 1500 preferably comprises a seed laser 1512 and a laser beam splitting and combining subsystem 1514. Splitting and combining subsystem 1514 preferably receives an output laser beam from seed laser 1512 and splits the output laser beam into a plurality of sub-beams along a corresponding plurality of channels 1516. Here, by way of example only, an output from seed laser 1512 may be split into a 4×4 matrix of 16 sub-beams along 16 corresponding channels 1516, four of which sub-beams and channels 1516 are seen in the top view of OPA laser 1500 in FIG. 15. It is appreciated, however, that splitting and combining subsystem 1514 may include a fewer or greater number of channels along which the output of seed laser 1512 is split, and typically may include a far greater number of channels such as 32 or more channels.

The relative phase of each sub-beam may be individually modulated by a phase modulator 1518, preferably located along each of channels 1516. Each phase modulated sub-beam produced by the splitting and subsequent phase modulation of the output of seed laser 1512 preferably propagates towards a collimating lens 1519. The individually collimated, phase modulated sub-beams are subsequently combined, for example at a focal plane of lens 1520, to form an output beam 1522.

Splitting and combining subsystem 1514 may also provide laser amplification of the sub-beams, preferably following the splitting of the output beam of seed laser 1512 into sub-beams and prior to the combining of the sub-beams to form output beam 1522. Here, by way of example, splitting and combining subsystem 1514 is shown to include a plurality of optical amplifiers 1524 located along corresponding ones of channels 1516 for amplifying each sub-beam. It is appreciated, however, that such amplification is optional and may be omitted, depending on the power output specifications of OPA laser 1500.

The phase of output beam 1522, and hence the position and shape of the far-field intensity pattern thereof, is controlled, at least in part, by the relative phases of the constituent sub-beams combined to form output beam 1522. In many applications, such as laser cutting, laser welding, free-space optical communications and laser additive manufacturing, as described hereinabove, it is desirable to dynamically move and shape the far-field intensity pattern of the output beam. As described hereinabove with reference to FIGS. 1A-4C, dynamic variation of parameters of the output beam may be achieved by dynamically varying the relative phases of the individual sub-beams along channels 1516 and thereby varying the phase of the combined laser output 1522 so as to dynamically control the position and shape of the far-field intensity pattern thereof.

In the case of OPA laser 1500 including a large number of individual sub-beams, phase measurement and corresponding phase modification of each sub-beam with respect to the phases of all of the other ones of the sub-beams, may be challenging due to the large number of individual sub-beams involved. Specifically, due to the large number of individual sub-beams contributing to the combined output 1522, the time taken to measure and modify the phase of each individual sub-beam with respect to the other sub-beams so as to dynamically control the phase of the combined laser output 1522 may be unacceptably long. Furthermore, the signal to noise ratio may be unacceptably low.

It is a particular feature of a preferred embodiment of the present invention that OPA laser 1500 preferably includes a phase modulation subsystem 1530 for carrying out phase modulation of the combined laser output in a scaled manner. More specifically, phase modulation subsystem 1530 preferably groups at least a portion of the sub-beams provided by laser splitting and combining subsystem 1514 into groups and then performs phase modulation within each group of sub-beams, only with respect to other sub-beams within the group. Such group phase modulation is preferably performed in parallel across various individual groups of sub-beams. Phase modulation subsystem 1530 then preferably optimizes the phase of each group of sub-beams with respect to the phases of other ones of the groups of sub-beams, in order to vary the phase of the combined laser output 1522, in a manner detailed henceforth.

Phase modulation subsystem 1530 preferably includes a phase control electronic module 1532 in operative control of phase modulators 1518. Phase control electronic module 1532 preferably controls each phase modulator 1518 so as to dynamically modulate the relative phases of the sub-beams along channels 1516, in accordance with the desired far-field intensity pattern of output beam 1522, as ascertained by phase modulation subsystem 1530.

In order to facilitate application of phase variation to output beam 1522, a portion of the output of OPA laser 1500 is preferably extracted and directed towards a plurality of detectors 1550. The extracted portion of the output beam preferably functions as a reference beam, based on characteristics of which the required phase variation may be calculated. In the embodiment shown in FIG. 15, plurality of sub-beams along channels 1516 are directed towards a beam splitter 1560. Beam splitter 1560 preferably splits each sub-beam into a transmitted portion 1562 and a reflected portion 1564 in accordance with a predetermined ratio. For example, beam splitter 1560 may split each sub-beam with a 99.9% transmitted: 0.01% reflected ratio.

The transmitted portion 1562 of the sub-beams preferably propagates towards focal lens 1520, at which focal lens 1520 the sub-beams are combined to form output beam 1522 having a far-field intensity pattern 1566. The reflected portion 1564 of the sub-beams preferably propagates towards a cylindrical lens 1568. Cylindrical lens 1568 is preferably operative to receive the reflected portion 1564 of the sub-beams and group the sub-beams into a multiplicity of groups, by converging the sub-beams along a direction of curvature of lens 1568. Here, by way of example, the sub-beams are shown to be converged into four groups 1570, each group 1570 being made up of four sub-beams.

Preferably, each group 1570 of sub-beams grouped by cylindrical lens 1568 forms a beam having a far-field intensity pattern 1572 incident on a surface of corresponding one of plurality of detectors 1550. Each detector 1550 preferably samples the group far-field intensity pattern 1572 incident thereon. Each detector 1550, in cooperation with a corresponding control electronics sub-module 1574 included in control module 1532, then preferably optimizes the relative phases of the sub-beams within the group of sub-beams 1570 sampled thereby, with respect to the phases of the other sub-beams within the group 1570. Such sampling and optimization is preferably carried out in parallel and preferably simultaneously for ones of far-field intensity patterns 1572 across all of detectors 1550. Various algorithms suitable for phase optimization include sequential or non-sequential optimization algorithms including noise correction algorithms, such as described above with reference to FIGS. 1A-4C.

In order to optimize the relative phase of each of groups 1570 with respect to other ones of groups 1570, a portion of groups 1570 is preferably directed, by way of an auxiliary beam splitter 1580, to an auxiliary cylindrical lens 1582. It is appreciated that the curvature of auxiliary cylindrical lens 1582 is preferably orthogonal with respect to the curvature of cylindrical lens 1568 in order to focus the sub-beams. Auxiliary cylindrical lens 1582 preferably causes groups of sub-beams 1570 to converge into a single beam 1584 having a far-field intensity pattern 1586 incident on an auxiliary detector 1588. Auxiliary detector 1588 preferably receives thereat a single beam having a far field intensity pattern 1586 corresponding to that of a combination of all of groups of sub-beams 1570. Auxiliary detector 1588 preferably samples and optimizes the phases of groups 1570 with respect to each other, in cooperation with an additional phase control electronics sub-module 1590 included in electronic control module 1532. Particularly preferably, one function of phase control electronic module 1532 is to control each phase modulator 1518 so as to apply a phase shift maximizing the total power on auxiliary detector 1588.

It is appreciated that carrying out phase modulation in the above-described scaled manner, wherein the phase of each sub-beam is optimized with respect to the phases of other sub-beam members of its group 1570 and the phases of groups 1570 are optimized with respect to each other so as to vary the phase of the combined laser output 1522, is far quicker and less complex than optimizing the phase of each individual sub-beam with respect to the phases of all of the other sub-beams in OPA 1500. Furthermore, this allows the phase optimization to be carried out by individual sets of control electronics in each control electronics sub-module 1574 respectively coupled to each detector 1550, rather than requiring a single set of control electronics and improves the signal to noise ratio.

Figure 16:
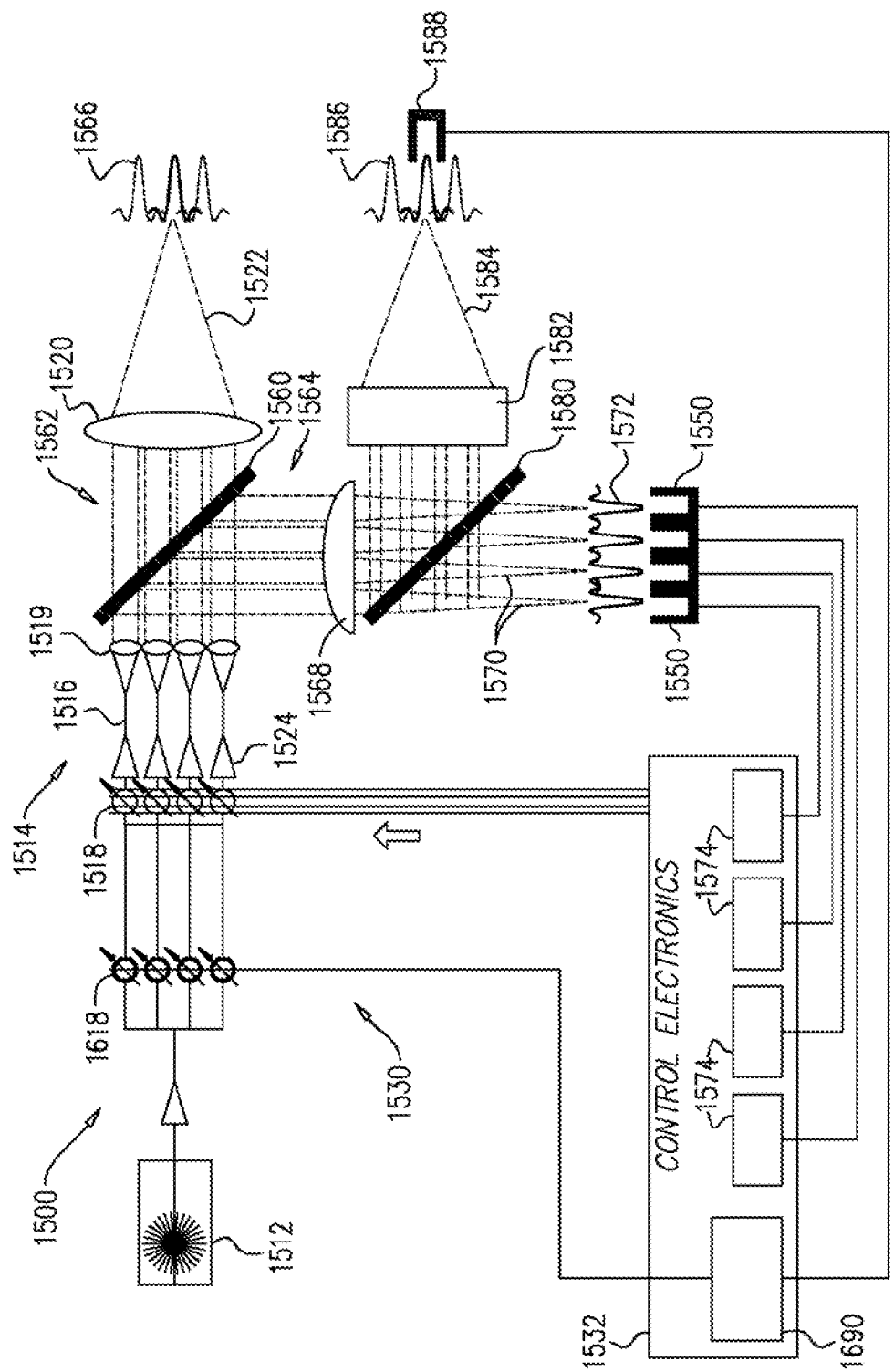
FIG. 16 is a simplified schematic plan view illustration of an optical phased array laser system including scaled phase modification of dynamic beams, constructed and operative in accordance with yet an additional preferred embodiment of the present invention.

It is appreciated that the functionality of optimizing the relative phase of each of groups 1570 with respect to other ones of groups 1570 may alternatively be carried out by additional group phase modulators, operative to modulate the collective phase of each of groups 1570, rather than by individual phase modulators 1518 operative to modulate the individual phase of each sub-beam member of each of groups 1570. An exemplary implementation of such an arrangement is illustrated in FIG. 16 and may generally resemble the phase modulation arrangement described in U.S. Pat. No. 9,893,494, the disclosure of which is hereby incorporated by reference, in some aspects thereof.

As seen in FIG. 16, system 1500 may be modified by adding a series of group phase modulators corresponding to the number of groups 1570. Here, by way of example, system 1500 comprises 16 sub-beams, four of which sub-beams are included in each of four groups 1570, such that a total of four additional group phase modulators 1618 may be included in system 1500, as seen in FIG. 16. Each group phase modulator 1618 is preferably common to the four channels 1516 forming part of each group 1570 and provides a phase shift optimizing the collective group phase of the sub-beams along the four channels 1516 connected thereto.

Preferably, ones of group phase modulator 1618 are controlled by an additional control sub-module 1690, preferably included in control module 1532. Auxiliary detector 1588 is preferably coupled to the additional control sub-module 1690. It is appreciated that optimizing the relative phases of groups 1570 with respect to each other by group phase modulators 1618 rather than by individual sub-beam phase modulators 1518 may be more efficient and may simplify the phase modulation process, but requires the employment of additional phase modulating and circuitry elements, thus increasing the cost and complexity of system 1500.

Variation of the phase of combined laser output 1522 preferably provides spatial modulation of the output 1522. It is appreciated that, due to the scaled nature of the phase modulation carried out by phase modulation subsystem 1530, the phase of combined laser output 1522 may be varied very rapidly, at a rate greater than that achievable by mechanical spatial modulation mechanisms. The spatial modulation provided by OPA laser 1500 may optionally be augmented by additional mechanical spatial modulation mechanisms, as are known in the art, or may not involve mechanical spatial modulation.

It is understood that the particular structure and configuration of optical elements shown herein, including beam splitter 1560, focal lens 1520, cylindrical lens 1568, auxiliary beam splitter 1580 and auxiliary cylindrical lens 1582 is exemplary only and depicted in a highly simplified form. It is appreciated that OPA laser system 1500 may include a variety of such elements, as well as additional optical elements, including, by way of example only, additional or alternative lenses, optical fibers and coherent free-space far-field combiners.

Furthermore, it is appreciated that cylindrical lens 1568 may have optical properties so as to group the individual sub-beams into mutually similar or identical groups comprising equal numbers of sub-beams. Alternatively, cylindrical lens 1568 may have optical properties so as to group the individual sub-beams into mutually differing groups comprising different numbers of sub-beams.

Figure 17A:
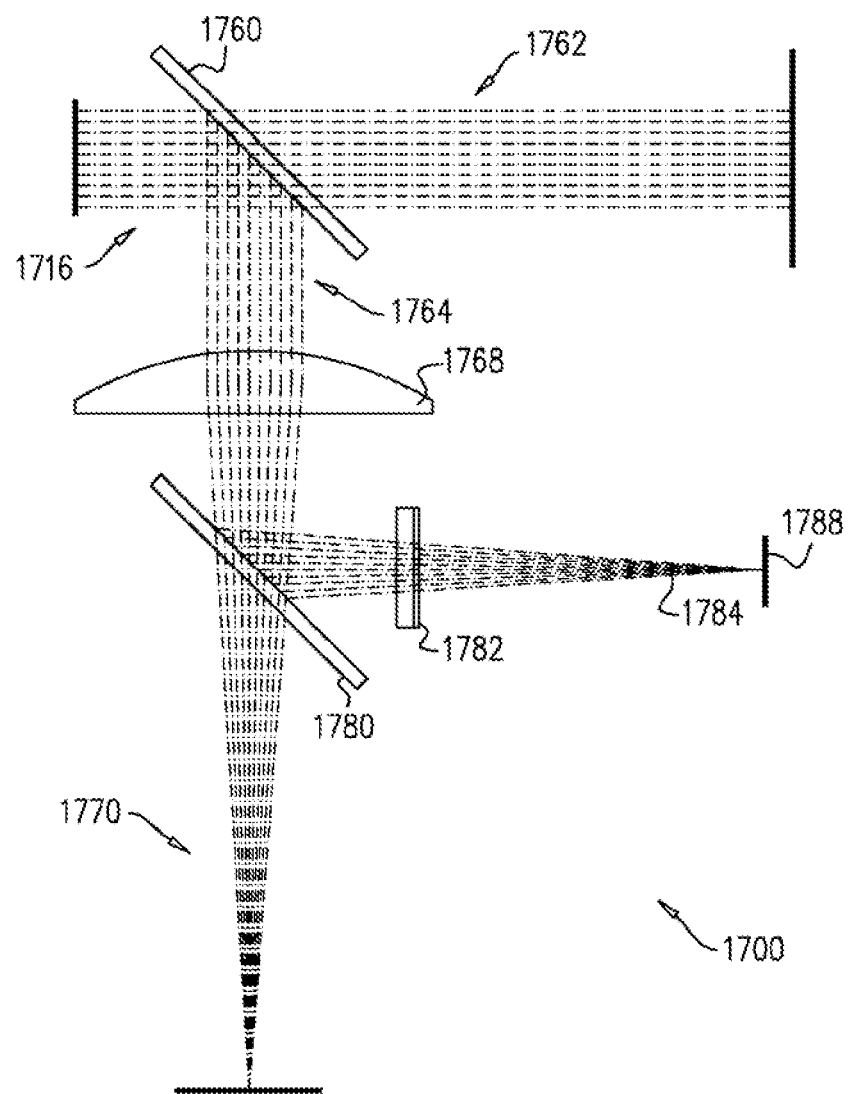
FIGS. 17A and 17B are simplified top and perspective views of an optical phased array laser system including scaled phase modification of dynamic beams of a type illustrated in FIG. 15 or FIG. 16.
Figure 17B:
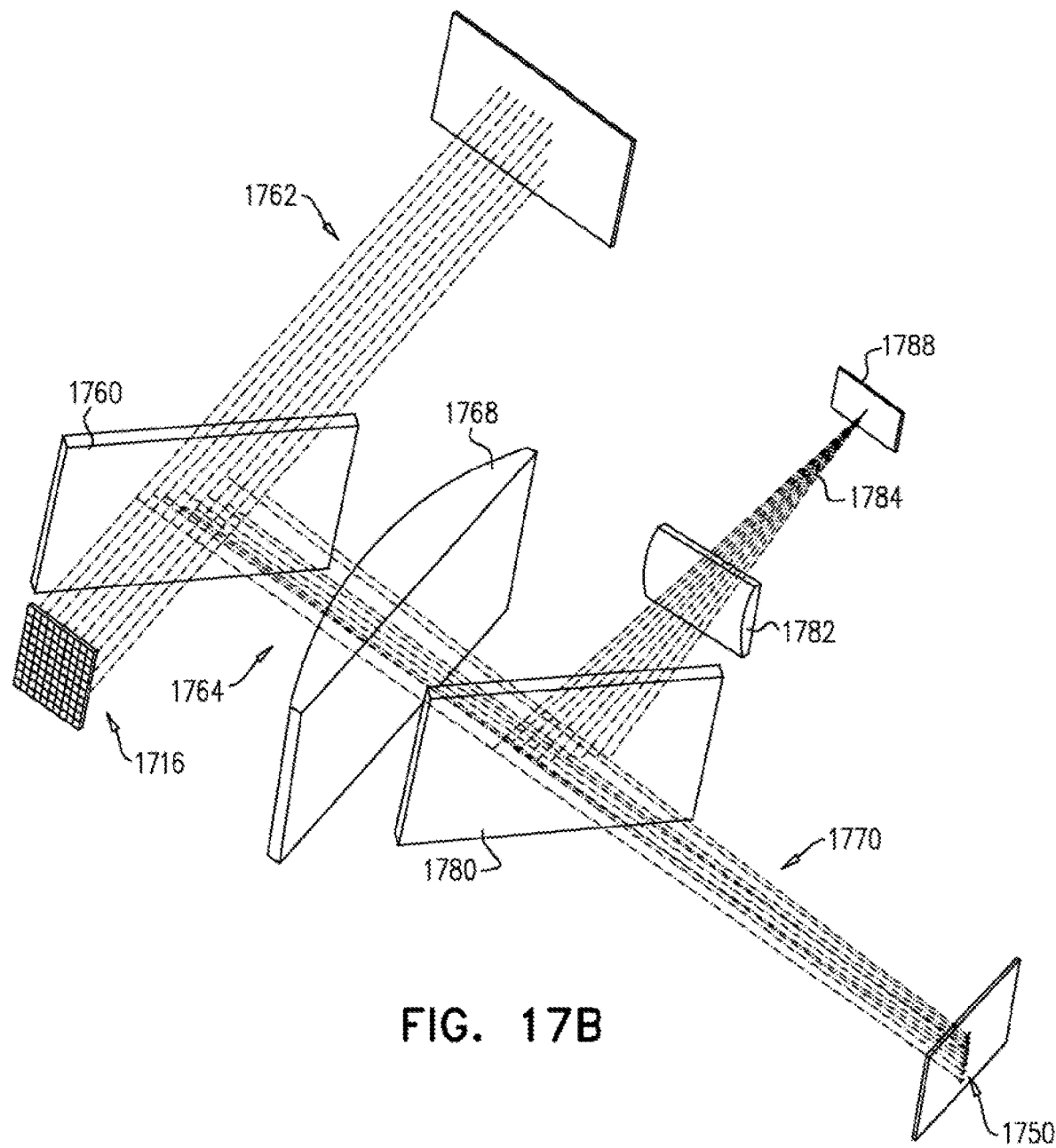

An exemplary implementation of an OPA laser system of the type illustrated in FIG. 15 or FIG. 16 is shown in FIGS. 17A and 17B. Turning now to FIGS. 17A and 17B, an OPA laser system 1700 is provided wherein an output laser beam from a seed laser (not shown) such as seed laser 1512 is split into a plurality of sub-beams along a corresponding plurality of channels 1716. By way of example, the laser output may be split, by way of example, into a 10×10 matrix of 100 sub-beams along 100 corresponding channels 1716. It is appreciated that, for the sake of clarity of presentation, only selected ones of the sub-beams are illustrated in FIG. 17B. Sub-beams along channels 1716 may subsequently be collimated and focused by collimating and focusing elements (not shown) such as collimating and focusing lenses 1519, 1520, to produce a combined output beam.

In order to facilitate application of phase variation to the output beam, a portion of the output of OPA laser 1700 is preferably extracted and directed towards a plurality of detectors 1750. The extracted portion of the output beam preferably functions as a reference beam, based on characteristics of which the required phase variation may be calculated. In the embodiment shown in FIGS. 17A and 17B, plurality of sub-beams along channels 1716 are directed towards a beam splitter 1760. Beam splitter 1760 preferably splits each sub-beam into a transmitted portion 1762 and a reflected portion 1764 in accordance with a predetermined ratio.

The transmitted portion 1762 of the sub-beams is preferably combined to form the output beam. The reflected portion 1764 of the sub-beams is preferably reflected towards a cylindrical lens 1768, which cylindrical lens 1768 is particularly preferred embodiment of cylindrical lens 1568. Cylindrical lens 1768 is preferably operative to receive the reflected portion 1764 of the sub-beams and cause the sub-beams to converge into a multiplicity of groups along a direction of curvature of cylindrical lens 1768. By way of example, in the case of 100 sub-beams, cylindrical lens 1768 may cause the sub-beams to converge into ten groups 1770 of ten sub-beams.

Preferably, each group 1770 of sub-beams grouped by cylindrical lens 1768 forms a beam having a far field intensity pattern incident on a surface of corresponding one of plurality of detectors 1750. By way of example plurality of detectors 1750 may include ten detectors 1750, each sampling a group beam comprising ten individual sub-beams. Each detector 1750, in cooperation with a corresponding control electronics module (not shown) such as control module 1532, then preferably optimizes the phases of the sub-beams included in the group 1770 of sub-beams sampled thereby, Such sampling and optimization is preferably carried out in parallel and preferably simultaneously across all of detectors 1750.

In order to optimize the relative phase of each of groups 1770 with respect to the phases of other ones of groups 1770, a portion of groups 1770 is preferably directed, by way of an auxiliary beam splitter 1780, to an auxiliary cylindrical lens 1782. It is appreciated that auxiliary cylindrical lens 1782 is a particularly preferred embodiment of auxiliary cylindrical lens 1582. It is appreciated that the curvature of auxiliary cylindrical lens 1782 is preferably orthogonal with respect to the curvature of cylindrical lens 1768 in order to focus the sub-beams. Auxiliary cylindrical lens 1782 preferably focuses groups of sub-beams 1770 into one combined beam 1784 incident on an auxiliary detector 1788.

Auxiliary detector 1788 preferably receives thereat a far field intensity pattern corresponding to that of a combination of all of groups of sub-beams 1770 and samples and optimizes the phases of groups 1770 with respect to each other, in cooperation with phase control electronics (not shown). It is appreciated that the optimization of the phases of groups 1770 with respect to each other may be by way of phase modulation of the phases of the individual sub-beams by phase modulators 1518, as described hereinabove with reference to FIG. 15, or may be by way of phase modulation of the phases of the groups of sub-beams by group phase modulators 1618, as described hereinabove with reference to FIG. 16.

Figure 18:
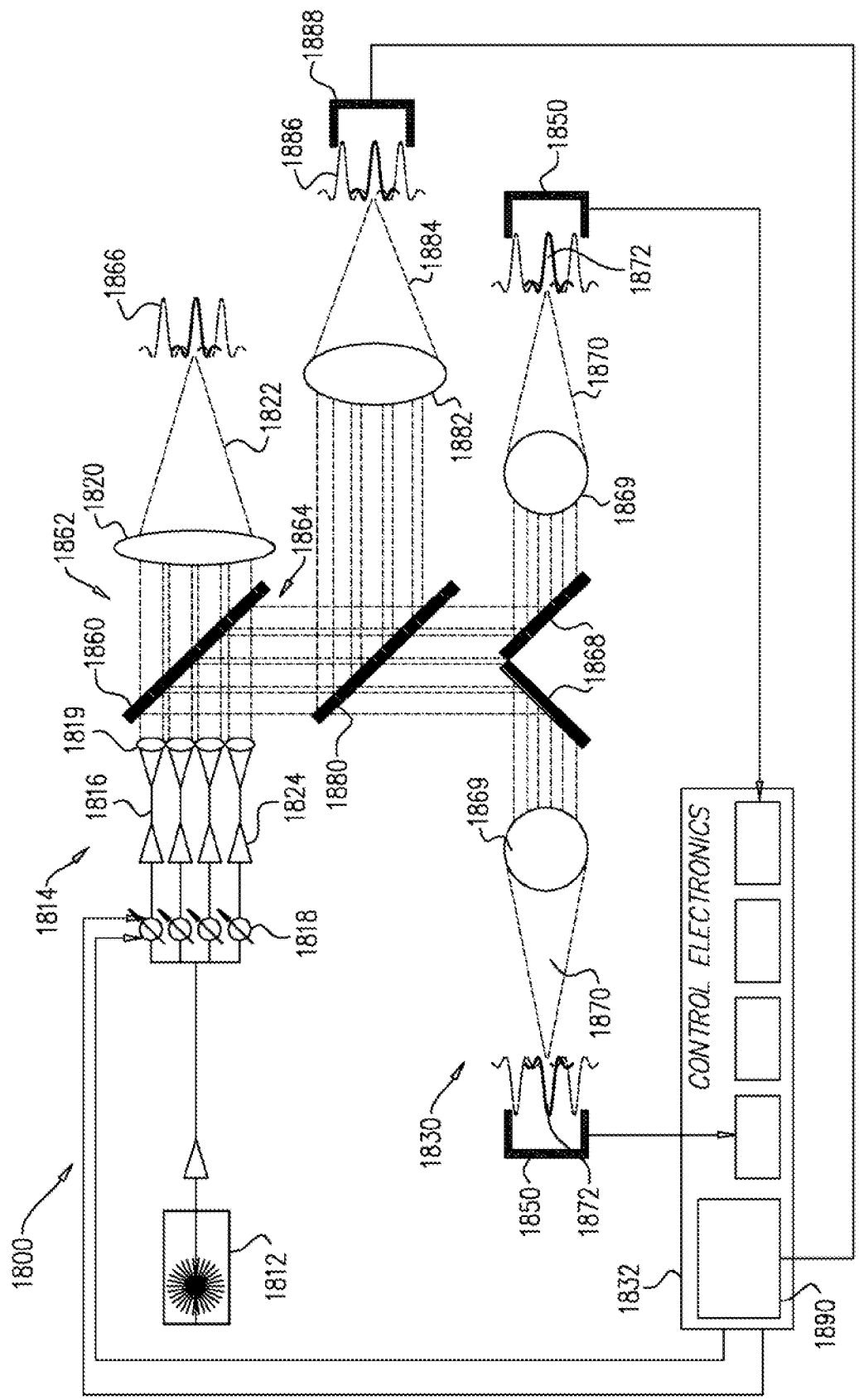
FIG. 18 is a simplified schematic plan view illustration of an optical phased array laser system including scaled phase modification of dynamic beams, constructed and operative in accordance with a further preferred embodiment of the present invention.

Reference is now made to FIG. 18, which is a simplified schematic plan view illustration of an optical phased array laser system including scaled phase modification of dynamic beams, constructed and operative in accordance with another preferred embodiment of the present invention.

As seen in FIG. 18, there is provided an optical phased array (OPA) laser system 1800, which OPA laser 1800 may be of a type generally described hereinabove with reference to FIGS. 1A-4C. OPA laser 800 preferably comprises a seed laser 1812 and a laser beam splitting and combining subsystem 1814. Splitting and combining subsystem 1814 preferably receives an output laser beam from seed laser 1812 and splits the output laser beam into a plurality of sub-beams along a corresponding plurality of channels 1816. Here, by way of example only, an output from seed laser 1812 may be split into a 4×4 matrix of 16 sub-beams along 16 corresponding channels 1816, four of which sub-beams and channels 1816 are seen in the top view of OPA laser 1800 in FIG. 18. It is appreciated, however, that splitting and combining subsystem 1814 may include a fewer or greater number of channels along which the output of seed laser 1812 is split, and typically may include a far greater number of channels such as 32 or more channels.

The relative phase of each sub-beam may be individually modulated by a phase modulator 1818, preferably located along each of channels 1816. Each phase modulated sub-beam produced by the splitting and subsequent phase modulation of the output of seed laser 402 preferably propagates towards a collimating lens 1819. The individually collimated, phase modulated sub-beams are subsequently combined, for example at a focal plane of a lens 1820, to form an output beam 1822.

Splitting and combining subsystem 1814 may also provide laser amplification of the sub-beams, preferably following the splitting of the output beam of seed laser 1812 into sub-beams and prior to the combining of the sub-beams to form output beam 1822. Here, by way of example, splitting and combining subsystem 1814 is shown to include a plurality of optical amplifiers 1824 located along corresponding ones of channels 1816 for amplifying each sub-beam. It is appreciated, however, that such amplification is optional and may be omitted, depending on the power output requirements of OPA laser 1800.

The phase of output beam 1822, and hence the position and shape of the far-field intensity pattern thereof, is controlled, at least in part, by the relative phases of the constituent sub-beams combined to form output beam 1822. In many applications, such as laser cutting, laser welding, free-space optical communications and laser additive manufacturing, as described hereinabove, it is desirable to dynamically move and shape the far-field intensity pattern of the output beam. As described hereinabove with reference to FIGS. 1A-4C, dynamic variation of parameters of the output beam may be achieved by dynamically varying the relative phases of the individual sub-beams along channels 1816 and thereby varying the phase of the combined laser output 1822 so as to dynamically control the position and shape of the far-field intensity pattern thereof.

In the case of OPA laser 1800 including a large number of individual sub-beams, phase measurement and corresponding phase modification of each sub-beam with respect to the phases of all of the other ones of the sub-beams, may be challenging due to the large number of individual sub-beams involved. Specifically, due to the large number of individual sub-beams contributing to the combined output 1822, the time taken to measure and modify the phase of each individual sub-beam with respect to the other sub-beams so as to dynamically control the phase of the combined laser output 1822 may be unacceptably long. Furthermore, the signal to noise ratio may be unacceptably low.

It is a particular feature of a preferred embodiment of the present invention that OPA laser 1800 preferably includes a phase modulation subsystem 1830 for carrying out phase modulation of the combined laser output in a scaled manner. More specifically, phase modulation subsystem 1830 preferably groups at least a portion of the sub-beams provided by laser splitting and combining subsystem into groups and then performs phase modulation within each group of sub-beams, only with respect to the phases of other sub-beams within the group. Such group phase modulation is preferably performed in parallel across various individual groups. Phase modulation subsystem 1830 then preferably optimizes the phase of each group of sub-beams with respect to the phases of other ones of the groups of sub-beams, in order to vary the phase of the combined laser output 1822, in a manner detailed henceforth.

Phase modulation subsystem 1830 preferably includes a phase control electronic module 1832 in operative control of phase modulators 1818. Phase control electronic module 1832 preferably controls each phase modulator 1818 so as to dynamically modulate the relative phases of the sub-beams along channels 1816, in accordance with the desired far-field intensity pattern of output beam 1822 and as ascertained by phase modulation subsystem 1830.

In order to facilitate application of phase variation to output beam 1822, a portion of the output of OPA laser 1800 is preferably extracted and directed towards a plurality of detectors 1850. The extracted portion of the output beam preferably functions as a reference beam, based on characteristics of which the required phase variation may be calculated. In the embodiment shown in FIG. 18, plurality of sub-beams along channels 1816 are directed towards a beam splitter 1860. Beam splitter 1860 preferably splits each sub-beam into a transmitted portion 1862 and a reflected portion 1864 in accordance with a predetermined ratio. For example, beam splitter 1860 may split each sub-beam with a 99.9% transmitted: 0.01% reflected ratio.

The transmitted portion 1862 of the sub-beams preferably propagates towards focal lens 1820, at which focal lens 1820 the sub-beams are combined to form output beam 1822 having a far-field intensity pattern 1866. The reflected portion 1864 of the sub-beams is preferably reflected towards an array of mirrors 1868, each mirror 1868 being positioned in spaced relation to a corresponding focusing lens 1869. By way of example, array of mirrors 1868 may comprise four mirrors 1868 positioned in spaced relation to four focusing lenses 1869, two of which mirrors and focusing lenses are visible in the top view of system 1800 in FIG. 18.

Mirrors 1868 are preferably angled so as to be operative to reflect sub-beams incident thereon towards the corresponding focusing lens 1869 and thereby group the reflected portion 1864 of the sub-beams into a multiplicity of groups, here embodied, by way of example, as four groups 1870, each group 1870 including four sub-beams, two of which groups are seen in the top view of system 18100 in FIG. 18.

Preferably, each group of sub-beams reflected at each of mirrors 1868 is focused by the corresponding focal lens 1869 to form a single beam comprising group of sub-beams 1870 and having a far-field intensity pattern 1872 incident on a surface of a corresponding one of plurality of detectors 1850. Each detector 1850, in cooperation with a corresponding control electronics sub-module 1874 included in control module 1832, then preferably optimizes the relative phases of the sub-beams within the group of sub-beams 1870 sampled thereby, with respect to the phases of the other sub-beams within the group 1870. Such sampling and optimization is preferably carried out in parallel and preferably simultaneously for ones of far-field intensity patterns 1872 across all of detectors 1850. Various algorithms suitable for phase optimization include sequential or non-sequential optimization algorithms including noise correction algorithms, as described hereinabove with reference to FIGS. 1A-4C.

In order to optimize the relative phase of each of groups 1870 with respect to other ones of groups 1870, a portion of reflected portion 1864 is preferably directed, by way of an auxiliary beam splitter 1880, to an auxiliary lens 1882. Auxiliary lens 1882 preferably causes the sub-beams incident thereon to converge into a single beam 1884 having a far-field intensity pattern 1886 incident on an auxiliary detector 1888. Auxiliary detector 1888 preferably receives thereat a single beam having a far field intensity pattern 1886 corresponding to that of a combination of all of groups of sub-beams 1870. Auxiliary detector 1888 preferably samples and optimizes the phases of groups 1870 with respect to each other, in cooperation with a phase control electronics sub-module 1890 included in electronic control module 1832. Particularly preferably, one function of phase control electronic module 1832 is to control each phase modulator 1818 so as to apply a phase shift maximizing the total power on auxiliary detector 1888.

It is appreciated that carrying out phase modulation in the above-described scaled manner, wherein the phase of each sub-beam is optimized with respect to the phases of other sub-beam members of its group 1870 and the phases of groups 1870 are optimized with respect to each other to vary the phase of the combined laser output 1822, is far quicker and less complex than optimizing the phase of each individual sub-beam with respect to the phases of all of the other sub-beams in OP 1800. Furthermore, this allows the phase optimization to be carried out by individual sets of control electronics in each control electronics sub-module 1874 coupled to each detector 1850, rather than requiring a single set of control electronics and improves the signal to noise ratio.

Figure 19:
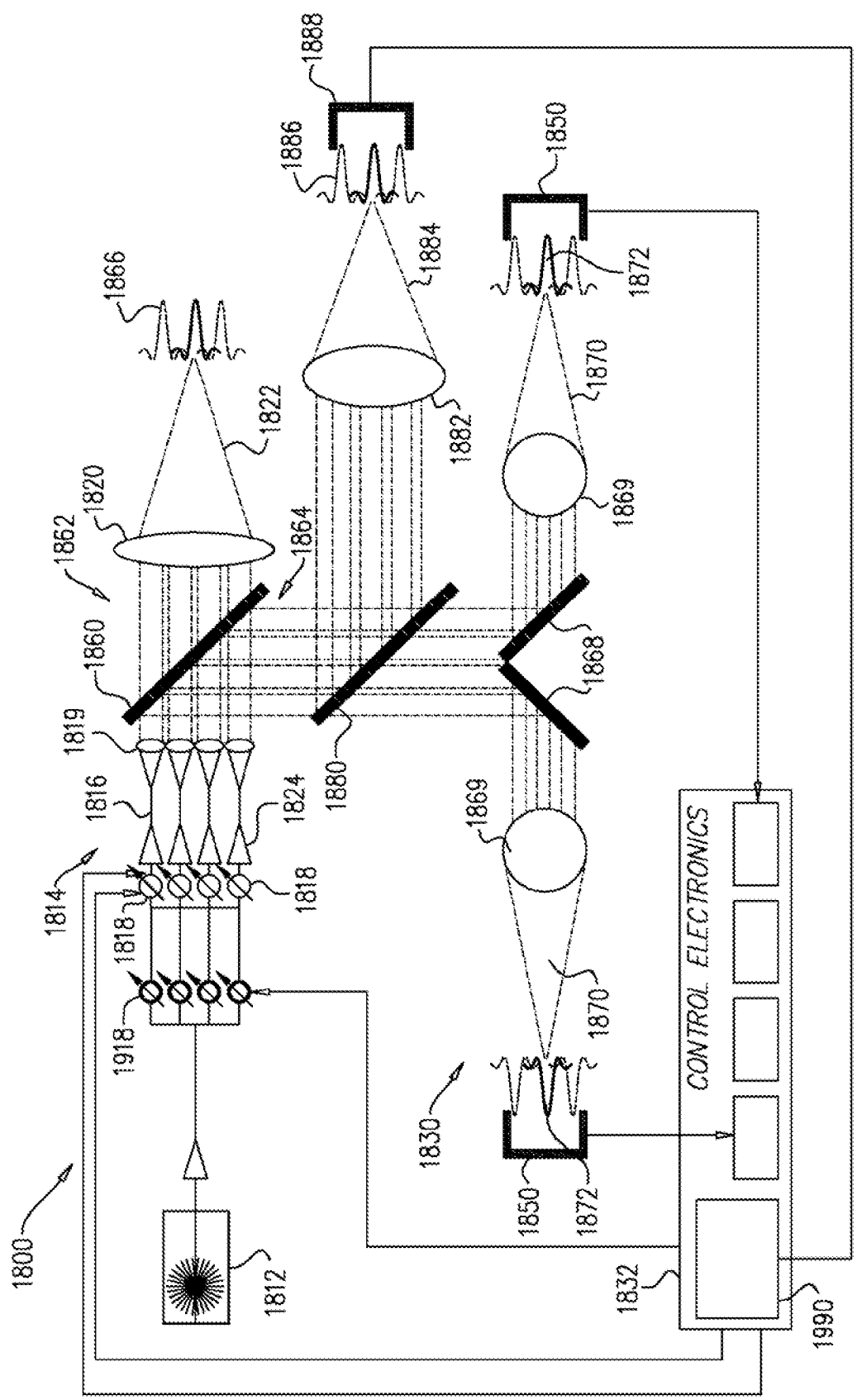
FIG. 19 is a simplified schematic plan view illustration of an optical phased array laser system including scaled phase modification of dynamic beams, constructed and operative in accordance with yet a further preferred embodiment of the present invention.

It is appreciated that the functionality of optimizing the relative phase of each of groups 1870 with respect to other ones of groups 1870 may alternatively be carried out by additional group phase modulators, operative to modulate the collective phase of each of groups 1870, rather than by individual phase modulators 1818 operative to modulate the individual phase of each sub-beam member of each of groups 1870. An exemplary implementation of such an arrangement is illustrated in FIG. 19 and may generally resemble the phase modulation arrangement described in U.S. Pat. No. 9,893,494 in some aspects thereof.

As seen in FIG. 19, system 1800 may be modified by adding a series of group phase modulators corresponding to the number of groups 1870. Here, by way of example, system 1800 comprises 16 sub-beams, four of which sub-beams are included in each of four groups 1870, such that a total of four additional group phase modulators 1918 may be included in system 1800, as seen in FIG. 19. Each group phase modulator 1918 is preferably common to the four channels 1816 forming part of each group 1870 and provides a phase shift optimizing the collective group phase of the sub-beams along the four channels 1816.

Preferably, ones of group phase modulator 1918 are controlled by an additional control sub-module 1990, preferably included in control module 1832. Auxiliary detector 1888 is preferably coupled to the additional control sub-module 1990. It is appreciated that optimizing the relative phases of groups 1870 with respect to each other by group phase modulators 1918 rather than by individual sub-beam phase modulators 1818 may be more efficient and may simplify the phase modulation process, but requires the employment of additional phase modulating and circuitry elements, thus increasing the cost and complexity of system 1800.

Variation of the phase of combined laser output 1822 preferably provides spatial modulation of the output 1822. It is appreciated that, due to the scaled nature of the phase modulation carried out by phase modulation subsystem 1830, the phase of combined laser output 1822 may be varied very rapidly, at a rate greater than that achievable by mechanical spatial modulation mechanisms. The spatial modulation provided by OPA laser 1800 may optionally be augmented by additional mechanical spatial modulation mechanisms, as are known in the art, or may not involve mechanical spatial modulation.

It is understood that the particular structure and configuration of optical elements shown herein, including beam splitter 1860, focal lens 1820, array of mirrors 1868 and corresponding focal lenses 1869 is exemplary only and depicted in a highly simplified form. It is appreciated that OPA laser system 1800 may include a variety of such elements, as well as additional optical elements, including, by way of example only, additional or alternative lenses, optical fibers and coherent free-space far-field combiners.

Furthermore, it is appreciated that mirrors 1868 and corresponding focal lenses 1869 may have mutually similar or identical optical properties, so as to group the individual sub-beams into mutually similar or identical groups comprising equal numbers of sub-beams. Alternatively, mirrors 1868 and corresponding focal lenses 1869 may have mutually different optical properties so as to group the individual sub-beams into mutually differing groups comprising different numbers of sub-beams.

Figure 20A:
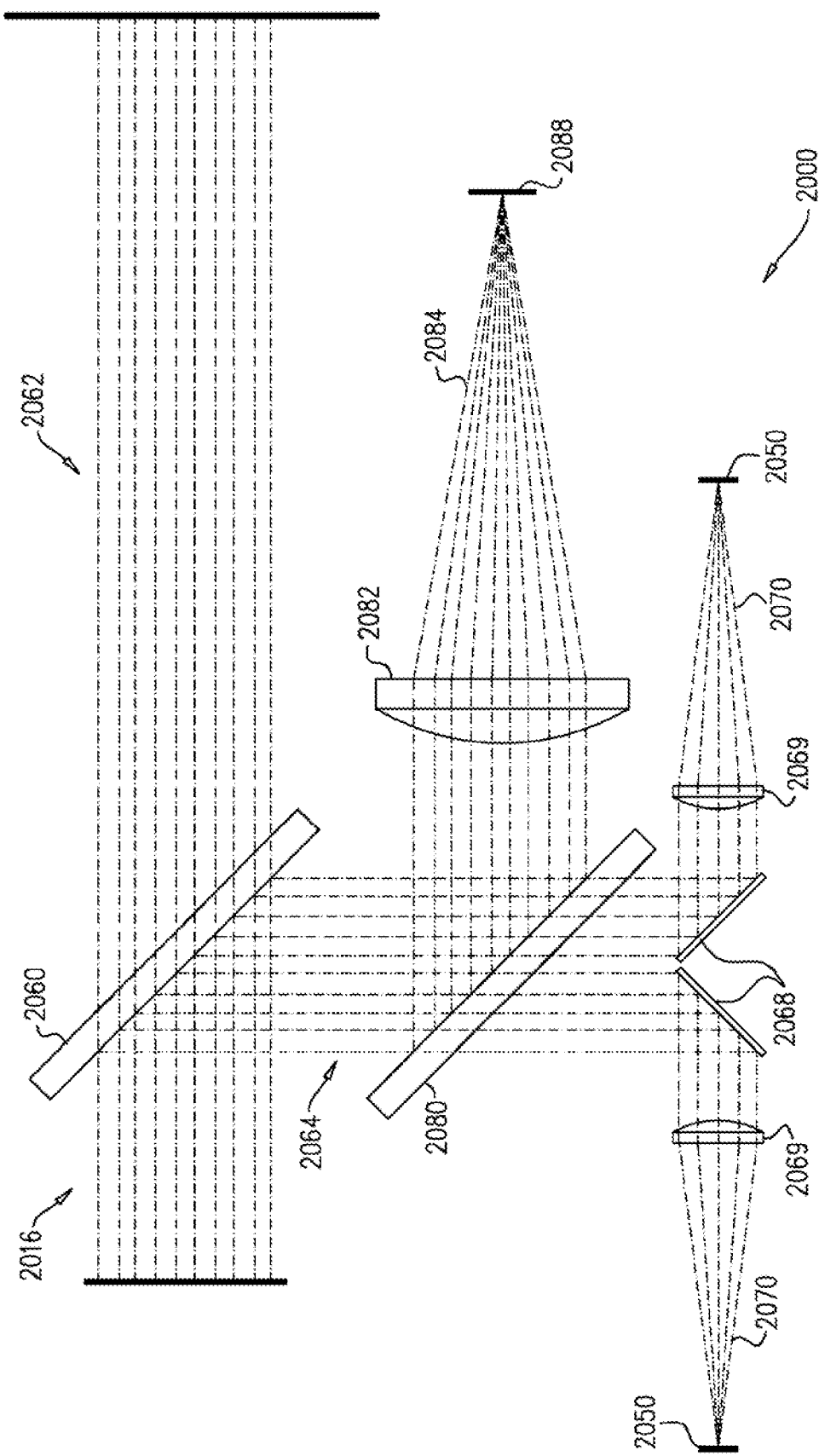

An exemplary implementation of an OPA laser system of the type illustrated in FIG. 18 or FIG. 19 is shown in FIGS. 20A and 20B. Turning now to FIGS. 20A and 20B, an OPA laser system 2000 is provided wherein an output laser beam from a seed laser (not shown) such as seed laser 1812 is split into a plurality of sub-beams along a corresponding plurality of channels 2016. Here, by way of example only, the laser output may be split into a 10×10 matrix of 100 sub-beams along 100 corresponding channels 2016, only selected ones of which sub-beams are illustrated in FIG. 20B for the sake of clarity of presentation. Sub-beams along channels 2016 may subsequently be collimated and focused by collimating and focusing elements (not shown) such as collimating and focusing lenses 1819, 1820, to produce a combined output beam.

In order to facilitate application of phase variation to the output beam, a portion of the output of OPA laser 2000 is preferably extracted and directed towards a plurality of detectors 2050. The extracted portion of the output beam preferably functions as a reference beam, based on characteristics of which the required phase variation may be calculated. In the embodiment shown in FIGS. 20A and 20B, plurality of sub-beams along channels 2016 are directed towards a beam splitter 2060. Beam splitter 2060 preferably splits each sub-beam into a transmitted portion 2062 and a reflected portion 2064 in accordance with a predetermined ratio.

The transmitted portion 2062 of the sub-beams is preferably combined to form the output beam. The reflected portion 2064 of the sub-beams is preferably reflected towards an array of mirrors 2068, each mirror 2068 being positioned in spaced relation to a corresponding focusing lens 2069. It is appreciated that array of mirrors 2068 and lenses 2069 are particularly preferred embodiments of array of mirrors 1868 and focusing lenses 1869.

Mirrors 2068 are preferably angled so as to be operative to reflect sub-beams incident thereon towards the corresponding focusing lens 2069 and thereby group the reflected portion 2064 of sub-beams into a multiplicity of groups, here embodied, by way of example, as four groups, each group 2070 including 25 sub-beams. Preferably, each set of sub-beams reflected at each of mirrors 2068 is focused by the corresponding focal lens 2069 to form a single beam including group of 25 sub-beams 2070. Each group of sub-beams 2070 is incident on a surface of corresponding one of plurality of detectors 2050. Each detector 2050 preferably samples the far-field intensity pattern incident thereon. Each detector 2050, in cooperation with a corresponding control electronics sub-module (not shown) such as control electronics sub-module 1874 included in control module 1832, then preferably optimizes the phases of the sub-beams included in the group of sub-beams 2070 sampled thereby, in order for the combined phases to produce a desired group far-field intensity pattern. Such sampling and optimization is preferably carried out in parallel and preferably simultaneously for ones of far-field intensity patterns across all of detectors 2050.

In order to optimize the relative phase of each of groups 2070 with respect to other ones of groups 2070, a portion of the reflected portion 2064 is preferably directed, by way of an auxiliary beam splitter 2080, to an auxiliary lens 2082. Auxiliary lens 2082 preferably causes a portion of the reflected portion 2064 to converge into a single beam 2084 incident on an auxiliary detector 2088. Auxiliary detector 2088 preferably receives thereat a single beam having a far field intensity pattern corresponding to that of a combination of all of the sub-beams. Auxiliary detector 2088 preferably samples and optimizes the phases of groups 2070 with respect to each other, in cooperation with phase control electronics included in electronic control module 1832.

It is appreciated that the optimization of the phases of groups 2070 with respect to each other may be by way of phase modulation of the phases of the individual sub-beams by phase modulators 1818, as described hereinabove with reference to FIG. 18, or may be by way of phase modulation of the phases of the groups of sub-beams by group phase modulators 1918, as described hereinabove with reference to FIG. 19.

It is understood that in the above-described embodiments of OPA lasers 1500, 1700, 1800 and 2000 of FIGS. 15-20B, phase modulation is preferably carried out in a scaled manner, with multiple detectors such as detectors 1550, 1750, 1850 and 2050 employed for simultaneously performing phase measurements of sub-beams within multiple groups and a single detector, such auxiliary detector 1586, 1786, 1886 and 2086, employed for performing phase measurements of a single beam including the multiple groups.

It is appreciated, however, that a system constructed and operative in accordance with preferred embodiments of the present invention may be further scalable, to include still additional hierarchies of detectors and corresponding optical elements, depending on the number of sub-beams involved.

Figure 21:
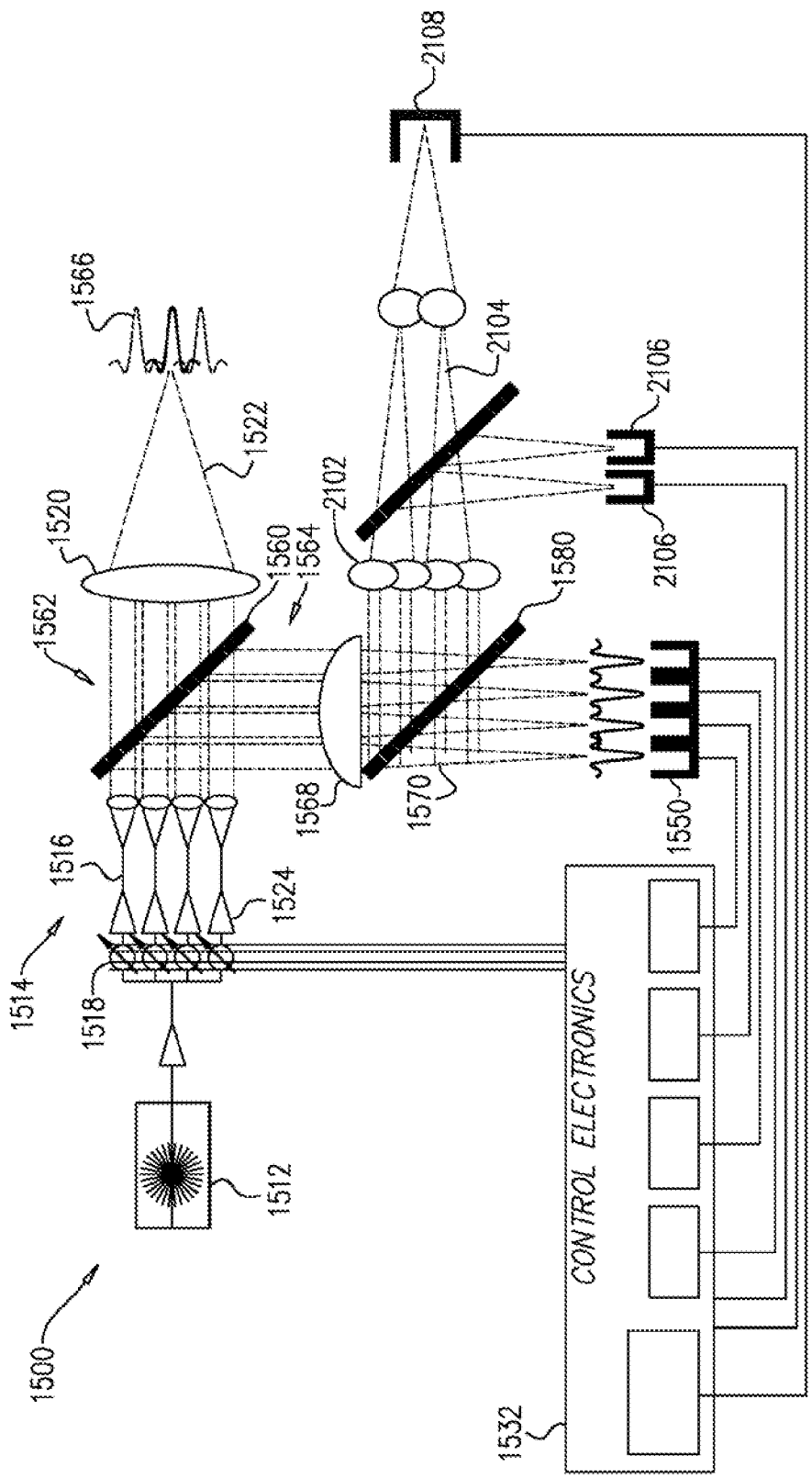
FIG. 21 is a simplified schematic plan view illustration of an optical phased array laser system including scaled phase modification of dynamic beams, constructed and operative in accordance with a still further preferred embodiment of the present invention.

By way of example, as shown in FIG. 21, OPA laser system 1500 may be modified to include additional focusing lenses 2102 for focusing groups 1570 of sub-beams into intermediate groups 2104 which intermediate groups are incident on intermediate detectors 2106. Intermediate groups 2104 are then further combined and incident on a single detector 2108, at which single detector 2108 intermediate groups 2104 are preferably phase modified with respect to each other.

It is additionally understood that any of the OPA laser systems described hereinabove with reference to FIGS. 15-21 may be modified by replacing one or more of the individual detectors therein with multiple detectors and corresponding multiple closely spaced optical pathways, in order to improve the sampling of the output beams, in accordance with embodiments of the present invention described hereinabove with reference to FIGS. 6-8. Furthermore, any of the OPA laser systems described hereinabove with reference to FIGS. 15-21 may alternatively be modified to include a transmissive or reflective detector mask masking one or more of the multiple detectors employed therein, in accordance with embodiments of the present invention described hereinabove with reference to FIGS. 9-12, in order to further improve the sampling of the output beams.

It is furthermore understood that any of the OPA laser systems described hereinabove with reference to FIGS. 15-21 may be modified to include voltage-phase calibration functionality, in accordance with preferred embodiments of the present invention described hereinabove with reference to FIGS. 13 and 14, in order to ensure correct calibration of the phase modulators employed therein.

Figures 22A, 22B:
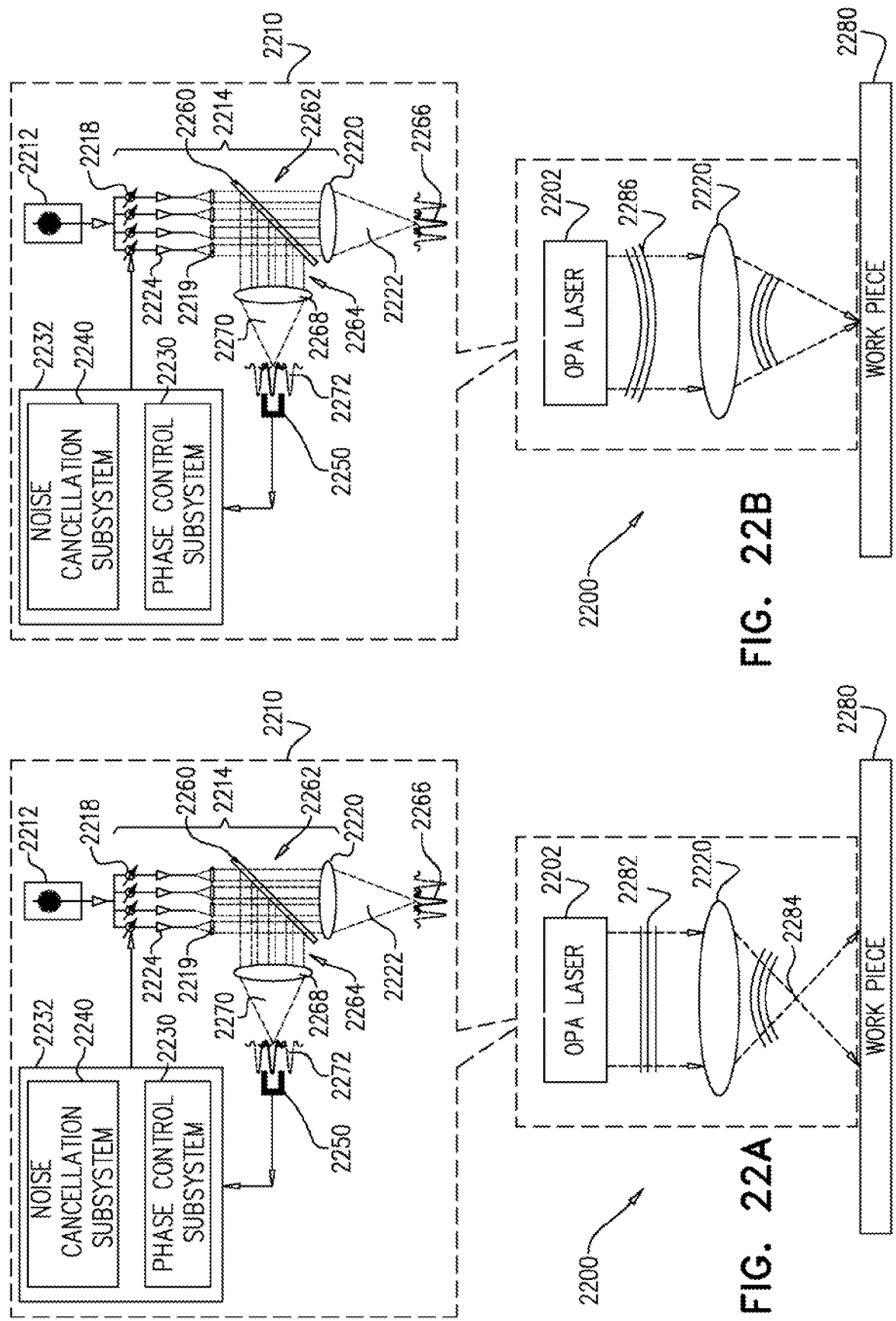
FIGS. 22A and 22B are simplified schematic illustrations of respective first and second focal states of an optical phased array laser system constructed and operative in accordance with a preferred embodiment of the present invention.

Reference is now made to FIGS. 22A and 22B, which are simplified schematic illustrations of respective first and second focal states of an optical phased array laser system constructed and operative in accordance with a preferred embodiment of the present invention.

As seen in FIGS. 22A and 22B, there is provided a laser system 2200 preferably including an optical phased array (OPA) laser 2202. OPA laser system 2200 may be of the type generally described in U.S. Pat. No. 9,584,224 or in U.S. patent application Ser. No. 15/406,032, assigned to the same assignee as the present invention, the contents of which are incorporated herein by reference. Alternatively, OPA laser system 2200 may be a laser system of the type described in reference to any one, or a combination of ones, of FIGS. 1A-21 hereinabove.

As best seen at an enlargement 2210, OPA laser 2202 preferably includes a seed laser 2212 and a laser beam splitting and combining subsystem 2214 receiving a laser output from seed laser 2212 and providing a combined laser output. Laser beam splitting and combining subsystem 2214 preferably includes a plurality of phase modulators 2218 for varying a phase of the combined laser output, preferably following the splitting of the laser output from seed laser 2212 and prior to the combining performed by splitting and combining subsystem 2214.

Each phase modulated sub-beam produced by the splitting and subsequent phase modulation of the output of seed laser 2212 preferably propagates towards a collimating lens 2219. The individually collimated, phase modulated sub-beams are subsequently combined, for example at a focal lens 2220, to form an output beam 2222.

Splitting and combining subsystem 2214 may also provide laser amplification of the sub-beams, preferably following the splitting of the output beam of seed laser 2212 into sub-beams and prior to the combining of the sub-beams to form output beam 2222. Here, by way of example, splitting and combining subsystem 2214 is shown to include a plurality of optical amplifiers 2224 for amplifying each sub-beam. It is appreciated, however, that such amplification is optional and may be omitted, depending on the power output specifications of OPA laser 2200.

The phase of output beam 2222, and hence the position and shape of the far-field intensity pattern thereof, is controlled, at least in part, by the relative phases of the constituent sub-beams combined to form output beam 2222. As described hereinabove with reference to FIGS. 1A-5G, in many applications, such as laser cutting, laser welding, laser additive manufacturing and optical free space communications, it is desirable to dynamically move and shape the far-field intensity pattern of the output beam 2222. This may be achieved in laser system 2200 by laser splitting and combining subsystem 2214 dynamically varying the relative phases of the individual sub-beams and thereby varying the phase of the combined laser output 2222 so as dynamically to control the position and shape of the far-field intensity pattern thereof.

The relative phases of the sub-beams are preferably predetermined in accordance with the desired laser output pattern. Particularly preferably, the varying relative phases are applied by a phase control subsystem 2230. Phase control subsystem 2230 preferably forms a part of a control electronics module 2232 in OPA laser system 2200 and preferably controls each phase modulator 2218 so as to dynamically modulate the relative phases of the sub-beams, preferably as described hereinabove with reference to phase control subsystem 130, 230, 330, 430 of FIGS. 1A, 2A, 3A and 4A respectively.

Due to noise inherent in OPA system 2200, output beam 2222 may have noise. Noise in output beam 2222 is typically phase noise created by thermal or mechanical effects and/or by the amplification process in the case that optical amplifiers 2224 are present in OPA system 2200. In the case that output beam 2222 has noise, OPA system 2200 may include a noise cancellation subsystem 2240 operative to provide a noise cancellation phase correction output in order to cancel out the noise in output beam 2222 in a manner detailed henceforth.

Particularly preferably, noise cancellation subsystem 2240 employs an algorithm to sense and correct phase noise in the combined laser output, preferably, although not necessarily, of the type described hereinabove with reference to FIGS. 1A-4C. The noise cancellation phase correction output is preferably provided by noise cancellation subsystem 2240 to phase modulators 2218 so as to correct phase noise in output beam 2222 and thus avoid distortion of the shape and position of the far field intensity pattern of output beam 2222 that would otherwise be caused by the noise. Noise cancellation subsystem 2240 may be included in control electronics module 2232.

Alternatively, in the case that noise in output beam 2222 is not of significance, noise cancellation subsystem 2240 may be obviated from OPA system 2200 and noise correction correspondingly not performed.

In order to facilitate application of phase variation and noise correction if relevant to output beam 2222, a portion of the output of OPA laser 2202 is preferably extracted and directed towards at least one detector 2250. Here, by way of example, at least one detector 2250 is shown to be embodied as a single detector 2250. However, it is understood that at least one detector 2250 may be embodied as multiple detectors receiving a portion of the output of OPA laser 2202 by way of closely spaced optical pathways, as described hereinabove with reference to FIGS. 6-8, or may be embodied as at least one detector receiving a portion of the output of OPA laser 2202 via a transmissive or reflective optical mask, as described hereinabove with reference to FIGS. 9-12. The extracted portion of the output beam preferably functions as a reference beam, based on characteristics of which the required noise correction and/or phase variation may be calculated.

In accordance with a preferred embodiment of the present invention, plurality of sub-beams along channels 2216 are directed towards a beam splitter 2260. Beam splitter 2260 preferably splits each sub-beam into a transmitted portion 2262 and a reflected portion 2264 in accordance with a predetermined ratio. For example, beam splitter 2260 may split each sub-beam with a 99.9% transmitted: 0.01% reflected ratio.

The transmitted portion 2262 of the sub-beams preferably propagates towards focal lens 2220, at which focal lens 2220 the sub-beams are combined to form output beam 2222 having a far-field intensity pattern 2266. The reflected portion 2264 of the sub-beams is preferably reflected towards an additional focal lens 2268, at which additional focal lens 2268 the sub-beams are combined to form an output reference beam 2270 having a far-field intensity pattern 2272 incident on a surface of one or more of plurality of detectors 2250.

In certain applications, output beam 2222 is preferably directed towards a substrate 2280 upon which substrate 2280 far-field intensity pattern 2266 is preferably incident. Substrate 2280 may be a workpiece being processed by OPA laser 2202. For example, OPA laser 2202 may be operative to additively manufacture, cut, weld, sinter or otherwise process workpiece 2280. Phase control subsystem 2230 preferably varies a phase of the output beam 2222 in order to focus the output beam 2222 on substrate 2280. It is appreciated that in the absence of the application of such phase variation by phase control subsystem 2230, output beam 2222 would not be focused on the substrate 2280.

It is a particular feature of a preferred embodiment of the present invention that focal lens 2220 is preferably designed such that the output beam 2222 of OPA laser 2202 in the absence of the application of phase variation thereto, would not be focused by lens 2220 on the surface of substrate 2280. By way of example, as appreciated from consideration of FIG. 22A illustrating the configuration of output beam 2222 in the absence of the application of phase variation thereto, focal lens 2220 may be optically designed to focus non-phase varied collimated wavefronts 2282 comprising output beam 2222 at a focal point 2284 above a surface of the substrate 2280.

As appreciated from consideration of FIG. 22B, illustrating the configuration of output beam 2222 in the case of the application of phase variation thereto, phase-variation of the output beam 2222 preferably serves to modify a shape and hence focus of wavefronts 2282, as seen in the case of representative phase-modified wavefronts 2286, which phase-modified wavefronts 2286 are preferably focused on substrate 2280 by way of focal lens 2220. It is appreciated that the focusing of output beam 2222 on substrate 2280 is thus achieved by phase variation thereof in combination with focal lens 2220, as illustrated in FIG. 22B, rather than solely by focal lens 2220.

As a result of focusing of output beam 2222 on the substrate 2280 being achieved by phase variation thereof, back-scatter arising from substrate 2280 is correspondingly not focused by focal lens 2220 on OPA laser 2202. As is well known in the art, back-scatter from surfaces treated by laser beams typically returns to the laser and may cause damage thereto, particularly in laser amplification systems. Such damage is avoided in the present invention, due to focal lens 2220 not focusing back-scatter towards OPA laser 2202 and back-scatter therefore not reaching and damaging OPA laser 2202.

Figure 23:
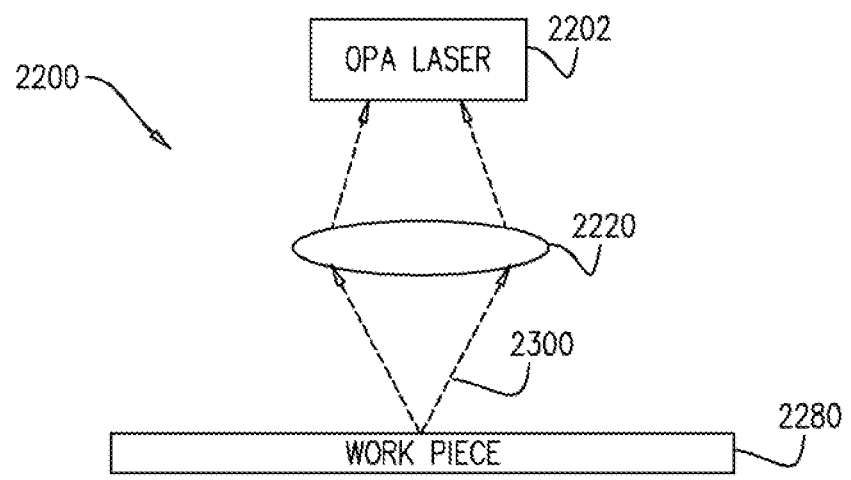
FIG. 23 is a simplified representation of back-scatter in an optical phased array laser system of the type illustrated in FIGS. 22A and 22B.

An exemplary return path of back-scatter from substrate 2280 towards OPA laser 2202 is illustrated in FIG. 23. As seen in FIG. 23, back-scattered laser beams 2300 emanating from substrate 2280 preferably arrive at focal lens 2220. However, back-scattered laser beams 2300 are preferably not focused on OPA laser 2202 by focal lens 2220, thereby preventing damage thereto. It is understood that should focal lens 2220 be designed to focus non-phase modified laser output from OPA laser 2202 on substrate 2280, as is typically the case in conventional laser systems, the path of back-scattered beams 2300 would be correspondingly focused by focal lens 2220 on OPA laser 2202, thus possibly causing damage thereto.

It is appreciated that, in certain embodiments of the present invention, the focusing of the output of OPA laser 2202 on substrate 2280 may be performed solely by way of appropriate phase variation of the output beam 2222, such that focal lens 2220 may be obviated.

As described hereinabove with reference to FIGS. 1A-23, an output from a seed laser may be directed to an amplification system for the amplification thereof. As is well known by those skilled in the art, defects in the laser output by a seed laser feeding an amplification system may result in damage to the amplification system. Typical defects in the laser output by the seed laser responsible for causing damage to an amplification system connected thereto may include reduction of power of the seed laser output and degradation of the laser line width. Resultant damage to the amplification system may occur extremely rapidly, on the order of several nanoseconds, and before the response time of internal sensing mechanisms that may be included in the amplification system.

Preferred embodiments of the present invention for preventing damage to an amplification system in the event of failure of a seed laser connected thereto are now described with reference to FIGS. 24-33. It is understood that the seed laser failure protection systems described hereinbelow may be incorporated in an OPA laser of any of the types described hereinabove with reference to FIGS. 1A-23 or may be incorporated in any other laser system including a seed laser and amplifier connected thereto.

Figure 24:
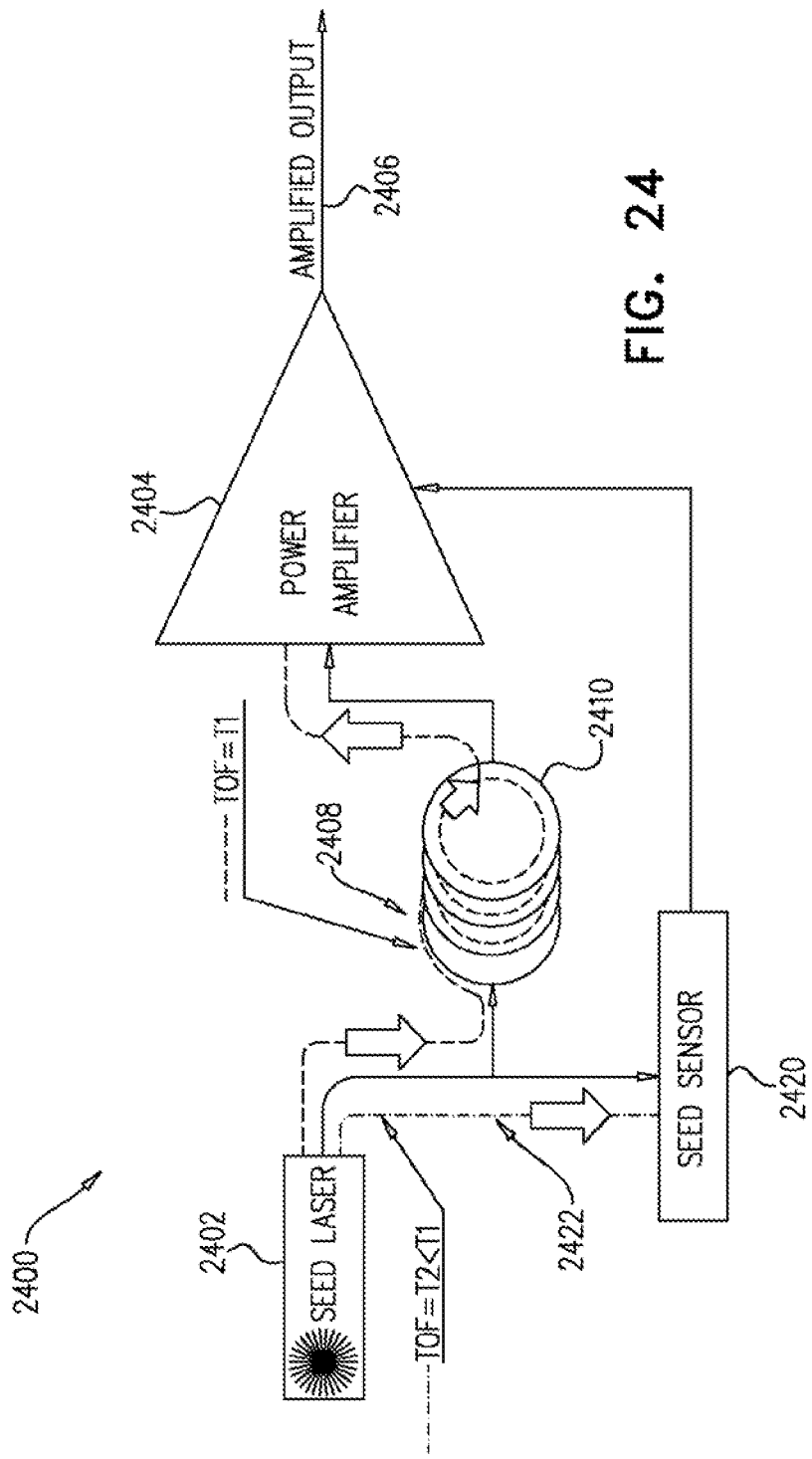
FIG. 24 is a simplified schematic diagram of a laser amplifying system including a seed laser failure protection system constructed and operative in accordance with a preferred embodiment of the present invention.

Turning now to FIG. 24, as seen in FIG. 24 there is provided a laser system 2400 preferably including a seed laser 2402 providing a laser output and an amplifying subsystem, here embodied by way of example as a power amplifier 2404, receiving the laser output from seed laser 2402 and amplifying the laser output to provide an amplified laser output 2406. Laser system 2400 may be embodied, by way of example, a Master Oscillator Power Amplifier (MOPA) laser or may be any other laser system including a seed laser and power amplifier. The laser output from seed laser 2402 preferably reaches power amplifier 2404 via a first optical path 2408, here embodied, by way of example, as comprising a coiled optical fiber 2410.

In order to detect possible defects in the laser output of seed laser 2402, system 2400 further preferably includes a detector subsystem, preferably embodied as seed sensor 2420, receiving the output from seed laser 2402. The laser output from seed laser 2402 preferably reaches detector subsystem 2420 via a second optical path 2422. Detector subsystem 2420 may include one or more sensors for sensing properties of the laser output and, more specifically, for detecting possible faults in the laser output. Sensor subsystem 2420 is preferably operatively coupled to power amplifier 2404. Sensor subsystem 2420 is preferably configured to deactivate power amplifier 2404 upon detection of faults in the laser output from seed laser 2402.

It is a particular feature of a preferred embodiment of the present invention that a first time of flight (TOF=T1) of the laser output along the first optical path 2408 from seed laser 2402 to power amplifier 2404 is greater than a combination of a second time of flight (TOF=T2) of the laser output along the second optical path 2422 from seed laser 2402 to sensor subsystem 2420 and a time taken for sensor subsystem 2420 to deactivate power amplifier 2404.

As a result of the time of flight of the laser output from the seed laser 2402 to the power amplifier 2404 being relatively long, the sensor subsystem 2420 is preferably capable of detecting faults in the laser output received thereat and deactivating the power amplifier 2404 prior to the power amplifier 2404 receiving the faulty laser output, thereby preventing damage to the power amplifier 2404.

Extension of the time of flight of the laser output from the seed laser 2402 to the power amplifier 2404, in order to allow time for the sensor 2420 to sense faults in the laser output and deactivate the power amplifier 2404 when necessary prior to receipt of the faulty laser output by the power amplifier 2404, is achieved in the embodiment of the present invention illustrated in FIG. 24 by inclusion of fiber coil 2410 along the first optical path. By way of example, fiber coil 2410 may have a physical length of 10 km and a time of flight of the laser output therealong may be approximately 50 microseconds. In the case of the development of faults in the output from seed laser 2402, power amplifier 2404 will therefore continue to receive a non-faulty input signal for the duration of 50 microseconds following the onset of the faulty output signal from seed laser 2402.

The optical path between the seed laser 2402 and the sensor subsystem 2420 does not include coil 2410 and may be a direct and thus far shorter optical path. The time of flight of the laser output from seed laser 2402 to sensor subsystem 2420 is hence preferably much shorter than 50 microseconds, for example of the order of 30 microseconds or less. Following the development of faults in the output from seed laser 2402, sensor subsystem 2420 thus may rapidly receive the laser output, detect faults therein and switch off power amplifier 2404, all prior to expiration of the time delay between the seed laser 2402 and the power amplifier 2404. As a result, power amplifier 2404 is preferably switched off by sensor subsystem 2420 before power amplifier 2404 receives the faulty signal detected by sensor subsystem 2420, thereby preventing damage to power amplifier 2404.

Figure 25:
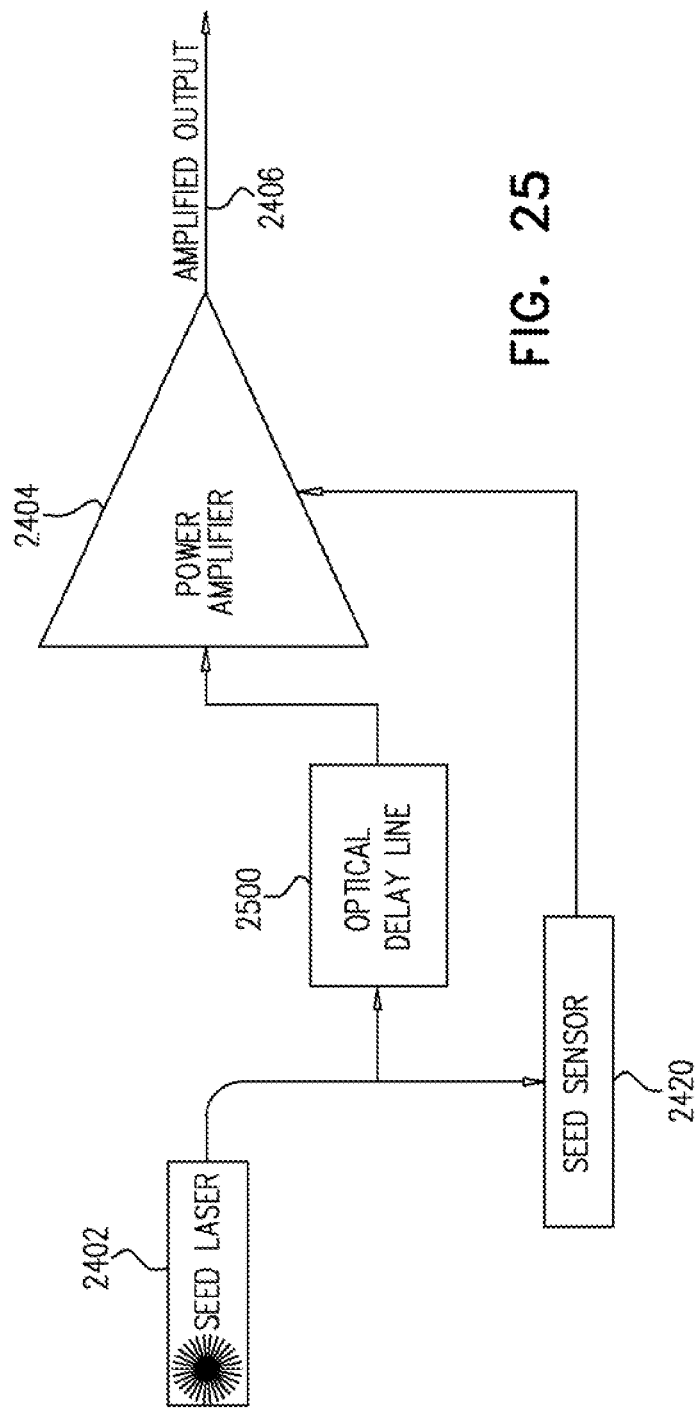
FIG. 25 is a simplified schematic diagram of a laser amplifying system including a seed laser failure protection system constructed and operative in accordance with another preferred embodiment of the present invention.
Figure 26:
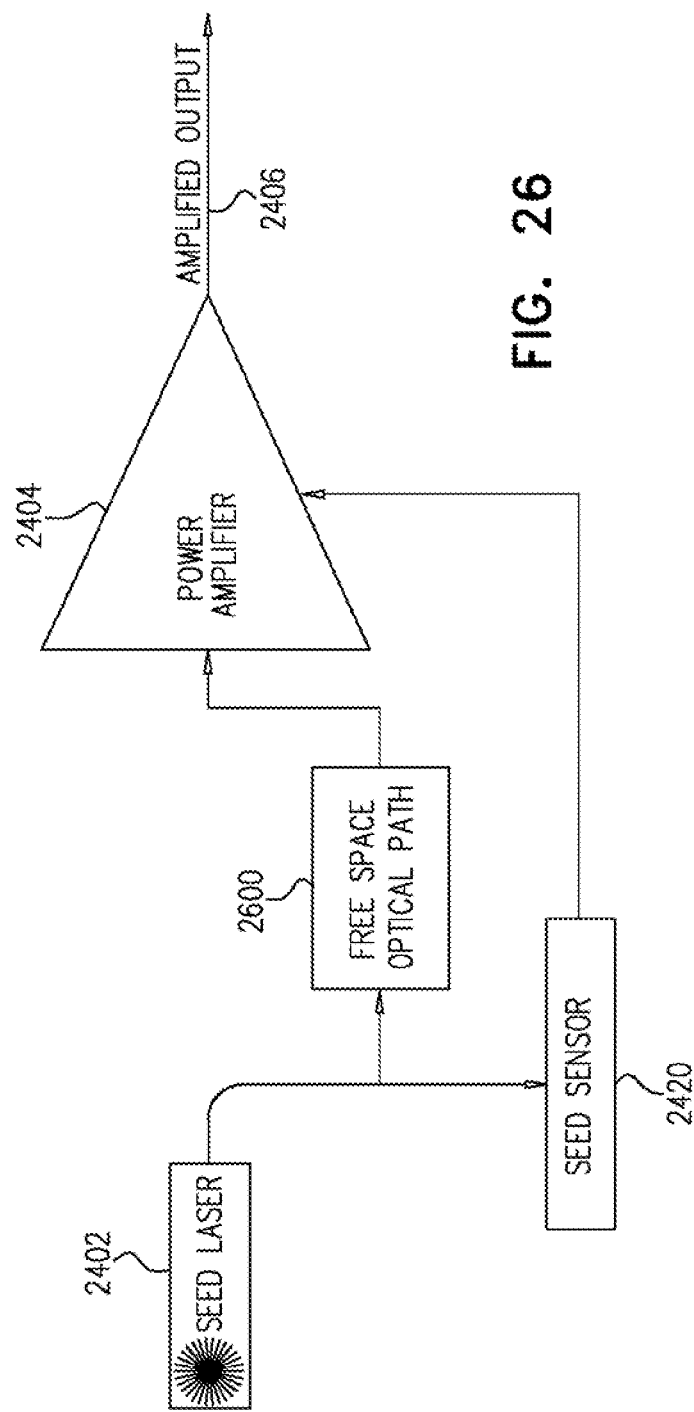
FIG. 26 is a simplified schematic diagram of a laser amplifying system including a seed laser failure protection system constructed and operative in accordance with a further preferred embodiment of the present invention.

It is appreciated that the extension of the optical path between the seed laser 2402 and power amplifier 2404, and hence the increase in the time of flight therealong, in comparison to the optical path time and length between the seed laser 2402 and the sensor subsystem 2420, is not limited to being achieved by way of inclusion of a fiber coil along the optical path between the seed laser 2402 and power amplifier 2404. Rather, the optical path between the seed laser 2402 and power amplifier 2404 may be extended by any suitable means, including, for example, the inclusion of an optical delay line 2500 therealong, as illustrated in FIG. 25. Furthermore, the optical path between seed laser 2402 and power amplifier 2404 may be a free space optical path 2600, as illustrated in FIG. 26, in which case the time of flight therealong may be extended by use of optical elements such as reflecting mirrors. It is appreciated, however, that the inclusion of coiled fiber 2410 in first optical path 2408 may be particularly advantageous due to the compact configuration thereof and due to the maintenance of the optical mode of the seed laser output by the coiled fiber 2410.

It is appreciated that the particular configuration of coiled fiber 2410 illustrated in FIG. 24 is representative and exemplary only. Coiled fiber 2410 may be embodied in any suitable form and may be adapted for laser output to travel therealong in a single direction or in a back-and-forth manner so as to further increase the effective length of the optical path provided by coiled fiber 2410.

Figure 27:
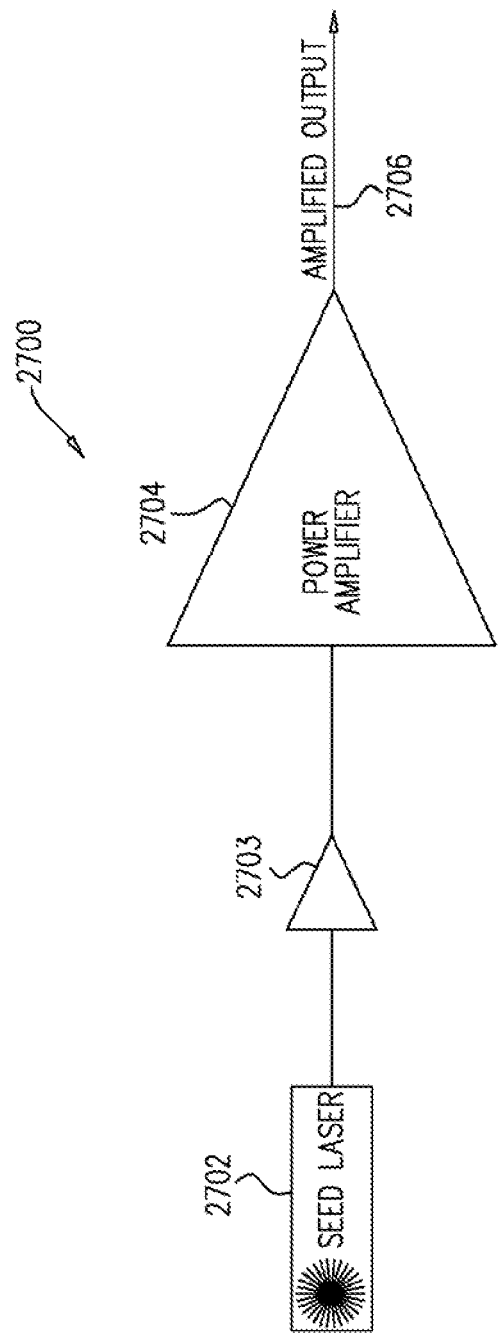
FIG. 27 is a simplified schematic diagram of a laser amplifying system including a seed laser failure protection system constructed and operative in accordance with yet another preferred embodiment of the present invention.

Reference is now made to FIG. 27, which is a simplified schematic diagram of a laser amplifying system including a seed laser failure protection system constructed and operative in accordance with yet another preferred embodiment of the present invention.

As seen in FIG. 27, there is provided a laser system 2700 preferably including a seed laser 2702 providing a laser output. Seed laser 2702 is preferably connected to a first amplifier 2703, which first amplifier 2703 is preferably connected in turn to a second amplifier 2704 here embodied by way of example as a power amplifier 2704, providing an amplified laser output 2706. Laser system 2700 may be embodied, by way of example, a Master Oscillator Power Amplifier (MOPA) laser or may be any other laser system including a seed laser and power amplifier.

As is well known by those skilled in the art, and as detailed hereinabove, defects in the laser output by seed laser 2702 may result in damage to power amplifier 2704. Typical defects in the laser output by seed laser 2702 causing damage to power amplifier 2704 may include cessation or reduction of power of the seed laser output and degradation of the laser line width. Such damage to the power amplifier may occur extremely rapidly, on the order of several nanoseconds, and before the response time of internal sensing mechanisms that may be included in power amplifier 2704.

In order to avoid damage to power amplifier 2704 as a result of defects in the output of seed laser 2702, it is a particular feature of a preferred embodiment of the present invention that laser system 2700 includes additional amplifier 2703. Preferably, additional amplifier 2703 provides far lower amplification than that provided by power amplifier 2704 and is included in system 2700 for the purposes of preventing damage to power amplifier 2704 upon degradation of laser output from seed laser 2702 rather than for the purposes of amplification of the laser output from seed laser 2702 per se.

In operation of system 2700, the laser output from seed laser 2702 is preferably received by first amplifier 2703. First amplifier 2703 preferably provides a first amplified laser output, which first amplified laser output is preferably received and amplified by second amplifier 2704.

Upon cessation of laser output from seed laser 2702, due to faulty operation of seed laser 2702, first amplifier 2703 no longer receives the laser output from seed laser 2702. In this case, first amplifier 2703 generates amplified spontaneous emission, which amplified spontaneous emission is received by second amplifier 2704. Alternatively, first amplifier 2703 may be configured such that upon cessation of laser output from seed laser 2702, first amplifier 2703 begins operating as a laser and generates an additional laser output.

It is understood that second amplifier 2704 thus continues to receive an input signal in the form of amplified spontaneous emission or in the form of an additional laser output from first amplifier 2703, even in the case that seed laser 2702 has ceased to provide a laser output. The amplified spontaneous emission provided by first amplifier 2703 to second amplifier 2704 is sufficient to prevent damage to second amplifier 2704, which damage would otherwise be likely to occur due to cessation of the provision of a signal thereto. It is understood that system 2700 may additionally include a sensor connected to seed laser 2702 to sense faults in the laser output from seed laser 2702 and deactivate the second amplifier 2704 accordingly.

It is appreciated that during proper operation of seed laser 2702, the first amplification provided by first amplifier 2703 is preferably negligible in comparison to the second, primary amplification provided second amplifier 2704.

Figure 28:
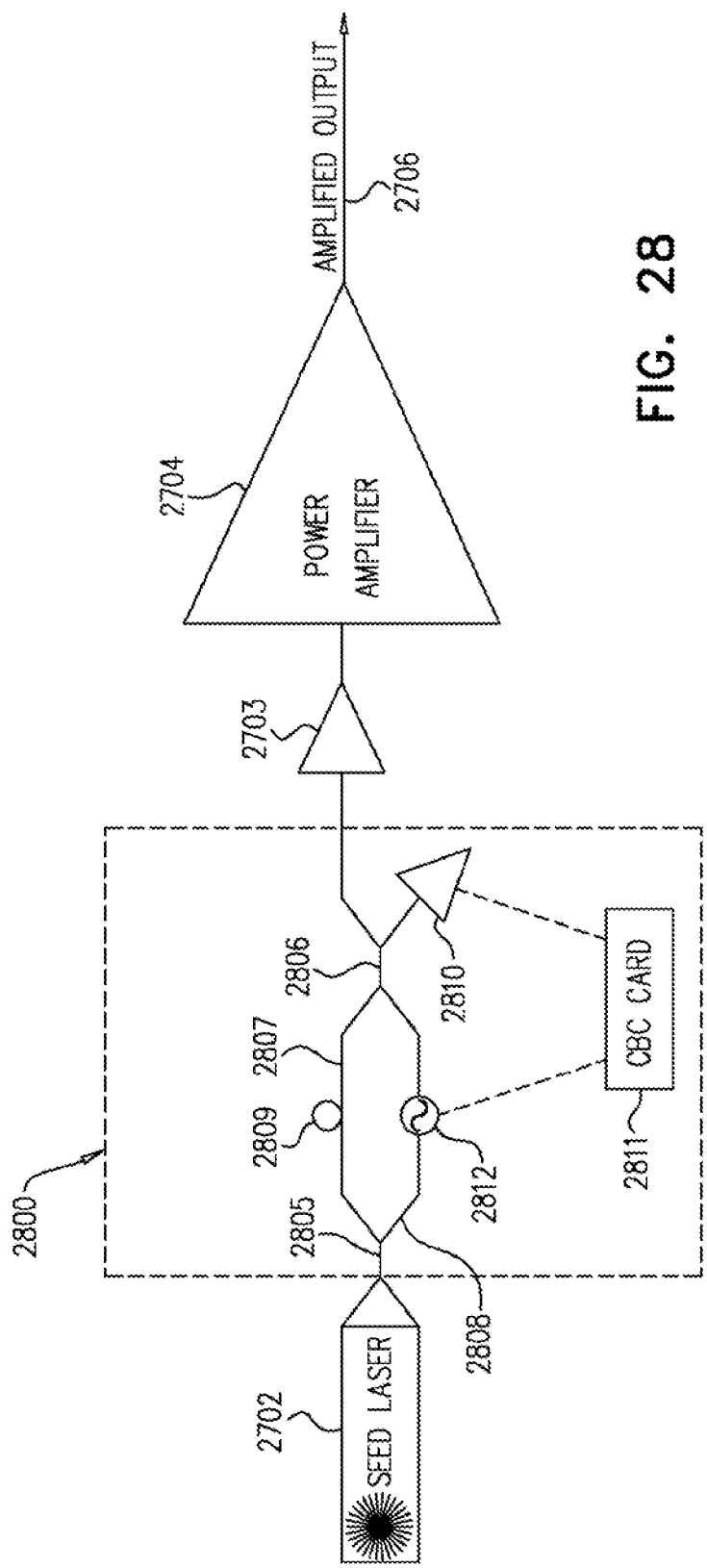
FIG. 28 is a simplified schematic diagram of a laser amplifying system including a seed laser failure protection system constructed and operative in accordance with still another preferred embodiment of the present invention.

As seen in FIG. 27, laser output from seed laser 2702 may be fed directly to first amplifier 2703. Alternatively, as illustrated in FIG. 28, additional elements may be inserted interfacing seed laser 2702 and first amplifier 2703. Particularly, a filter may be inserted between seed laser 2702 and first amplifier 2703 in order to filter out laser beams of unacceptably narrow line width and thus prevent such laser beams from reaching and damaging second amplifier 2704.

A particularly preferred embodiment of a line width filter 2800 suitable for use in the present invention is illustrated in FIG. 28.

Turning now to FIG. 28, filter structure 2800 is seen to be implemented downstream of seed laser 2702 and upstream of first amplifier 2703. The laser output from seed laser 2702 is preferably split into two parts at a splitter 2805 on entry to filter 2800 and recombined at a recombiner 2806 prior to exit from filter 2800. A first part of the split laser output from seed laser 2702 preferably travels along a first arm 2807 of filter 2800 between splitter 2805 and recombiner 2806. A second part of the split laser output from seed laser 2702 preferably travels along a second arm 2808 of filter 2800 between splitter 2805 and recombiner 2806. As appreciated from a comparison of first and second arms 2807 and 2808, first arm 2807 preferably includes an additional portion 2809 in comparison to second arm 2808 and thus is longer than second arm 2808.

In the case that the laser output from seed laser 2702 is of unacceptably narrow line width, the laser outputs from first and second arms 2807 and 2808, when recombined at recombiner 2806, will mutually interfere due to the relatively high coherence thereof. The recombined beam is preferably detected by a detector 2810, which detector 2810 is preferably connected to an electronic control module 2811. Electronic control module 2811 is preferably a coherent beam combining (CBC) card, in operative control of a phase modulator 2812 located along second arm 2808.

Phase modulator 2812 is preferably operated by electronic control card 2811 to alter a phase of the beam along second arm 2808, such that substantially all of the recombined beam at recombiner 2806 is directed towards detector 2810. The recombined beam thus does not proceed towards first amplifier 2703 and hence does not reach and cause damage to second amplifier 2704. The receipt of a laser output from seed laser 2702 by first amplifier 2703 is thereby halted and first amplifier 2703 generates one of amplified spontaneous emission or additional laser output, as detailed hereinabove.

In the case that seed laser 2702 is operating properly and the laser output from seed laser 2702 is of acceptably wide line width, the laser outputs from first and second arms 2807 and 2808, when recombined at recombiner 2806, will not mutually interfere. This is because the line width is sufficiently wide such that the coherence is relatively low and therefore little or no mutual interference occurs. In this case, a part of the laser output at recombiner 2806 will continue towards first amplifier 2703 and a part of the laser output at recombiner 2806 will be delivered to detector 2810. The laser output received by first amplifier 2703 is preferably subsequently provided by first amplifier 2703 to second amplifier 2704, as outlined above with reference to system 2700.

It is understood that the damage protection system illustrated in FIGS. 27 and 28, including additional amplifier 2703 and filter structure 2800, may be employed alone or in combination with any one of the protection systems illustrated in FIGS. 24-26.

Figure 29:
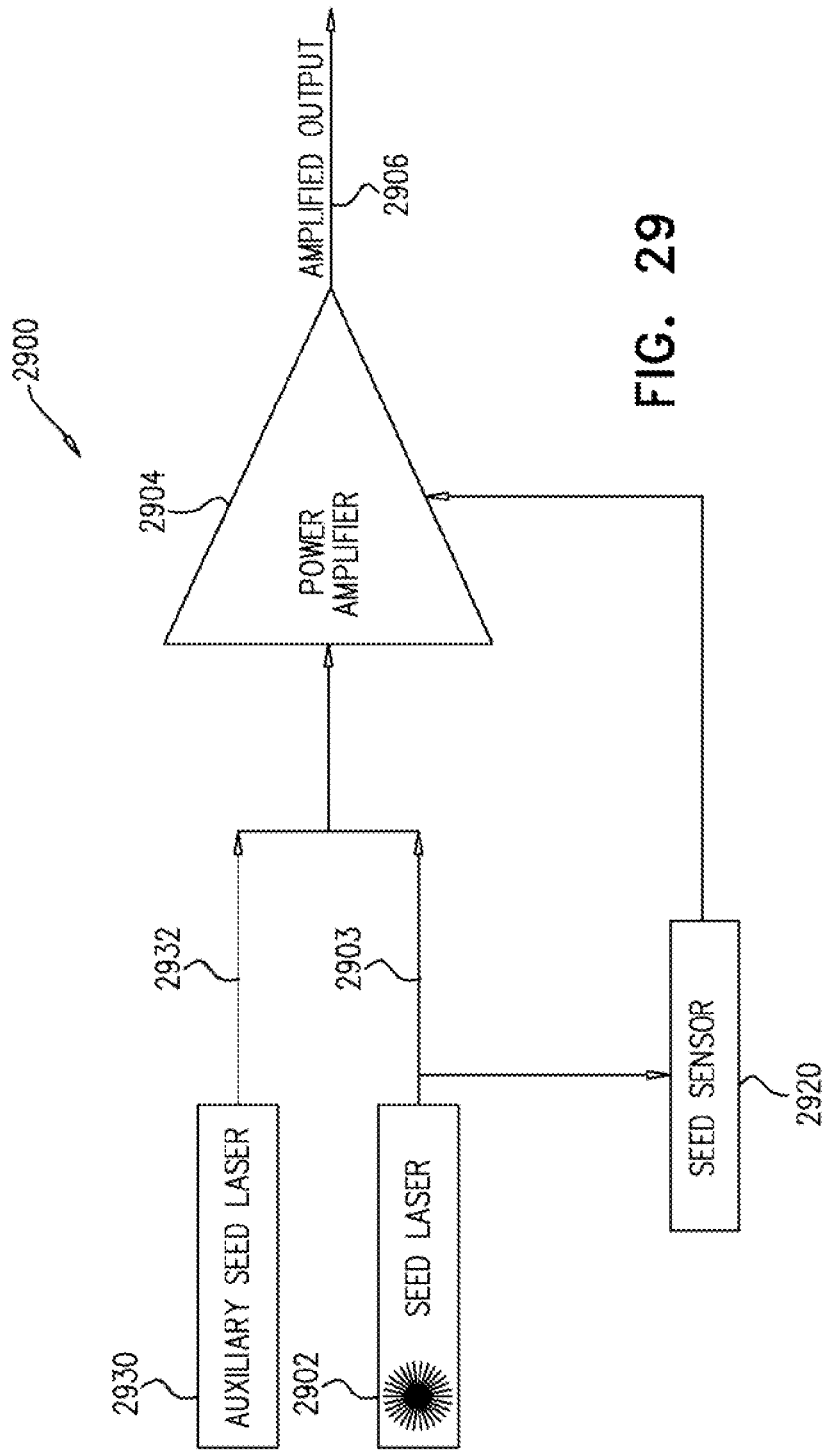
FIG. 29 is a simplified schematic illustration of a laser amplification system including a seed laser failure protection system constructed and operative in accordance with yet a further preferred embodiment of the present invention.

Reference is now made to FIG. 29, which is a simplified schematic diagram of a laser amplifying system including a seed laser failure protection system constructed and operative in accordance with yet a further preferred embodiment of the present invention.

As seen in FIG. 29, there is provided a laser system 2900 preferably including a seed laser 2902 providing a first laser output 2903 and an amplifying subsystem, here embodied by way of example as a power amplifier 2904, receiving the first laser output 2903 from seed laser 2902 and amplifying the laser output to provide an amplified laser output 2906. Laser system 2900 may be embodied, by way of example, a Master Oscillator Power Amplifier (MOPA) laser or may be any other laser system including a seed laser and power amplifier.

In order to detect possible defects in the laser output of seed laser 2902, system 2900 further preferably includes a detector subsystem, preferably embodied as a seed sensor 2920, receiving the output from seed laser 2902. Sensor subsystem 2920 may include one or more sensors for sensing properties of the laser output and, more specifically, for detecting possible faults in the laser output. Sensor subsystem 2920 is preferably operatively coupled to power amplifier 2904. Sensor subsystem 2920 is preferably configured to deactivate power amplifier 2904 upon detection of faults in the laser output from seed laser 2902.

It is a particular feature of a preferred embodiment of the present invention that laser system 2900 preferably includes an auxiliary laser subsystem, here preferably embodied as an auxiliary seed laser 2930. Auxiliary seed laser 2930 preferably provides a second laser output 2932 to amplifier 2904, which second laser output 2932 is preferably of a significantly lower power than a power of first laser output 2903. By way of example only, first laser output 2903 may have a first power in the range of 80-100 milliwatts whereas second laser output 2932 may have a second power in the range of 50-70 milliwatts.

Auxiliary seed laser 2930 preferably provides second laser output 2932 at least upon cessation of seed laser 2902 providing first laser output 2903 to amplifier 2904. Particularly preferably, auxiliary seed laser 2930 preferably operates continuously so as to provide second laser output 2932 to amplifier 2904 both concurrently with seed laser 2902 providing first laser output 2903 thereto as well as upon cessation of seed laser 2902 providing first laser output 2903.

During proper operation of seed laser 2902, amplifier 2904 preferably receives both first laser output 2903 from seed laser 2902 and second laser output 2932 from auxiliary seed laser 2930. Due to the power of second laser output 2932 being significantly lower than the power of first laser output 2903, the contribution of second laser output 2903 to amplified laser output 2906 is preferably negligible. Preferably, although not necessarily, second laser output 2932 is of a different wavelength than first laser output 2903, in order for further reduce the influence of second laser output 2932 on amplified laser output 2906. By way of example only, first laser output 2903 may have a first wavelength in the range of 1060-1070 nm whereas second laser output 2932 may have a second wavelength in the range of 1070-1080 nm.

Upon cessation of laser output from seed laser 2902, due to faulty operation of seed laser 2902 as sensed by sensor subsystem 2920, sensor subsystem 2920 is preferably operative to deactivate amplifier 2904. Due to the finite response time of amplifier 2904 and detector subsystem 2920, amplifier 2904 is not instantaneously deactivated but rather continues to operate for a finite period of time following cessation of laser output from seed laser 2902. It is understood that during this time, amplifier 2904 no longer receives first laser output 2903 from seed laser 2902. However, auxiliary seed laser 2930 preferably continues to provide second laser output 2932 to amplifier 2904. It is understood that amplifier 2904 thus continues to receive an input signal in the form of second laser output 2932, even in the case that seed laser 2902 has ceased to provide a laser output. The second laser output 2932 provided by auxiliary seed laser 2930 to amplifier 2904 is sufficient to prevent damage to amplifier 2904, which damage would otherwise be likely to occur due to cessation of the provision of a signal thereto, prior to amplifier 2904 being deactivated by sensor 2920.

Figure 30:
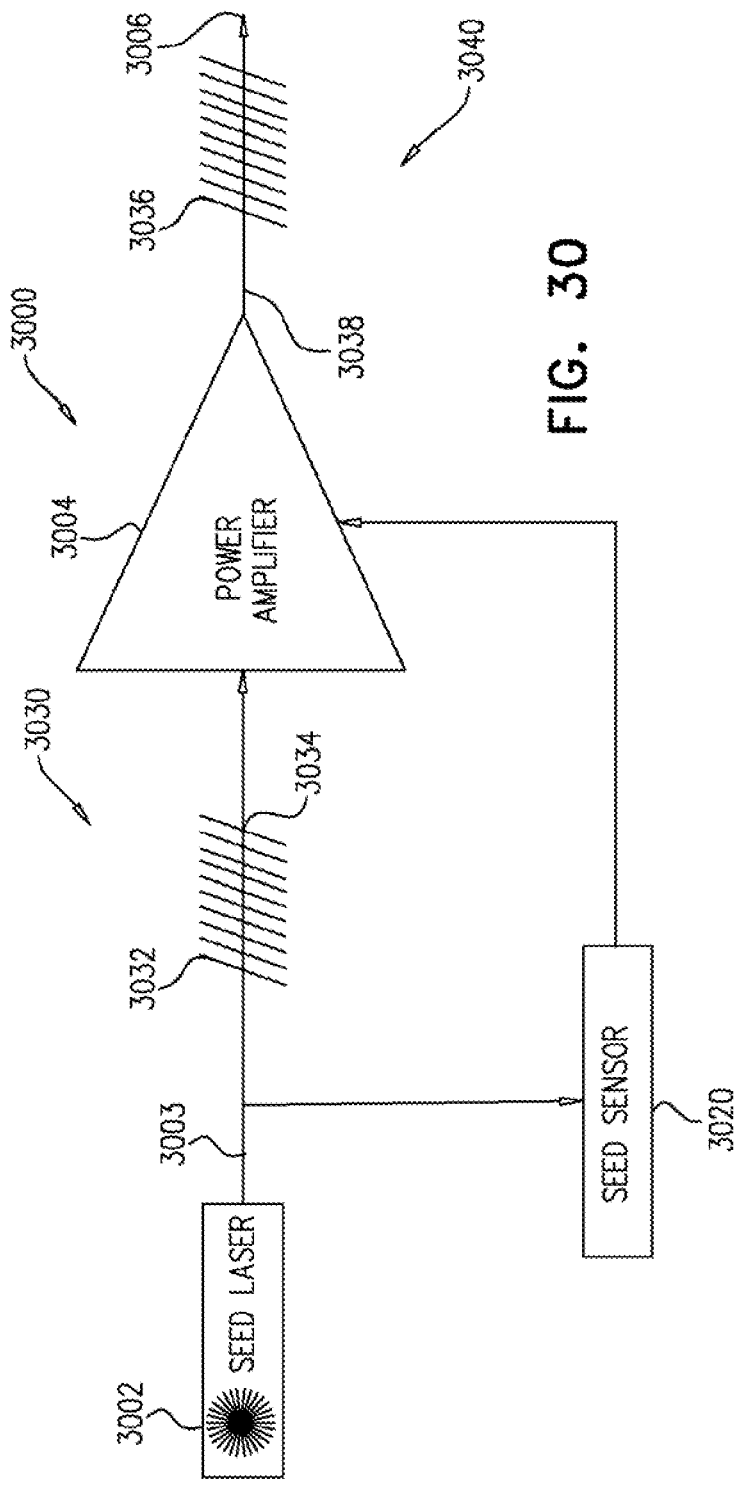
FIG. 30 is a simplified schematic illustration of a laser amplification system including a seed laser failure protection system constructed and operative in accordance with a still further preferred embodiment of the present invention.

Reference is now made to FIG. 30, which is a simplified schematic diagram of a laser amplifying system including a seed laser failure protection system constructed and operative in accordance with a still further preferred embodiment of the present invention.

As seen in FIG. 30, there is provided a laser system 3000 preferably including a seed laser 3002 providing a first laser output 3003 and an amplifying subsystem, here embodied by way of example as a power amplifier 3004, receiving the first laser output 3003 from seed laser 3002 and amplifying the laser output to provide an amplified laser output 3006. Laser system 3000 may be embodied, by way of example, a Master Oscillator Power Amplifier (MOPA) laser or may be any other laser system including a seed laser and power amplifier.

In order to detect possible defects in the laser output of seed laser 3002, system 3000 further preferably includes a detector subsystem 3020 receiving the output from seed laser 3002. Detector subsystem 3020 may include one or more sensors for sensing properties of the laser output and, more specifically, for detecting possible faults in the laser output. Sensor subsystem 3020 is preferably operatively coupled to power amplifier 3004. Sensor subsystem 3020 is preferably configured to deactivate power amplifier 3004 upon detection of faults in the laser output from seed laser 3002.

It is a particular feature of a preferred embodiment of the present invention that laser system 3000 preferably includes a pair of gratings 3030. Pair of gratings 3030 preferably includes a first reflection grating 3032 preferably positioned at an entry 3034 of amplifier 3004 and a second reflection grating 3036 preferably positioned at an exit 3038 of amplifier 3004. Pair of gratings 3030 in combination with amplifier 3004 preferably form a preferred embodiment of an auxiliary laser subsystem 3040.

During proper operation of seed laser 3002, amplifier 3004 preferably receives first laser output 3003 from seed laser 3002 and amplifies first laser output 3003 to provide amplified laser output 3006.

Upon cessation of laser output from seed laser 3002, due to faulty operation of seed laser 3002 as sensed by sensor subsystem 3020, sensor subsystem 3020 is preferably operative to deactivate amplifier 3004. Due to the finite response time of amplifier 3004 and sensor subsystem 3020, amplifier 3004 is not instantaneously deactivated but rather typically continues to operate for a finite period of time following cessation of laser output from seed laser 3002. It is understood that during this time, amplifier 3004 no longer receives a laser output from seed laser 3002. In this case, reflection gratings 3030 preferably provide a signal feedback to amplifier 3004, such that amplifier 3004 in combination with pair of gratings 3030 preferably begins to operate as a laser. Reflection gratings 3030 preferably have a relatively low reflectance such that the signal feedback provided by reflection gratings 3030 is of lower power than the power of the laser output 3003 of seed laser 3002.

Particularly preferably, although not necessarily, pair of gratings 3030 are reflective at a wavelength different than the wavelength of the first laser output 3003 of seed laser 3002, such that during proper operation of seed laser 3002 gratings 3030 have negligible influence on amplified output 3006. By way of example only, first laser output 3003 may have a wavelength in the range of 1060-1070 nm whereas gratings 3030 may be reflective at a wavelength in the range of 1090-1100 nm.

It is understood that amplifier 3004 thus continues to receive an input signal in the form of signal feedback from gratings 3030, even in the case that seed laser 3002 has ceased to provide a laser output. As a result, amplifier 3004 in combination with gratings 3030 begins to operate as a laser upon cessation of operation of seed laser 3002, thereby preventing damage to amplifier 3004, which damage would otherwise be likely to occur due to cessation of the provision of a signal thereto.

Figure 31:
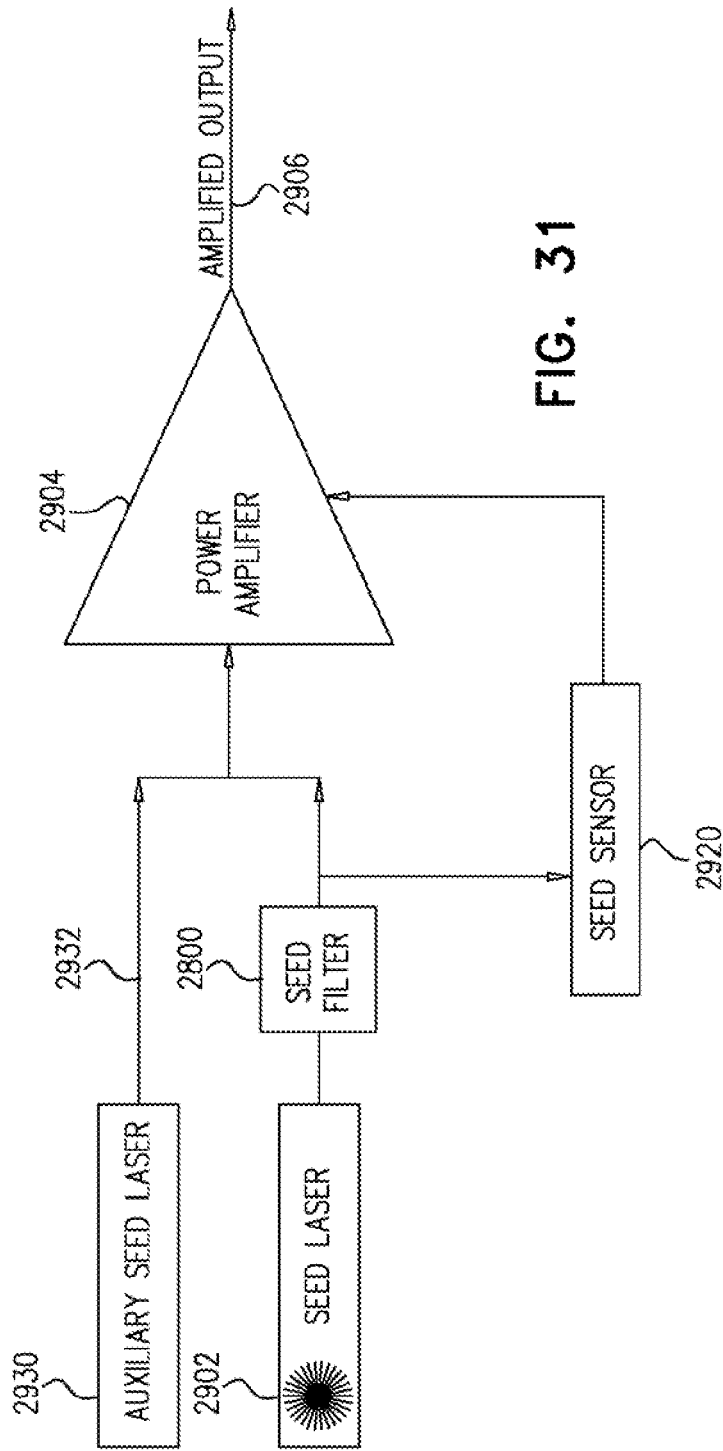
FIG. 31 is a simplified schematic illustration of a laser amplification system including a seed laser failure protection system constructed and operative in accordance with yet an additional preferred embodiment of the present invention.
Figure 32:
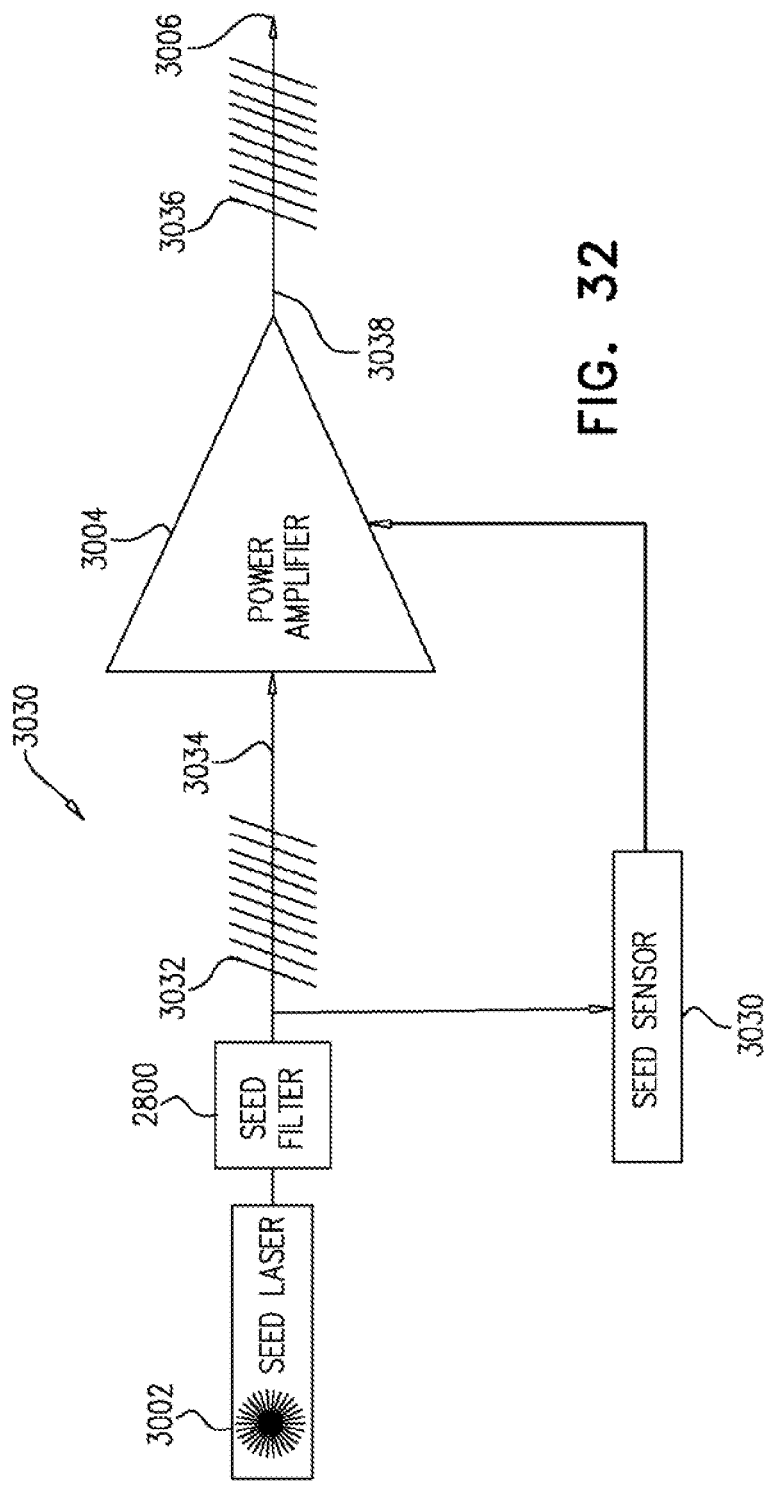
FIG. 32 is a simplified schematic illustration of a laser amplification system including a seed laser failure protection system constructed and operative in accordance with a still additional preferred embodiment of the present invention.

As seen in FIGS. 29 and 30, laser output from seed lasers 2902, 3002 may be fed directly to amplifiers 2904, 3004 respectively. Alternatively, as illustrated in FIGS. 31 and 32, additional elements may be inserted interfacing the seed laser and amplifier. Particularly, a line width filter, such as filter 2800 or any other suitable filter, may be inserted between seed lasers 2902, 3002 and amplifiers 2904, 3004 respectively in order to filter out laser beams of unacceptably narrow line width and thus prevent such laser beams from reaching and damaging amplifiers 2904, 3004.

As detailed hereinabove, each of the laser systems described with reference to FIGS. 24-32 may include a detector subsystem, such as detector subsystem 2420, 2920 and 3020. The detector subsystem is preferably embodied as at least one sensor for sensing the output from the seed laser. A particularly preferred embodiment of a sensor forming a part of a detector subsystem such as detector subsystem 2420, 2920 and 3020 is illustrated in FIG. 33. It is appreciated, however, that the sensor illustrated in FIG. 33 is not limited to use in systems of the type described herein and may be incorporated as a laser output sensor in any laser system benefitting from the use thereof.

As seen in FIG. 33, there is provided a detector subsystem 3320. Laser output from a seed laser preferably enters sensor subsystem 3320 at an input point 3330 and travels towards a splitter 3334. At splitter 3334, a small portion such as 1% of the laser output is directed towards a detector 3336 and the remaining portion of the laser output continues towards a sensor amplifier 3340. Sensor amplifier 3340 is preferably a lower power amplifier than power amplifier 2404, 2704, 2904 or 3004. Sensor amplifier 3340 preferably outputs an amplified laser output, which amplified laser output is preferably delivered to an additional detector 3342 by way of an elongate optical fiber 3344.

In operation of detector subsystem 3320, in the case that the output from the seed laser ceases, the intensity of the amplified laser output detected at additional detector 3342 decreases. In this case, a control module (not shown) connected to additional detector 3342 as well as to a power amplifier such as power amplifier 2404, 2704, 2904 or 3004 may deactivate the power amplifier in order to prevent damage thereto.

In the case that the output from the seed laser degrades so as to have an unacceptably narrow line width, non-linear effects will be initiated in fiber 3344. It is appreciated that fiber 3344 is advantageously configured so as to be as sensitive as possible to such non-linear effects. For this purpose, fiber 3344 is preferably of considerable length and preferably has a small core diameter, in order to increase the sensitivity of fiber 3344 to the line width of the laser output from the seed laser. By way of example only, fiber 3344 may have a length of approximately 25 m and a core diameter of approximately 6 microns.

Due to the non-linear effects initiated in fiber 3344 upon narrowing of the line width of the output from the seed laser, fiber 3344 preferably begins to operate as a mirror, reflecting light backwards towards amplifier 3340. As a result of the reflected light returning to amplifier 3340, an increased signal reaches splitter 3334 and is detected by detector 3336. Upon detection of an increased signal at detector 3336, the power amplifier is preferably deactivated in order to prevent damage thereto.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A laser system comprising:
a coherent beam combining (CBC) laser operative to provide a laser output having at least thermal noise, said CBC laser comprising at least one optical element positioned along a path of said laser output;
at least one detector located downstream of said at least one optical element, said at least one detector being operative to receive at least a portion of said laser output and to detect said at least thermal noise thereof; and
a phase control system operative to provide:
a first phase variation to vary a phase of said laser output, for controlling at least one of a shape and a position of said laser output, and
a second phase variation to cancel out at least said thermal noise as detected by said detector, said second phase variation being applied during said controlling and without significant disruption thereof.

2. A laser system according to claim 1, wherein said at least one detector is operative to detect said thermal noise at intermittent times during said controlling of said laser output.

3. A laser system according to claim 2, wherein said first phase variation for controlling said laser output is applied at time interstices between said intermittent times.

4. A laser system according to claim 1, wherein said first phase variation for controlling said laser output is applied at a greater rate than said second phase variation to cancel out said thermal noise.

5. A laser system according to claim 1, wherein said at least one optical element comprises at least one lens.

6. A laser system according to claim 1, wherein said thermal noise comprises phase noise generated by thermal effects on said laser system.

7. A laser system according to claim 1, wherein said laser output also has noise due to at least one of mechanical effects and amplification effects.

8. A laser system according to claim 1, wherein said at least one detector comprises a plurality of detectors.

9. A laser system according to claim 1, wherein said phase control system is operative to control said laser output using digital electronic controls and without requiring any moving parts.

10. A method for correcting noise in a laser output, comprising:
providing, by a coherent beam combining (CBC) laser, a laser output having at least thermal noise, said CBC laser comprising at least one optical element positioned along a path of said laser output;
receiving, by at least one detector located downstream of said at least one optical element, at least a portion of said laser output, said at least one detector detecting said at least thermal noise;
varying a first phase of said laser output, thereby controlling at least one of a shape and a position of said laser output, and
varying a second phase of said laser output to cancel out at least said thermal noise as detected by said detector, said varying of said second phase being performed during said controlling and without significant disruption thereof.

11. A laser welding system comprising:
a coherent beam combining (CBC) laser operative to provide a combined laser output, for welding of a substrate; and
a phase control system operative to provide phase variation of said combined laser output, said phase variation modifying at least one of a focal distance, a position and a shape of said combined laser output, during said welding.

12. A laser system according to claim 11, wherein said combined laser output has noise, and said phase control system further comprises a noise cancellation subsystem operative to provide a noise cancellation phase variation at intermittent times during said phase variation of said combined laser output.

13. A laser system according to claim 12, wherein said phase variation for modifying at least one of a focal distance, a position and a shape of said combined laser output is applied at time interstices between said intermittent times.

14. A laser system according to claim 12, wherein said phase variation for modifying at least one of a focal distance, a position and a shape of said combined laser output is applied at a greater rate than said noise cancellation phase variation.

15. A laser system according to claim 11, wherein said at least one of a focal distance, position and shape is continuously dynamically modified by said phase variation during said welding.

16. A laser system according to claim 15, wherein said at least one of said focal distance and shape is dynamically modified by said phase variation over points in space, in accordance with requirements of said welding.

17. A laser system according to claim 11, wherein said phase control system is operative to modify at least one of a focal distance, position and shape of said combined laser output using digital electronic controls and without requiring any moving parts.

18. A laser system according to claim 11, wherein said phase control system is operative to modify at least one of a focal distance, position and shape of said combined laser output using digital electronic controls, in combination with mechanical spatial modulation of said combined laser output.

19. A laser system according to claim 18, wherein said mechanical spatial modulation is provided by a welding robot.

20. A method for laser welding, comprising:
providing, by a coherent beam combining (CBC) laser, a combined laser output, for welding of a substrate; and
varying a phase of said combined laser output, said varying of said phase modifying at least one of a focal distance, a position and a shape of said combined laser output, during said welding.

21. A laser welding system comprising:
a coherent beam combining (CBC) laser operative to provide a combined laser output for welding of a substrate; and
a phase control system operative to provide phase variation of said combined laser output, said phase variation adjusting a shape of said combined laser output between at least a first shape and a second shape, during said welding.

22. A laser system according to claim 21, wherein said combined laser output has noise, and said phase control system further comprises a noise cancellation subsystem operative to provide a noise cancellation phase variation at intermittent times during said phase variation of said combined laser output.

23. A laser system according to claim 22, wherein said phase variation for adjusting a shape of said combined laser output is applied at time interstices between said intermittent times.

24. A laser system according to claim 22, wherein said phase variation for adjusting a shape of said combined laser output is applied at a greater rate than said noise cancellation phase variation.

25. A laser system according to claim 21, wherein said shape of said combined laser output is continuously dynamically modified by said phase variation during said welding.

26. A laser system according to claim 21, wherein said at least first and second shapes comprise mutually different shapes.

27. A laser system according to claim 21, wherein said phase control system is operative to adjust said shape of said combined laser output using digital electronic controls and without requiring any moving parts.

28. A laser system according to claim 21, wherein said phase control system is operative to adjust said shape of said combined laser output using digital electronic controls in combination with mechanical spatial modulation of said combined laser output.

29. A laser system according to claim 28, wherein said mechanical spatial modulation is provided by a welding robot.

30. A method for laser welding, comprising:
providing, by a coherent beam combining (CBC) laser, a combined laser output for welding of a substrate; and
varying a phase of said combined laser output, thereby adjusting a shape of said combined laser output between at least a first shape and a second shape, during said welding.

* * * * *